US008165920B2

(12) United States Patent  (10) Patent No.: US 8,165,920 B2
Goel  (45) Date of Patent: Apr. 24, 2012

(54) SYSTEM FOR CONCURRENT OPTIMIZATION OF BUSINESS ECONOMICS AND CUSTOMER VALUE

(76) Inventor: Sachin Goel, Walpole, MA (US)

( * ) Notice: Subject to any disclaimer, the term of this patent is extended or adjusted under 35 U.S.C. 154(b) by 630 days.

(21) Appl. No.: 11/981,817

(22) Filed: Oct. 31, 2007

(65) Prior Publication Data

US 2008/0262899 A1   Oct. 23, 2008

Related U.S. Application Data

(63) Continuation of application No. 11/506,451, filed on Aug. 18, 2006, now Pat. No. 7,424,449, which is a continuation-in-part of application No. 11/474,115, filed on Jun. 23, 2006, now Pat. No. 7,472,080, which is a continuation-in-part of application No. 10/973,802, filed on Oct. 25, 2004, now Pat. No. 7,418,409.

(60) Provisional application No. 60/514,248, filed on Oct. 24, 2003.

(51) Int. Cl.
   *G06Q 30/00* (2006.01)
   *G06F 17/30* (2006.01)
(52) U.S. Cl. ............................. 705/26.1; 705/5; 705/6
(58) Field of Classification Search ............ 705/5–6, 705/26–27, 26.1–27.2
See application file for complete search history.

(56) References Cited

U.S. PATENT DOCUMENTS

| | | | |
|---|---|---|---|
| 4,775,936 A | 10/1988 | Jung | |
| 4,931,932 A | 6/1990 | Dalnekoff et al. | |
| 5,237,499 A | 8/1993 | Garback | |
| 5,627,973 A | 5/1997 | Armstrong et al. | |
| 5,765,142 A | 6/1998 | Allred et al. | |
| 5,797,127 A | 8/1998 | Walker et al. | |
| 5,890,133 A | 3/1999 | Ernst | |
| 5,897,620 A * | 4/1999 | Walker et al. | 705/5 |
| 5,962,829 A | 10/1999 | Yoshinaga | |
| 5,963,910 A | 10/1999 | Ulwick | |
| 6,014,647 A | 1/2000 | Nizzari et al. | |
| 6,041,308 A | 3/2000 | Walker et al. | |

(Continued)

FOREIGN PATENT DOCUMENTS

GB    2366403 A    3/2002

(Continued)

OTHER PUBLICATIONS

"Money-back deal for air passengers: MEPs vote for tougher terms on cancelled ordelayed flights". Andrew Osborn in Brussels and Andrew Clark. The Guardian. Manchester (UK): Jul. 4, 2003. p. 11.*

(Continued)

*Primary Examiner* — Will Allen
(74) *Attorney, Agent, or Firm* — Wolf, Greenfield & Sacks, P.C.

(57) ABSTRACT

A computer-implemented system and method to provide options on products to enhance customers' experience. A computer-implemented system is operated that delivers to a customer an option to utilize up to n of m selected products, where m and n are whole numbers and n is less than or equal to m. Information is recorded in a data store, pertaining to said option. In addition, a system is operated to define each of the n chosen products, whereby after each of the n chosen products is defined, the customer can utilize said chosen product. The information pertaining to said defined products is recorded in a data store.

24 Claims, 34 Drawing Sheets

U.S. PATENT DOCUMENTS

| | | |
|---|---|---|
| 6,107,932 A | 8/2000 | Walker et al. |
| 6,115,691 A | 9/2000 | Ulwick |
| 6,119,094 A | 9/2000 | Lynch et al. |
| 6,119,933 A | 9/2000 | Wong et al. |
| 6,161,051 A | 12/2000 | Hafemann et al. |
| 6,236,977 B1 | 5/2001 | Verba et al. |
| 6,263,315 B1 | 7/2001 | Talluri |
| 6,295,521 B1 | 9/2001 | DeMarcken et al. |
| 6,304,850 B1 | 10/2001 | Keller et al. |
| 6,307,572 B1 | 10/2001 | DeMarcken et al. |
| 6,314,361 B1 | 11/2001 | Yu et al. |
| 6,377,932 B1 | 4/2002 | DeMarcken |
| 6,442,537 B1 | 8/2002 | Karch |
| 6,477,520 B1 | 11/2002 | Malaviya et al. |
| 6,496,568 B1 | 12/2002 | Nelson |
| 6,567,786 B1 | 5/2003 | Bibelnieks et al. |
| 6,721,714 B1 | 4/2004 | Baiada et al. |
| 6,757,689 B2 | 6/2004 | Battas et al. |
| 6,760,632 B1 | 7/2004 | Heching et al. |
| 6,778,660 B2 | 8/2004 | Fromm |
| 6,850,901 B1 | 2/2005 | Hunter et al. |
| 6,895,381 B1 | 5/2005 | Selby |
| 6,974,079 B1 | 12/2005 | Strothmann et al. |
| 7,050,987 B2 | 5/2006 | Lettovsky et al. |
| 7,069,309 B1 | 6/2006 | Dodrill et al. |
| 7,080,021 B1* | 7/2006 | McCulloch ............ 705/5 |
| 7,249,062 B2 | 7/2007 | Norins et al. |
| 7,340,403 B1 | 3/2008 | DeMarcken |
| 7,418,409 B1* | 8/2008 | Goel .................. 705/26 |
| 7,424,449 B2* | 9/2008 | Goel .................. 705/26 |
| 7,472,080 B2* | 12/2008 | Goel .................. 705/26 |
| 2001/0034686 A1 | 10/2001 | Eder |
| 2001/0037243 A1 | 11/2001 | Rouston et al. |
| 2001/0051885 A1 | 12/2001 | Nardulli et al. |
| 2002/0059283 A1 | 5/2002 | Shapiro et al. |
| 2002/0065696 A1 | 5/2002 | Hack et al. |
| 2002/0065699 A1 | 5/2002 | Talluri |
| 2002/0095328 A1 | 7/2002 | Swart et al. |
| 2002/0194117 A1 | 12/2002 | Nabe et al. |
| 2002/0198775 A1 | 12/2002 | Ryan |
| 2003/0033155 A1 | 2/2003 | Peerson et al. |
| 2003/0036928 A1* | 2/2003 | Kenigsberg et al. ............ 705/5 |
| 2003/0046130 A1 | 3/2003 | Golightly et al. |
| 2003/0050846 A1 | 3/2003 | Rodon |
| 2003/0055689 A1 | 3/2003 | Block et al. |
| 2003/0065581 A1 | 4/2003 | Takada |
| 2003/0069780 A1 | 4/2003 | Hailwood et al. |
| 2003/0074239 A1 | 4/2003 | Hoffman et al. |
| 2003/0074247 A1 | 4/2003 | Dick et al. |
| 2003/0074249 A1 | 4/2003 | Hoffman et al. |
| 2003/0074250 A1 | 4/2003 | Burk |
| 2003/0074262 A1 | 4/2003 | Hoffman et al. |
| 2003/0074263 A1 | 4/2003 | Hoffman et al. |
| 2003/0074264 A1 | 4/2003 | Hoffman |
| 2003/0074281 A1 | 4/2003 | Hoffman et al. |
| 2003/0074285 A1 | 4/2003 | Hoffman et al. |
| 2003/0074355 A1 | 4/2003 | Menniger et al. |
| 2003/0074360 A1 | 4/2003 | Chen et al. |
| 2003/0078787 A1 | 4/2003 | Hoffman et al. |
| 2003/0078818 A1 | 4/2003 | Hoffman et al. |
| 2003/0078827 A1 | 4/2003 | Hoffman |
| 2003/0078845 A1 | 4/2003 | Hoffman et al. |
| 2003/0078846 A1 | 4/2003 | Burk et al. |
| 2003/0078860 A1 | 4/2003 | Hoffman et al. |
| 2003/0078861 A1 | 4/2003 | Hoffman et al. |
| 2003/0144867 A1 | 7/2003 | Campbell et al. |
| 2003/0158771 A1 | 8/2003 | Shen et al. |
| 2003/0187685 A1 | 10/2003 | Bakker |
| 2004/0015386 A1 | 1/2004 | Abe et al. |
| 2004/0039613 A1 | 2/2004 | Maycotte et al. |
| 2004/0039614 A1 | 2/2004 | Maycotte et al. |
| 2004/0073496 A1 | 4/2004 | Cohen |
| 2004/0083113 A1 | 4/2004 | Cao et al. |
| 2004/0158536 A1 | 8/2004 | Kowal et al. |
| 2004/0172319 A1 | 9/2004 | Eder |
| 2004/0230451 A1 | 11/2004 | Figa |
| 2004/0267580 A1 | 12/2004 | Becker |
| 2005/0033616 A1 | 2/2005 | Vavul et al. |
| 2005/0071245 A1 | 3/2005 | Norins et al. |
| 2005/0097000 A1 | 5/2005 | Freishtat et al. |
| 2005/0216317 A1 | 9/2005 | Medellin et al. |
| 2006/0106655 A1 | 5/2006 | Lettovsky et al. |

FOREIGN PATENT DOCUMENTS

| | | | |
|---|---|---|---|
| WO | WO 0073930 | A2 | 12/2000 |
| WO | WO 0073957 | A2 | 12/2000 |
| WO | WO 0073958 | A2 | 12/2000 |
| WO | WO 01/18722 | A1 | 3/2001 |
| WO | WO 0133473 | A2 | 5/2001 |
| WO | WO 0157771 | A1 | 8/2001 |
| WO | WO 02079901 | A2 | 10/2002 |
| WO | WO 03019448 | A2 | 3/2003 |
| WO | WO 03/029914 | A2 | 4/2003 |
| WO | WO 03/054760 | A2 | 7/2003 |
| WO | WO 03102867 | A1 | 12/2003 |
| WO | WO 2004/036364 | A2 | 4/2004 |

OTHER PUBLICATIONS

"Overbooked Flights Raise Ire of Bumped Area Travelers". Rachel Sams. Knight Ridder Tribune Business News. Washington: Apr. 3, 2002. p. 1.*

Chatwin, "Multiperiod Airline Overbooking With a Single Fare Class," *Operations Research*, 46:6, 805-819p (1998).

Chatwin, "Optimal dynamic pricing of perishable products with stochastic demand and a finite set of prices," *Elsevir Science B. V.—European Journal of Operational Research*; 125, 149-174 (2000).

Compton, "Many Possibilities, One Price," *Customer Relationship Management*,8:8, 16-17 (2004).

Elmaghraby, "Dynamic Pricing in the Presence of Inventory Considerations: Research Overview, Current Practices and Future Directions," *Management Science*, 49:10, 1287-1309 (2003).

Grant, E., "A New Twist in Airline Travel: Surcharges Debut for Certain Ticket Types," *Travel Agent*, 293(11):135(1) Jan. 25, 1999 (recovered from Dialog on Dec. 6, 2008).

Ha et al., "Problem-Focused Incremental Elicitation of Multi-Attribute Utility Models," http://www.cs.uwm.edu/~vu/papers/uai97.af, 1-8.

Margulius, "Priced to sell . . . to you," Infoworld San Mataeo, 24:7, 47-48 http://www.infoworld.com/archives/emailPrint.jsp (2002).

Rios-Insua et al., Sensitivity Analysis in an Additive Multi-Attribute Utility Decision Support System, http://www.ciemat.es/convocatorias/eventos/samo2001/esp-riosinsua.pdf, 1-1.

Roth, et al., "Multi-Attribute Utility Analysis" http://msll.mit.edu/maua_paper.pdf, 1-16.

"Booked on the 6.40, the 7.00, the 7.45 . . . " Financial Times (FT) Mar. 8, 1999 p. 15 (recovered from Dialog on Dec. 6, 2008).

www.expedia.com May 19, 2001. Obtained on Sep. 26, 2007 from www.Archive.org.

PCT/IB07/03761, International Search Report and Written Opinion, Feb. 4, 2009.

* cited by examiner

The system is now ready to be deployed to generate
real world interactions with the customers Fig. 15
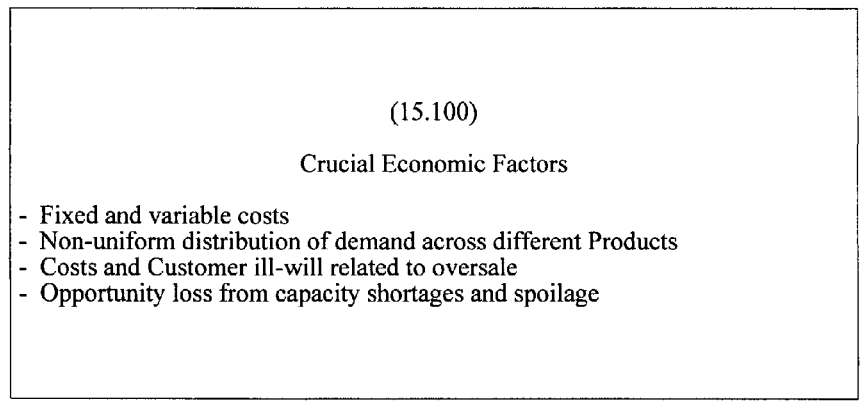
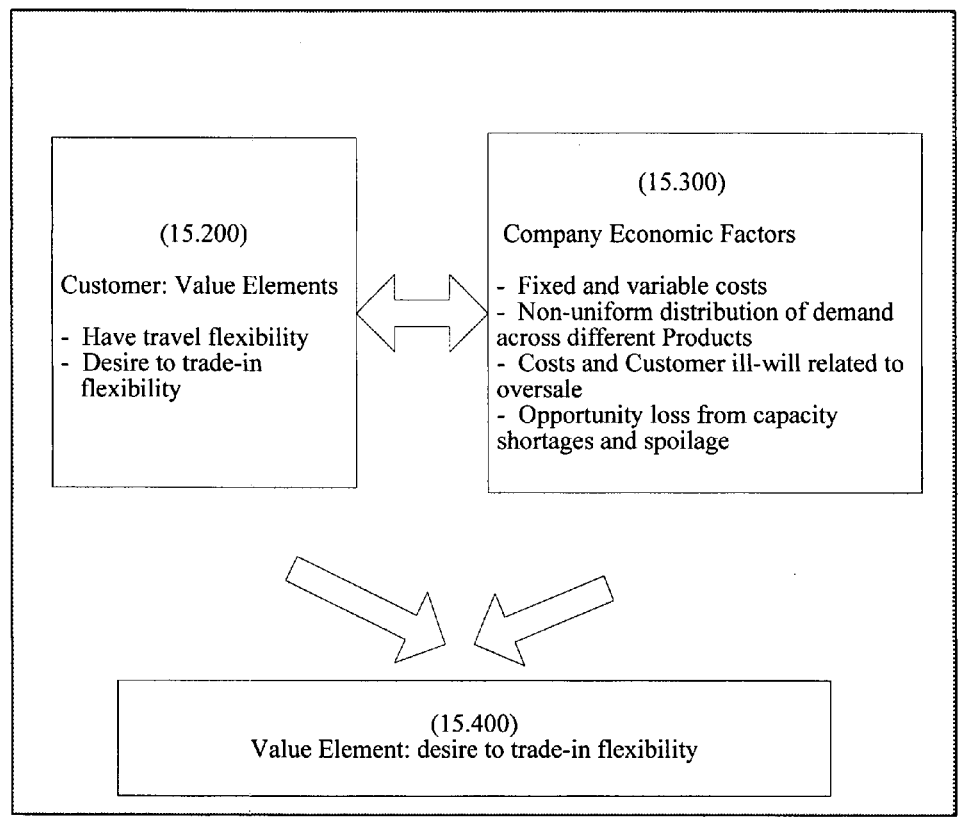

Fig. 17

(17.100)　Flight　　　　　F1

| Departs | Arrives | Flight | Cabin |
|---|---|---|---|
| BOS | ATL | Alpha 661 | Coach |
| 23rd May | 23rd May | 0 Stops | |
| 2:00pm | 5:00pm | | |

(17.200)　Flight　　　　　F2

| Departs | Arrives | Flight | Cabin |
|---|---|---|---|
| BOS | ATL | Alpha 427 | Coach |
| 25th May | 25th May | 0 Stops | |
| 4:30pm | 7:30pm | | |

(17.300)　　(1)　　　　　　　　　　(2)

| | (1) | (2) |
|---|---|---|
| (1) | Ticket Purchase Date Time | 14th April 5:24 pm |
| (2) | FRO Initial Transaction Date Time | 14th April 5:27 pm |
| (3) | Ticket Price Paid | $500 |
| (4) | Initial FRO Discount | $15 |

(17.400)
Default Flight  F1

| | | (1) | (2) | (3) | (4) | (5) |
|---|---|---|---|---|---|---|
| (1) | Notify Deadline (DTD of F1) | | 30 | 7 | 3 | 1 |
| (2) | FRO Exercise | F1 | | $5 | $10 | $15 | $20 |
| (3) | discount as a | F2 | | $10 | $25 | $35 | $50 |

Fig. 19

FRO Itinerary 1 (19.100)

Onward journey

| Flight | Departs | Arrives |
|---|---|---|
| Alpha993 Coach(U) | BOS  02 May  8:55am | ATL 02 May 11:57am |
| Alpha998 Coach(U) | ATL  02 May  1:00pm | LAX  02 May 3:07pm |

Return journey

| Flight | Departs | Arrives |
|---|---|---|
| Alpha893 Coach(U) | LAX  06 May  8:55am | BOS  06 May 12:15pm |

FRO Itinerary 2 (19.200)

Onward journey

| Flight | Departs | Arrives |
|---|---|---|
| Alpha963 Coach(U) | BOS  04 May  8:55am | ATL  04 May 11:57am |
| Alpha969 Coach(U) | ATL  04 May  2:00pm | LAX  04 May  4:07pm |

Return journey

| Flight | Departs | Arrives |
|---|---|---|
| Alpha793 Coach(U) | LAX  07 May  9:55am | BOS  07 May 1:15pm |

Fig. 20

Onward journey (20.100)

| (20.110) Initial Flight Segment | Flight | Departs | Arrives |
|---|---|---|---|
| | Alpha567 Coach(U) | BOS 02 May 8:55am | ATL 02 May 11:57am |
| | Alpha678 Coach(U) | ATL 02 May 1:00pm | LAX 02 May 3:07pm |

| (20.120) Option Flight Segment | Flight | Departs | Arrives |
|---|---|---|---|
| | Alpha123 Coach(U) | BOS 03 May 8:55am | LAX 03 May 12:07pm |

Return journey (20.200)

| (20.210) Initial Flight Segment | Flight | Departs | Arrives |
|---|---|---|---|
| | Alpha233 Coach(U) | LAX 06 May 8:55am | BOS 06 May 6:15pm |

Fig. 21

Onward journey (21.100)

Leg 1

| (21.110) Initial Flight Leg | Flight | Departs | Arrives |
|---|---|---|---|
| | Alpha493 Coach(U) | BOS 02 May 8:55am | ATL 02 May 11:57am |

Leg 2 (21.200)

| (21.210) Initial Flight Leg | Flight | Departs | Arrives |
|---|---|---|---|
| | Alpha398 Coach(U) | ATL 02 May 1:00pm | LAX 02 May 3:07pm |

| (21.220) Option Flight Leg | Flight | Departs | Arrives |
|---|---|---|---|
| | Alpha253 Coach(U) | ATL 02 May 6:00pm | LAX 02 May 8:07pm |

Return journey (21.300)

Leg1

| (21.310) Initial Flight Leg | Flight | Departs | Arrives |
|---|---|---|---|
| | Alpha343 Coach(U) | LAX 06 May 8:55am | BOS 06 May 6:15pm |

Fig. 22

Itinerary Summary

| Alternate Flight Option | Upgrade Ticket Option | Flexibility Reward Option |
|---|---|---|
| Know more...   Buy AFO | Know more...   Buy UTO | Know more...   Get FRO |

Your Itinerary

Onward Journey

|  | Flight |  | Departs |  | Arrives |
|---|---|---|---|---|---|
| Original Flight | Alpha 993 | Coach (U) | BOS | 8:55am May 2 | ORD | 11:57am May 2 |
|  | Alpha 892 | Coach (U) | ORD | 1:00pm May 2 | ATL | 3:07pm May 2 |

Return Journey

|  | Flight |  | Departs |  | Arrives |
|---|---|---|---|---|---|
| Original Flight | Alpha 964 | Coach (U) | ATL | 9:55am May 7 | ORD | 11:50am May 7 |
|  | Alpha 857 | Coach (U) | ORD | 1:00pm May 7 | BOS | 4:07pm May 7 |

Fig. 23

FRO Reservation

Search  Select FRO  Payment  Confirm

Your Itinerary

Onward Journey

| | Flight | | Departs | | Arrives | | Enter Input to search for FRO flights | | |
|---|---|---|---|---|---|---|---|---|---|
| | Alpha 993 | | BOS | 8:55am May 2 | ORD | 11:57am May 2 | From | BOS | Depart On May 1 |
| Original Flight | Coach (U) | | | | | | To | ATL | +/- days +/- 0days |
| | Alpha 892 | | ORD | 1:00pm May 2 | ATL | 3:07pm May 2 | Stops | 1 | Depart Time morning |
| | Coach (U) | | | | | | | | ▶ Search FRO Flights |

Return Journey

| | Flight | | Departs | | Arrives | |
|---|---|---|---|---|---|---|
| | Alpha 964 | ATL | 9:55am May 7 | ORD | 11:50am May 7 | |
| Original Flight | Coach (U) | | | | | Click here to Get FRO Flight for Return Journey |
| | Alpha 857 | ORD | 1:00pm May 7 | BOS | 4:07pm May 7 | |
| | Coach (U) | | | | | |

Fig. 24

FRO Reservation

Search  Select FRO  Payment  Confirm

Your Itinerary

Onward Journey

| | Flight | Departs | | Arrives | |
|---|---|---|---|---|---|
| Original Flight | Alpha 993 Coach (U) | BOS | 8:55am May 2 | ORD | 11:57am May 2 |
| | Alpha 892 Coach (U) | ORD | 1:00pm May 2 | ATL | 3:07pm May 2 |

Enter Input to search for FRO flights

From: BOS  Depart On: May 1
To: ATL  +/- days: +/- 0 days
Stops: 1  Depart Time: morning ( ▶ Search FRO Flights )

Return Journey

| | Flight | Departs | | Arrives | |
|---|---|---|---|---|---|
| Original Flight | Alpha 964 Coach (U) | ATL | 9:55am May 7 | ORD | 11:50am May 7 |
| | Alpha 857 Coach (U) | ORD | 1:00pm May 7 | BOS | 4:07pm May 7 |

Click here to Get FRO Flight for Return Journey

Select FRO Flight for Onward Journey  *discount per person

| FRO Flight | Departs | Arrives | Instant FRO Discount | FRO Notify Deadline/FRO Exercise Discount* |
|---|---|---|---|---|
| Alpha 674/625 Stop 1 | 9:00am 1 May BOS | 3:07pm 1 May ATL | $10 | Notify Deadline — April 30 6:00pm $10 Select / May 1 5:00am $25 Select / May 1 9:00am FRO Flight Departs / May 2 8:55am Original Flight Departs |
| Alpha 443/128 Stop 1 | 10:00am 1 May BOS | 1:00pm 1 May ATL | $5 | Notify Deadline — April 28 6:00pm $30 Select / May 1 5:00am $35 Select / May 1 10:00am FRO Flight Departs / May 2 8:55am Original Flight Departs |
| Alpha 333/368 Stop 1 | 11:00am 1 May BOS | 7:05pm 1 May ATL | $5 | Notify Deadline — April 30 6:00pm $25 Select / May 1 5:00am $50 Select / May 1 11:00am FRO Flight Departs / May 2 8:55 AM Original Flight Departs |

Fig. 25

FRO Reservation

Search    Select FRO    Payment    Confirm

Your Itinerary (Includes FRO Flight on Onward Journey)

Onward Journey

| | Flight | | Departs | | Arrives | FRO Summary | |
|---|---|---|---|---|---|---|---|
| Original Flight | Alpha 993 | Coach (U) | BOS | 8:55am May 2 | ORD | 11:57am May 2 | We may ask you to take FRO Flight by | If we do so, we would offer FRO Exercise Discount of |
| | Alpha 892 | Coach (U) | ORD | 1:00pm May 2 | ATL | 3:07pm May 2 | May 1, 5:00 am | $25 |
| FRO Flight | Alpha 674 | Coach (U) | BOS | 9:00am May 1 | ORD | 11:57am May 1 | [Edit FRO Deadline/FRO Exercise Price ▼] | |
| | Alpha 625 | Coach (U) | ORD | 1:00pm May 1 | ATL | 3:07pm May 1 | (▶ Remove FRO Flight)  (▶ Change FRO Flight) | |

Return Journey

| | Flight | | Departs | | Arrives | | |
|---|---|---|---|---|---|---|---|
| Original Flight | Alpha 964 | Coach (U) | ATL | 9:55am May 7 | ORD | 11:50am May 7 | Click here to Get FRO Flight For Return Journey |
| | Alpha 857 | Coach (U) | ORD | 1:00pm May 7 | BOS | 4:07pm May 7 | |

(▶ Continue)

SYSTEM FOR CONCURRENT OPTIMIZATION OF BUSINESS ECONOMICS AND CUSTOMER VALUE

CROSS-REFERENCE TO RELATED APPLICATIONS AND PRIORITY CLAIM

This application is a continuation, and claims the benefit under 35 USC 120, of U.S. patent application Ser. No. 11/506,451, filed Aug. 18, 2006, which is a continuation-in-part of Ser. No. 11/474,115, filed Jun. 23, 2006, which is a continuation-in-part of U.S. patent application Ser. No. 10/973,802, filed Oct. 25, 2004, all titled "System For Concurrent Optimization Of Business Economics And Customer Value Satisfaction," the latter of which, in turn, claims the benefit under 35 USC 119(e) of prior provisional patent application Ser. No. 60/514,248, filed Oct. 24, 2003, titled "Real-Time Optimization Across Integrated Customer Preferences and Company Economics Through Formulation of Value Options That Maximize Value of Both Customer and Company." This application is also a continuation-in-part and claims the benefit under 35 USC 120, of each of international applications PCT/US2007/014654 and PCT/US2007/014653, both filed Jun. 23, 2007. Each of said applications is hereby incorporated by reference herein.

FIELD OF INVENTION

This invention relates to a system and method for matching customer preferences with vendor products and services, and then dynamically managing the on-demand and optimally customized delivery of such business services or products. More particularly, it relates to methods and systems for customizing and optimizing a company's products and services to individual customers in a way that concurrently enhances customer value and overall business performance.

BACKGROUND

Historically, "companies" (a term defined below) and their customers often have done business across a gap, so to speak. Product or service offerings by a company and the customers' desired product or service do not fully match. In part, this gap is a manifestation of the facts that (1) companies have an incomplete grasp of customer needs, their relative preferences and the pricing utilities customers attach to those preferences (which utilities, equating to the customer's willingness to pay, are dynamic) and (2) a company's costs, profits and inventory (which may control what it can offer on a timely basis) are also dynamic. However, it is also in major part a manifestation of the lack of information technology tools, which can close the gap. To collect dynamic customer and company data and then employ those dynamic data to close the gap is a complex technical problem.

Generally, the customer is treated as an individual and sales terms are customized only when the cost of negotiation is justified—for very large transactions. Many products and services, though, represent complex, multi-faceted offerings and customers weigh their preferences for product features differently at different times. A customer might care more about cost one day and more about availability or delivery time or warranty if queried a few days or weeks later, to use some basic trade-offs as examples. Generally, a company's product consists of many value elements, (explained later) all of which are bundled together to be sold as a single product. But, not every customer values all the aspects of a product equally or needs all. Every customer places a different value (which may be a function of time and situation) on each aspect of a product. With features bundled together in a product, companies end up either incurring costs to sell something to a customer that he does want or lose a customer because the extra undesired value elements forced the product price too high for the customer.

The underlying problem is both that customer demands are incompletely understood and that such demands can change quickly, whereas a company's productive capacity or service often does not have the same dynamic time frame and is supported by a relatively fixed (in the short term) capacity and supply chain.

A company typically uses demand forecasts to build product quantities to match demand. However, companies' forecasts often prove imperfect, leading to shortage or excess supply in one or more product types. If a product has been sold to a customer, the sold quantity of product, generally, cannot be resold to another potential customer. However, it is possible that is another potential customer who may offer a higher value for a product that has been sold. Such situations may lead to potential opportunity loss for the company, especially, if the potential customer spills over (i.e., leaves the company and goes elsewhere, such as to a competitor). In some situations, such spilled customers may be high paying customers, thus, leading to a "high value spill". The situation becomes worse when the former customer returns the purchased product. The company may, thus, be left with the unsold (returned) product and loses an opportunity to sell. To overcome such situations, companies in some industries like airlines, hotels, car rental and so forth, oversell their products (i.e., sell more than the supply).

Consider the airline industry, where overbooking (or overselling) is very commonly practiced by several airlines across the world. To hedge against last minute cancellations and no-shows (collectively referred to as CNS) and to save high revenue spill, airlines overbook their flights (i.e., sell more tickets than the flight capacity). A no-show customer is defined as a customer with a confirmed ticket who does not turn up for a flight. As described above, the term "High revenue spill" refers to potential revenue loss from potential high revenue paying customers who want to buy a ticket on a flight, but, may spill over to a competitor if the desired flight is not available. The airlines usually try to sell tickets (often, at high prices), even after reaching flight capacity, to not let go of any such potential high revenue paying customers. If the number of people who turn up for the flight is more than the flight capacity (i.e., a situation termed "oversale"), the airlines try to bump customers (i.e., shift customers out of their currently booked flight) voluntarily and/or involuntarily. Airlines use various incentives to bump customers, such as travel vouchers, upgrades, various coupons and likewise. Consider an example. A flight has capacity of 100 seats, however, an airline overbooked 110 customers on that flight, since they expected CNS to be 10. Since, it is difficult to estimate CNS accurately, often, airlines face an oversale situation, i.e., more (>100) customers turn up for the flight, or a "spoilage" situation (i.e., fewer than 100 customers turn up). An oversale situation results in costs and customer ill-will that may increase exponentially with the increase in the number of bumped customers. A spoilage situation may reflect on loss of potential revenue from spill.

On the other side of the screen, there is a significant portion of customers who are price sensitive, and might be willing to shift from their booked flights to other flights in return for desired incentives. For instance, in the airline industry, the customers usually buy tickets one to four weeks in advance (of the premeditated travel date) to get the low fares since the fares, normally increase as the departure date of the flight approaches. They can shift/move their choice of utilizing a product to a reasonable extent if they are rewarded. In this way, those customers may trade-in their flexibility in product utility.

From the above discussion, it is clear that flexibility of customers may be mapped or utilized to satisfy the fixed (or less flexible) demand of other customers. In the context of the airline industry, the flexibility from some customers may be mapped or utilized to satisfy fixed (or less flexible) demand of other customers. But so far, there is no existing system and method, which can allow a company to accomplish this optimally.

Today, airlines do not have any mechanism to allow such flexibility or changes in customer tickets at an individual level at conditions that would optimally satisfy both the parties. Instead, airlines try to deal with all such customers in a rather fixed way (or one bumping/overbooking policy) leading to customer ill-will, high oversale costs and opportunity costs from potential revenue spill (and unsatisfied customer demand). Besides the airline industry, there are several other industries (as mentioned above) that either do not allow flexibility or follow processes that involve high costs and/or demand significant efforts on the customer's end.

What is needed is a mechanism that allows a company to map varying product flexibility across different customers in way that concurrently optimizes value for the company and customers. Indeed, there is no system or method available that can be applied to all the above industries, and many more, and help companies to match the availability of their products to their customers' preferences, let alone while concurrently maximizing the benefits to both the company and its customers.

A technology platform (i.e., system) and methodology thus are needed for customizing, in an optimal way, a match between customers' desire to trade-in flexibility and the company value. In the context of airline industry example, a technology platform (i.e., system) and methodology thus are needed for customizing, in an optimal way, a match between customers' desires to trade-in their travel flexibility and airline's value.

More particularly, a system and methodology are needed which support optimal customization of service offerings in the airline and other industries. If such a match could be made, both company and customer would benefit. The customer would be more satisfied and the company (both in short term and long term) will be more profitable. A win-win scenario is created rather than a zero sum game.

SUMMARY

In response to recognition of this need, shown herein a system and method that allows businesses to determine their customers' preferences (implicitly or explicitly, in advance or in quasi-real-time) and to dynamically integrate these preferences with internal company economics to concurrently maximize value for both customers (i.e., their purchase utilities) and the company (i.e., its profitability).

A framework of systems and methods are shown that allows businesses to determine their customers' preferences (implicitly or explicitly, in advance or in quasi-real-time) for flexibility in purchasing products and to dynamically integrate these preferences with internal company operations to concurrently maximize value for both customers (individually or as a group, their purchase utilities) and the company (i.e., its profitability).

In general, it is an aspect of the system and method that a business determines a customer's preferences (flexibilities and associated relative utilities) in great detail and in real-time or quasi-real-time from direct inquiries (explicitly) and/or past interaction (implicitly), before or while engaging in a sales transaction. When a sales transaction is formed, those preferences are then integrated with internal company operations and economics (costs, capacities, constraints, inventories, etc.). Values are then determined for product or service options to be offered to the customer based on integrated (i.e., aggregated) customer preferences and company economics. On one hand, these value options allow companies to reward or charge customers for their flexibilities with respect to preferences. On the other hand, these value options enable companies to maximize their revenues and/or profitability by unbundling their products and services, and best matching the offerings with a customer's expressed preference/cost tradeoffs. Since the customer gets something matching more closely his or her preferences than a "one size fits all" or small, fixed choice approach, customer purchase utility is increased and the customer is pleased to receive a product or service tailored to the customer's preferences. A company may charge for the purchase of some product options. So, customers pay for options made available to them and the company does not have to invest in offering everyone features that only a minority of customers want.

Accordingly, there is shown a system for collecting such customer preference information and pricing corresponding options and presenting options to the customer, receiving customer choices, and completing a sale. The collection steps may be implemented over the global Internet and its World Wide Web. However, other communication media may be used, as well, for all or part of the system or steps. For example, customer information may be taken over the phone or in person or via any other means. And a sale can similarly be completed by telephone or in person.

The system may also provide after-sale follow-up and implement execution of option terms purchased by the customer. An engine may be provided for this purpose. The engine may be a processor(s) that is programmed to execute a suitable event response algorithm. Each procedure for event response (related to a purchased option) may be custom programmed to implement the desired operations of the company or there may be provided a library of procedures generally applicable to an industry. The library procedures may be used by the company with or without customization. The detection of the contingency triggering the procedure may in some instances be made automatic, as by interconnection with the company's information management systems, or it may be externally or manually supplied.

Also shown are a number of novel products generated by the disclosed methodology, and related algorithms which may be implemented on the disclosed platform or any other suitable platform, thus constituting new methods and systems. Few value option frameworks (VOFs) and their associated methods and systems for delivery of these VOFs are presented in detail.

Other features and advantages of the invention will be apparent from the following description and the appended claims.

BRIEF DESCRIPTION OF THE DRAWING

FIG. 15 is a diagrammatic illustration of company economic factors and mapping between customer dynamics and company economic factors in relation to FRO VOF;

FIG. 17 is a diagrammatic representation of FRO Flights and Initial Transaction associated with an example of FRO (2, 1) instance in an airline industry;

FIG. 19 is a diagrammatic representation of FRO implementation in an airline industry at the Itinerary Level;

FIG. 20 is a diagrammatic representation of FRO implementation in an airline industry at the Segment Level;

FIG. 21 is a diagrammatic representation of FRO implementation in an airline industry at the Leg level;

FIGS. 22, 23, 24 and 25 are simulated screen shots of web screens illustrating how the Initial Transaction for FRO may take place between an airline and a customer;

DETAILED DESCRIPTION

Figure 1:
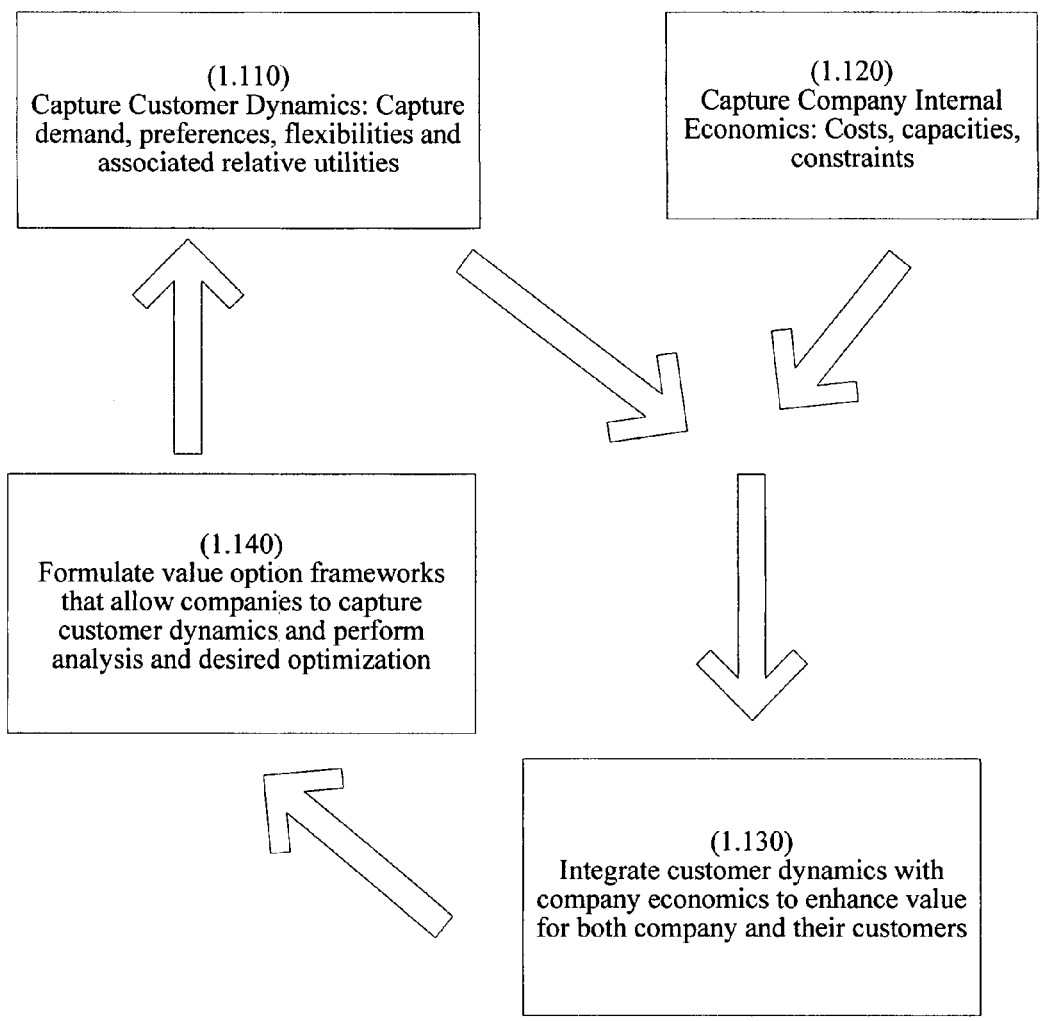
FIG. 1 is a diagrammatic illustration, in a high-level flow chart, of a method of achieving the optionally customized sale of goods or services as taught herein.

Selected illustrative embodiments according to the invention will now be described in detail, as the inventive concepts are further amplified and explicated. These embodiments are presented by way of example only. In the following description, numerous specific details are set forth in order to provide enough context to convey a thorough understanding of the invention and of these embodiments. It will be apparent, however, to one skilled in the art, that the invention may be practiced without some or all of these specific details. In other instances, well-known features and/or process steps have not been described in detail in order to not unnecessarily obscure the invention. One should not confuse the invention with the examples used to illustrate and explain the invention. The features and advantages of the invention may be better understood with reference to the drawings and discussions that follow.

The terms and definitions given below are needed to understand the following sections. Some of the key terms used in the description have been put in italics to enhance the readability.

The method and system taught herein connect customers directly to a manufacturer or service provider and the rest of the supply chain, herein referred to as "channel partners." The term "manufacturer" is intended to include vendors of services as well as vendor of goods. Hereafter, the manufacturer and channel partners will be collectively referred to as a "company" or "companies" and all of those terms will be appreciated to include sole proprietorships, partnerships, corporations, option aggregators or any other legal entity or combination thereof. The term "entity" includes "entity" or "entities" and all of those terms will include individual(s), group of individuals, company, companies, sole proprietorships, partnerships, corporations or any other legal entity or combination or consortium thereof. The term "airline" or "airlines" includes, but is not limited to, an airline, an airline's business partner, an entity which deals with an airline or an airline's business partner, a travel agent, an online travel agent, an option aggregator, any entity forming a part of the chain of commerce related to airline and/or travel industry, or any combination of any two or more of the above. The term "product" refers to a product or service provided by a manufacturer or a provider. For example, in the airline industry, a flight seat is a product that an airline sells to its customers. The term "customer" here implies an entity buying or entering into a contract to buy a company's product or service. The term "customer" may also refer to a customer or any entity buying or entering into a contract to buy an airline's product or service. The term "optimize" is not intended to require achievement of a mathematical minimum or maximum, but to refer to enhancement.

The term "flight" refers to a single flight, a group of flights, flights with zero or more stops or any combination of the above. The term "Flights" or "Flight" may also sometime refer to one or more seats on said flight(s), when the context requires. The terms "flight" and "seat" are interchangeable as the context requires. The term "Flight" or "Flights" may also refer to a Flight Leg, a Flight Segment, an Itinerary, any combination of two or more flights or any combination of the above, when the context requires.

The term "Itinerary" refers to a list of flights included in a single travel trip of a customer. An Itinerary may consist of one or more "Segments" (defined below). An Itinerary can be a one-way trip (one Segment), a round-trip (two Segments) or a multi-city trip (two or more Segments). A round-trip Itinerary has two Segments back and forth between two places (e.g., a trip from A to B and then back from B to A). A One-Way Itinerary has only one Segment (such as travel from A to B). A Multi-City Itinerary refers to an Itinerary with two or more Segments across two or more places (e.g., a trip from A to B and then from B to C).

The term "Flight Segment" (or "Segment", in short) refers to a part of an Itinerary between a customer's intended origin and destination. A Segment may consist of one or more "Flight Legs". The term "Flight Leg" (or "Leg", in short) is the most fundamental unit of an Itinerary and is defined by a single takeoff and landing of a flight. In a round-trip Itinerary (A to B and B to A), there may be 2 Flight Legs from A to B (customer flies from A to C and then C to B, two connecting flights), and similarly two Flight Legs from B to A (customer flies from B to D and then D to A, two connecting flights). When a customer flies from A to B and the plane takes a stop in between at C, it is still considered to be two Flight Legs (A-to-C and C-to-B) even though the customer may/may not change planes between A and B and/or an airline may or may not use the same flight number to refer to the entire Segment from A to B. In the airline industry example, capacity of a flight refers to the total number of seats in the flight.

The term "schedule" refers to the characteristics of a flight including, but not limited to, airline related parameters, departure/arrival parameters, service and other miscellaneous parameters. The airline related parameters may include, but are not limited to, operating carrier entity (i.e, the airline that operates the flight), marketing carrier (an airline that sells the flight), any other carrier or intra/inter-carrier flight groups associated with the flight or any combination of the above. The departure/arrival parameters may include, but are not limited to, an airport and its location (city, state, country), date and time, seasonality, weather and other operational conditions, number of stops/connections, and so forth. The service and other miscellaneous parameters may include, but are not limited to, type of aircraft, flight duration, in-flight or other services such as number of cabins, types of seats, meal selection, check-in and luggage options, airport lounges and other facilities, and so forth.

The term "Product Price" of a Product (in reference to one or more VOFs) refers to the price a company would charge for a Product in the absence of implementation of said VOFs on said product. In the context of the airline industry, the term "Ticket Price" (in reference to one or more VOFs) refers to the price that an airline would charge for a Flight in the absence of implementation of said VOFs on said flight.

The term "transaction" here implies to do, to carry or to conduct an agreement or exchange. The exchange may or may not involve a price in terms of monetary or non-monetary value from customer side. The parties participating in the transaction may have obligation(s) from various terms and conditions. In other words, transaction may also imply an action or activity involving two or more parties that reciprocally affect or influence each other.

The term "related transactions" here refers to one or more transactions that are related to each other. In a Value Option Framework, the successful interaction between the participants may happen through a number of transactions in sequence, where each of the transactions in the sequence may (or may not) depend upon the outcome of the previous transaction, and this may create a chain of "related transactions". However, at least one transaction in a set of related transactions must be related to all the other transactions. The connection or reference between the transactions may be direct or indirect and/or implicit or explicit. The related transactions may be contingent to each other or rely or require the aid of the other to support. The transactions may be fully and/or partly related to each other to be construed as related transactions. For example, the price of a transaction may be modified if the customer has already bought a product in a previous transaction, which makes the two transaction related to each other. In another example, the customer is given availability in a flight since he or she has already purchased a ticket in another flight; which makes both the transactions related to each other. For the transactions to be called as related transactions, some dependency and/or nexus between the transactions has to be established. The transactions may become related transaction in one or more transactions.

The term "default" here implies a situation or condition that turns up in the absence of active intervention from the users in a contract. In such situation, a particular setting or value (termed "Default Settings" or "Default Value") for one/more exchange variables is/are assigned automatically. These Default Settings/Default Values remain in effect unless intervened.

The term "payment" here implies the act of paying or the state of being paid. The term "payment" here implies an amount of money or any other consideration paid at a given time or which has been received in the past but for which the benefit of the same is realized now, may be in part or in totality. "Payment" may also refer to a transfer of something of value to compensate for goods or services that have been, or will be, received. Payment may be made in cash, on credit or by transfer of miles or any other consideration. The payment can be from company to customer or from customer to company or both.

The term "significant period of time" here implies a time period that is large enough with respect to the total utility time for the customer that it may affect the behavior of a transaction.

The term "anytime" or "any other time" here refers to any point of time that lies between a time period starting from the initial interaction of a customer with an airline (for any ticket purchase or any other event) for a particular journey and ending when the said customer completes the said journey and/or any other journey related to the said journey.

The terms "Set" and "Product Set" refers to a collection of Products and are used interchangeably. A Set may have one or more Products. In the airline industry context, a Flight Segment is equivalent to a Set and each Leg within a Segment is equivalent to a Product. A Segment may consist of one or more Flight Legs (Products). A company may (or may not) impose a restriction that all the Products of a Set must be used together unless a change is made to the Order (described later). For example, in the airline industry, airlines may restrict customers to use all the Legs of a Segment unless customers make changes to their itineraries.

The term "Order" refers to a purchase made by a customer at a given time. An Order may consist of one or more Sets, where each Set may consist of one or more Products. In the context of the airline industry, an Itinerary is equivalent to an Order.

The term "Initial Product Set" (or IPS, in short) refers to a Set purchased by a customer. For example, in the airline industry context, the term Initial Flight Segment (defined below) is equivalent to IPS. The term "Initial Flight Segment"

(or IFS, in short) refers to a flight Segment purchased by a customer. For example, consider an itinerary with two Segments, A to B and B to A. Each of the two segments is referred to as IFS.

The term "Option Product Set" (or OPS, in short) refers to a Set received by the customer as part of a FRO. In the airline industry context, OFS is equivalent to OPS. The term "Option Flight Segment" (or OFS, in short) refers to a flight Segment selected as part of a FRO option on a given IFS in the context of the airline industry. There can be one or more OFS for a specific IFS.

The term "Y" refers to a type of customer who has received a FRO. In the context of FRO VOF, the term "N" refers to the type of customer who has not received a FRO. N also refers to those Y customers for whom FRO has been exercised completely. The term "Y Status" refers to the status of a Y customer in a given IPS or OPSs. Y status are of two types: Accounted (Ya) and Awaiting (Yw).

When a Y customer is counted as holding (or using or blocking) a unit of capacity of a Product in a Set (IPS or OPS), his/her status is called Accounted with respect to each of the Products in that Set. The corresponding Set is termed 'Accounted_Set' for the Y customer, who is having a status of Ya with respect to that Accounted_Set and Products included in this Set.

When a Y customer is not counted as holding (or using or blocking) a unit of capacity of the Products in a Set (IPS or OPS), his/her status is called Awaiting with respect to that Set and each of the Products in the set. The corresponding Set is termed Awaiting_Set for the Y customer and the customer is Yw with respect to that Awaiting_Set and Products included in this Set. At any given time, a customer may (or may not) be accounted to only one Set and is awaiting in the rest of the related Sets.

The term "AC" refers the available capacity of a Product and is defined as: $AC=C-N$, where N is defined as the sum of N type of customers.

The term "EAC" refers to the effective available capacity of a Product and is defined as: $EAC=AC-YA$, where YA is the number of customers who are of Ya status in that Product.

The term "Remove_Y" refers to a recursive algorithm for which the necessary parameters are defined as follows: input parameters: Collection of ParentY (or COPY, in short), Collection of Parent Product (or COPP, in short), Caller_Y, Initiator_Product, Initiator_Y, Benefit; and output parameters: a Y_Series collection. Definition of all the parameters are given below.

The term "Collection of ParentY" (or COPY, in short) refers to a collection of Ya customers for which the Remove_Y algorithm has already been called within a cascade of Remove_Y calls. The corresponding customer is referred to as ParentY.

The term "Collection of Parent Product" (or COPP, in short) refers to a collection of Products for which the Remove_Y algorithm has already been called within a cascade of Remove_Y calls to generate Capacity. The corresponding Product is called Parent Product.

The term "Caller_Y" refers to the Ya customer, which is to be shifted from its Accounted_Set to Awaiting_Set by calling the Remove_Y algorithm.

The term "Initiator_Product" refers to the Product from which Caller_Y is to be shifted by using the Remove_Y algorithm to generate capacity.

The term "Initiator_Y" refers to a customer whose wants to capture a unit of capacity of the Initiator_Product, and thus, derives the need to create its capacity by using the Remove_Y algorithm to shift the Caller_Y from the Initiator_Product.

The term "Benefit" refers to a benefit that the company may realize by creating capacity in Initiator_Product.

The term "ChildY" refers to a Y customer who was shifted in the cascading route of Remove_Y calls. A ChildY element consists of the following entities: Collection of Initiator, Initial_Accounted_Set, Final_Accounted_Set and Cost of ChildY.

The term "Collection of Initiator" (or COI, in short) refers to a collection of one or more members, where each member in the collection consists of the following: Initiator_Product and Initiator_Y, where said Initiator_Y derives a need to create capacity in said Initiator_Product.

The term "Initial_Accounted_Set" refers to the Set where the ChildY is accounted before he or she is shifted in the Remove_Y process.

The term "Final_Accounted_Set" refers to the Set where the ChildY is accounted after being shifted by the Remove_Y algorithm from the Initial_Accounted_Set.

The term "Cost of ChildY" (or CCY, in short) refers to the cost to shift the current ChildY from its Initial_Accounted_Set to the Final_Accounted_Set.

The term "Series_Element" refers to a feasible route generated when Remove_Y is called to shift a Caller_Y from its Accounted_Set to its Awaiting_Set. A Series_Element consists of the following entities: Collection of ChildY (COCY), Collection of End_Product (COEP); and Cost of the Series_Element (CSE).

The term "Collection of ChildY" (or COCY, in short) refers to a collection of all the ChildY, which have been shifted by the Remove_Y algorithm within a Series_Element.

The term "End_Product" refers to a Product with enough units of EAC to accommodate a Caller_Y. The cascading route of Remove_Y reaches one end when it approaches an End_Product. An End_Product consists of AC and Collection of Ya (or COYA, in short). COYA includes all the Ya that are accounted in the End_Product (includes existing Ya and ChildY that are shifted to End_Product).

The term "Collection of End_Product" (or COEP, in short) refers to a collection of all the End_Products involved within a Series_Element The term "Cost of the Series_Element" (or CSE, in short) refers to the total of CCY of all the ChildY associated with a Series_Element.

The term "Series" refers to a collection of the Series_Elements. The term "Y_Series" refers to a collection of the Series_Elements, which is returned as output by the Remove_Y algorithm. The term "P_Series" refers to a collection of the Series_Elements at the Product level. A P_Series collection is obtained from the Y_Series collections of all Ya in the Product. The term "S_Series" refers to a collection of the Series_Elements at the Set level.

As used herein, the term "processor" includes, without limitation, any one or more devices for processing information. Specifically, a processor may include a distributed processing mechanism. Without limitation, a processor may include hardware, software, or combinations thereof; general purpose digital computing elements and special purpose digital computing elements and likewise included. A single processor may perform numerous functions and may be considered a separate processor when implementing each function.

General Method Description: Kernel

Referring now to FIG. 1, there is shown a high-level flowchart style diagram of a method to achieve the optimally customized sale of goods or services to "close the gap." It involves the following steps or acts: In Act 1.110, certain inputs are captured, including customer dynamics and important value segments, their demand, preferences, flexibilities and associated relative utilities. Company economics and important economic factors such as, for example, costs, capacities and constraints are captured in Act 1.120. The customer information from Act 1.110 and the company economics from Act 1.120 are then in Act 1.130, "integrated" in a way that will permit optimization of value for both the company (e.g., its profitability) and customers (e.g., their individual and collective purchase utilities). In Act 1.140, value options are formulated that permit the capturing of individual customer preferences in way that can be used in the optimal customization of the sale process illustrated. These same steps can be used in one or more permutations or combinations or iteratively.

At a high level, the system is operated and the method of FIG. 1 is executed to (1) to dynamically interact with the customers to determine detailed customer demand for the product and options, (2) receive a real-time assessment of company economics, i.e., capacities, constraints, and costs, (3) optimize across demands and preferences of all customers, and company economics, and (4) formulate value options for customers.

To take advantage of this system, a company has to obtain information about customer demand and preferences before (and/or during) a purchase, in a structured manner that can be easily understood and translated into satisfaction for customers and also can be used to optimize internal operations for companies. This data can then be integrated with the company's internal resources and capacities to enhance and improve its operations. A company can "optimally customize" its products and processes to enhance the value for customers, while simultaneously maximizing its business profitability. Customers also benefit from the fact that they spend less time researching products, can be assured that their priorities are known in case of change or contingency events occurring, can enhance their purchased products/services and get more perceived value for their purchase price.

Figure 2:
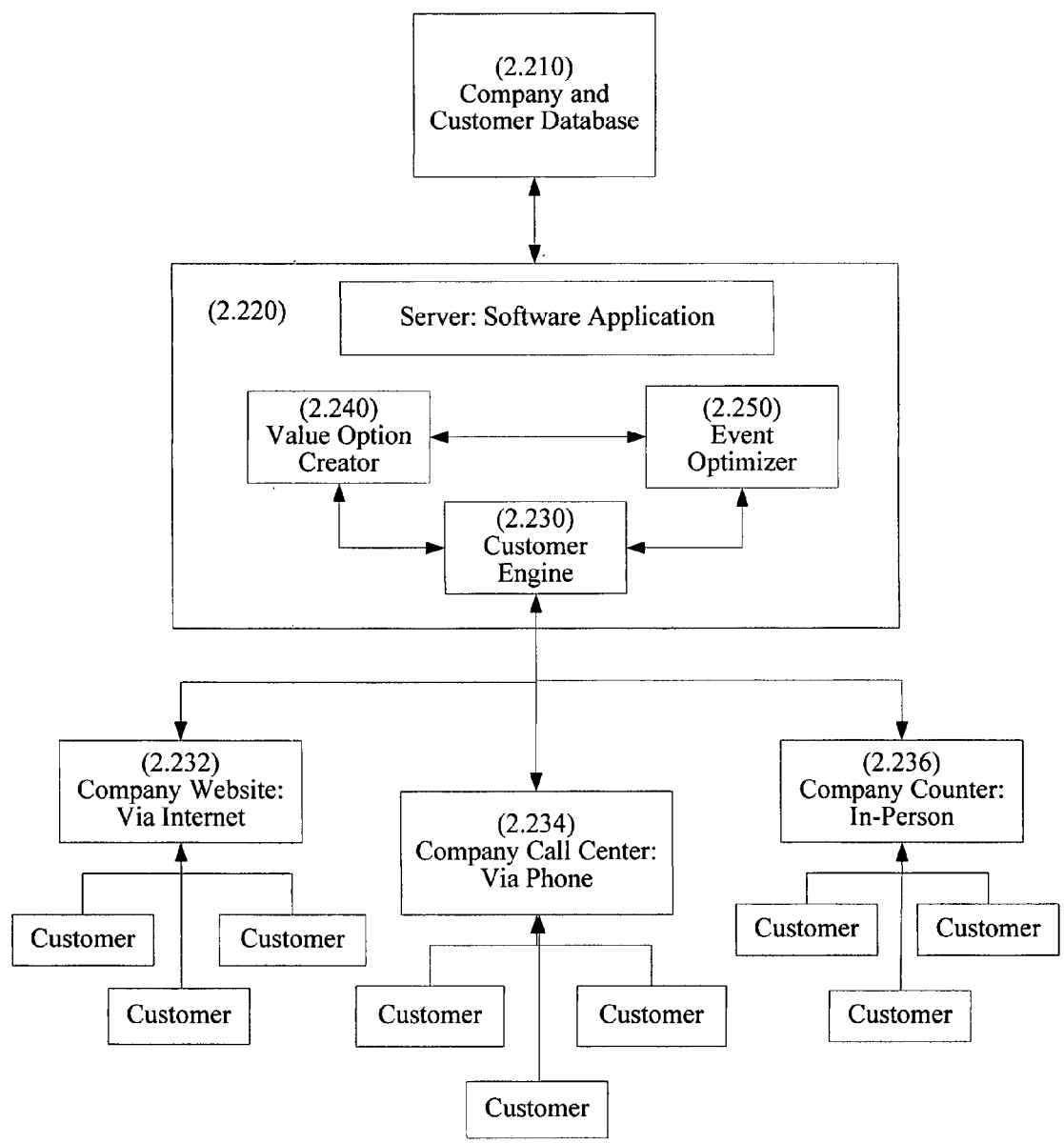
FIG. 2 is a block diagram of a system as taught herein for practicing the discussed method.

At a high level, a block diagram of a typical system for implementing this methodology is shown in FIG. 2. The data for driving the system, from both the customer side and the company side, is stored in a database shown in Box 2.210 (or multiple databases), which may be of any suitable database design and may be a commercially available database product configured for this application. The "heart" of the system is a platform, typically one or more servers, shown in Box 2.220, which provides the processing capability to implement three modules, shown in Boxes 2.230, 2.240 and 2.250. The Customer Engine module (shown in Box 2.230) controls the interfacing with the customer via whatever media are selected by the company. For example, the company may use one or more of a web site (shown in Box 2.232), a call center (shown in Box 2.234) and/or live customer service "counter" personnel (shown in Box 2.236) (e.g., at a point-of-sale location). The Value Option Creator module (shown in Box 2.240) is a software program(s) that performs the functions of allowing a company to design, create and configure different value option frameworks and corresponding value options that can be offered to customer to capture their needs and preferences in detail and in a way that can be used to optimize across company operations. The Event Optimizer module (shown in Box 2.250) comprises a program or programs that (a) monitor company business performance and provide information about business data (such as available capacities, costs, sales, inventory and so forth) as well as other relevant factors that may vary from installation to installation; and (b) monitor for the occurrence of events related to the value options which customers have bought, and which then execute pre-designed protocols when a related event occurs (e.g., a re-booking algorithm is activated when a flight cancellation event occurs).

Process to Use the New System and Method in an Industry

The following sections describe in detail how this system and method may be used in any particular industry. Industries and companies best suited to use and benefit from the invention are those with large numbers of customers and wherein those customers would have varied utilities for aspects of a product offering, especially if those aspects were unbundled and some made optional.

To get maximum benefit from the herein disclosed system and method requires the use of human judgment. It should be emphasized, therefore, that there is shown a "platform" technology and a variety of non-exhaustive ways of using the platform. Those who make use of this platform in their companies will make decisions and exercise their judgment so that each instantiation or practice is likely to be unique, at least to a degree. In addition to disclosing the platform, via the given examples we also disclose certain instantiations of the system and method which themselves are believed to have value but the system and method are not intended to be limited to these instantiations except as they may be expressly claimed.

Using the discussed system and method in any industry involves a two-staged approach. The selection of an industry is assumed. The industry provides a context. Starting in FIG. 3, in the first stage of the method, a set of value option frameworks (to be associated with a company's offerings) is created. It is immaterial, for the current discussion, how one obtains the information used to construct a value option framework. Implicitly or explicitly, a value option framework reflects some sort of analysis of customer dynamics and company economics. Thus, to construct a value option framework for a particular type of transaction, one needs to arrive (however one chooses) at a list of components the customer may select when buying a product, and their prices. For example, in a simple case there may be delivery options and warranty options and maybe training options. Each option is assigned a price, whether statically, quasi-statically, or dynamically. Static pricing is assigned at very infrequent intervals. Dynamic pricing (determined by an algorithm invoked by the Event Optimizer is assigned either on an on-demand basis for a particular transaction or at frequent intervals so as to yield pricing based on near (i.e., quasi) real time company performance data. Quasi-static pricing would be somewhere between the former two situations, such as pricing done quarterly or monthly based on then-current information about the company. Pricing may involve running financial analysis based on known data to optimally set the conditions and pricing in the value option framework associated with the company offerings.

Figure 11:
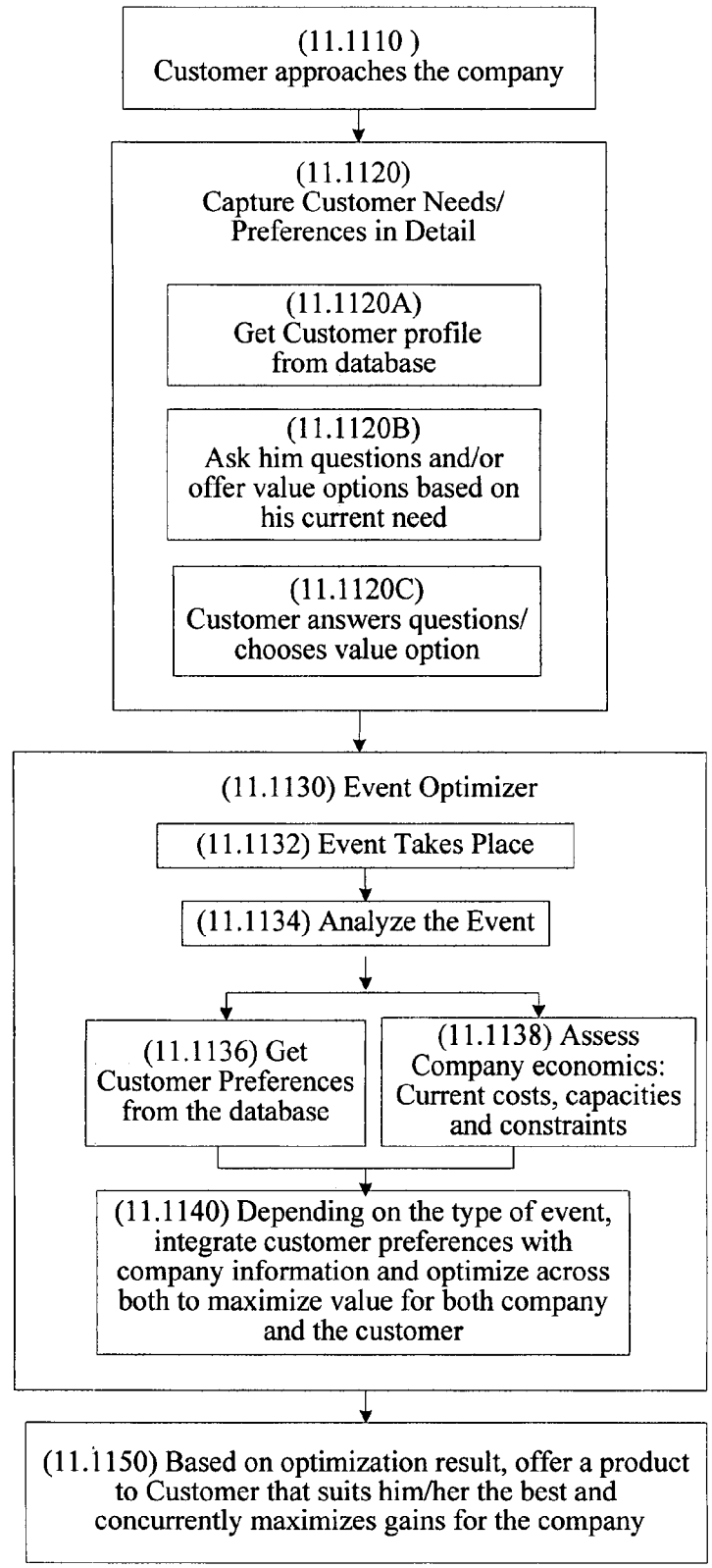
FIG. 11 is a flow chart of a process to implement value option framework.

The second stage, as depicted in FIG. 11, involves a detailed interaction with the customer who has approached the company (Act 11.1110). Approaching the company may involve accessing a web site or calling a call center or any other way of commencing a transaction. The interaction (Act 11.1120) occurs in a structured format to capture the customer's expressed needs, preferences, flexibilities and relative utilities. As a preliminary matter, it is possible the customer may previously have registered a profile containing default selections of needs, preferences, etc. So, the database 2.210 is interrogated to determine whether a profile exists and, if so, to retrieve it (Act 11.1120A). The customer is presented with questions and/or value options (Act 11.1120B) and in response he/she supplies answers and select options that suit him/her (Act 11.1120C).

The second Act in the second stage is executed by the Event Optimizer module 2.250. A summary of the algorithmic flow of the Event Optimizer presented in Box 11.1130. The Event Optimizer is alerted to, or detects, the occurrence of an event (shown in Box 11.1132 and 11.1134) for which an event-response procedure (program) has been pre-stored. Each event-response procedure is designed by the company to effect selected action(s) in response to detection of its corresponding event. Depending on the nature of the event, an event-response procedure may invoke an optimization algorithm (shown in Box 11.1140), assess the company operations (possibly in real time) and analyze, across company operations (shown in Box 11.1138) and customer information (shown in Box 11.1136), potential results to determine results that concurrently maximize the benefits for the company and the customer. The optimization may or may not modify the company product offerings to better suit the customer while simultaneously maximizing the company operations (shown in Box 11.1150). Both of the stages and the steps involved will now be discussed in detail.

First Stage Formulation of Value Option Framework

Figure 3:
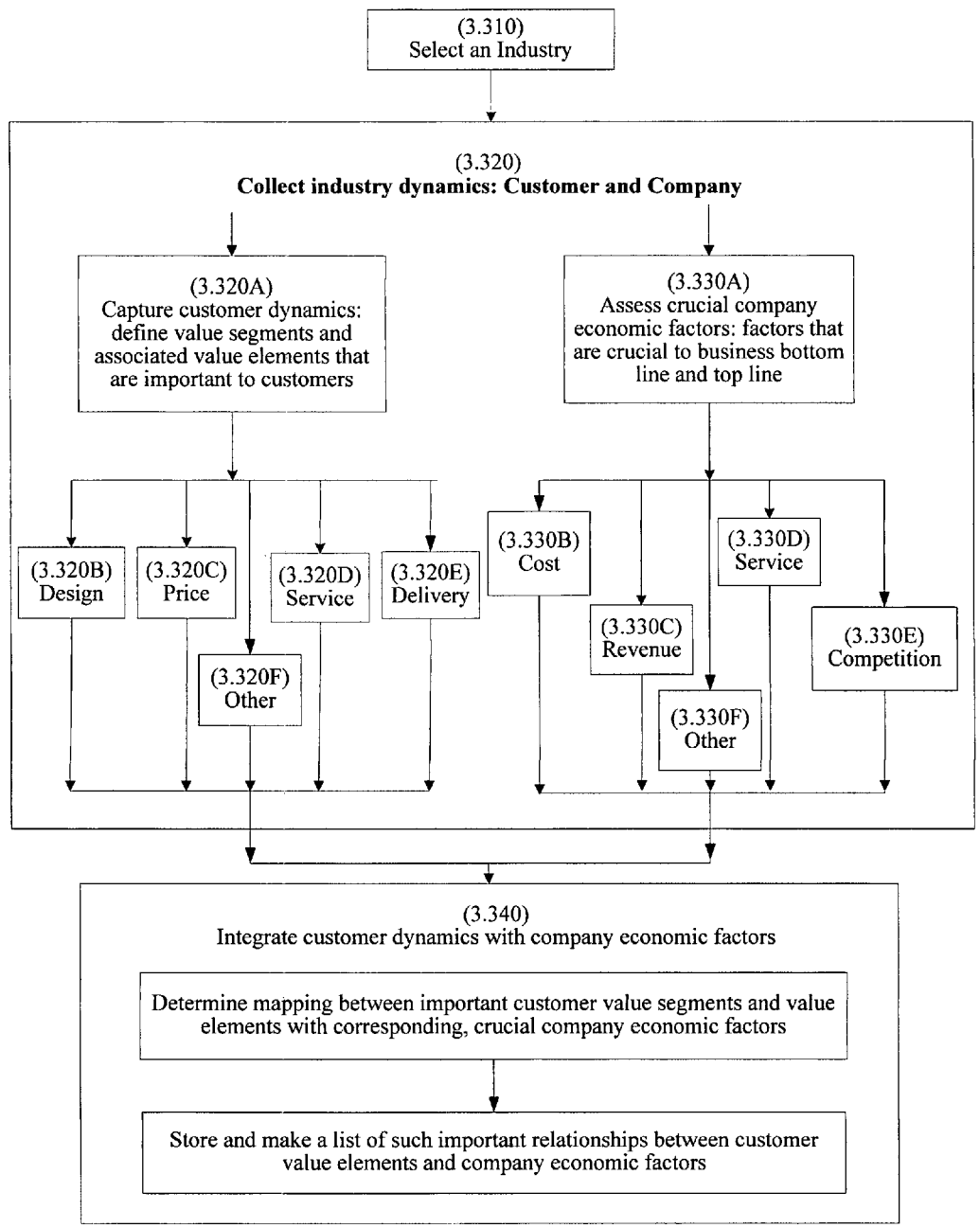
FIG. 3 is a flow chart of a method to create a value option framework showing collection of industry and customer dynamics.

Turning to FIG. 3, it will be assumed that the inventive method and system are to be adapted to a particular industry or company. One may develop a generic instance for an industry or particularize it to an individual company. Some considerations will inherently be generic to an industry. Thus, to formulate a value option framework, one begins by selecting the industry. Act 3.310. Next, the customer and company dynamics are captured. Act 3.320. To capture customer dynamics, one needs to understand the value segments and value elements that are important for the customer. To assess company dynamics, one needs to assess the economic factors that are crucial to the company's profitability and performance.

(1) Capturing Customer Dynamics—Act 3.320A

Figure 4:
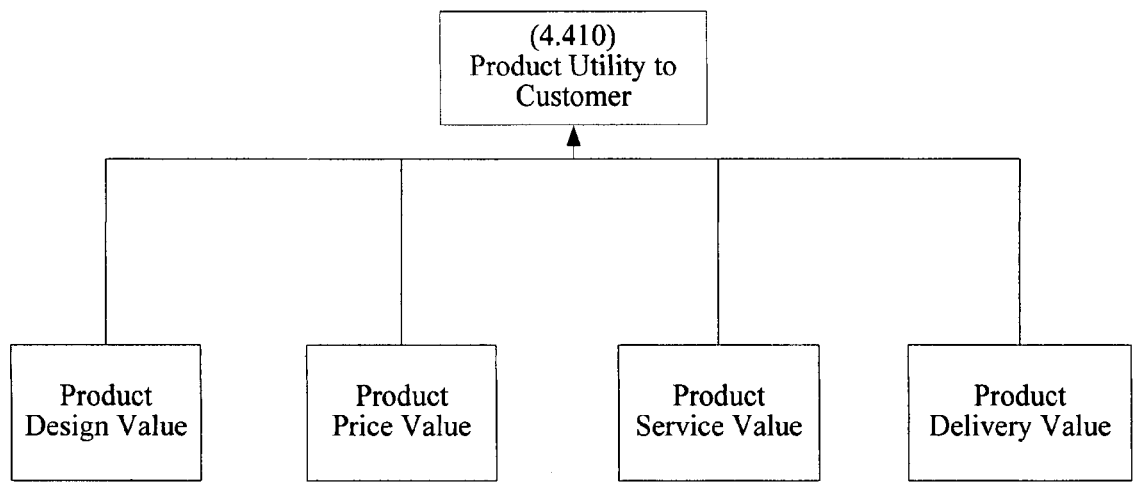
FIGS. 4 and 5 are diagrammatic illustrations of the relationship between overall product utility and contributions as perceived by a customer.
Figure 5:
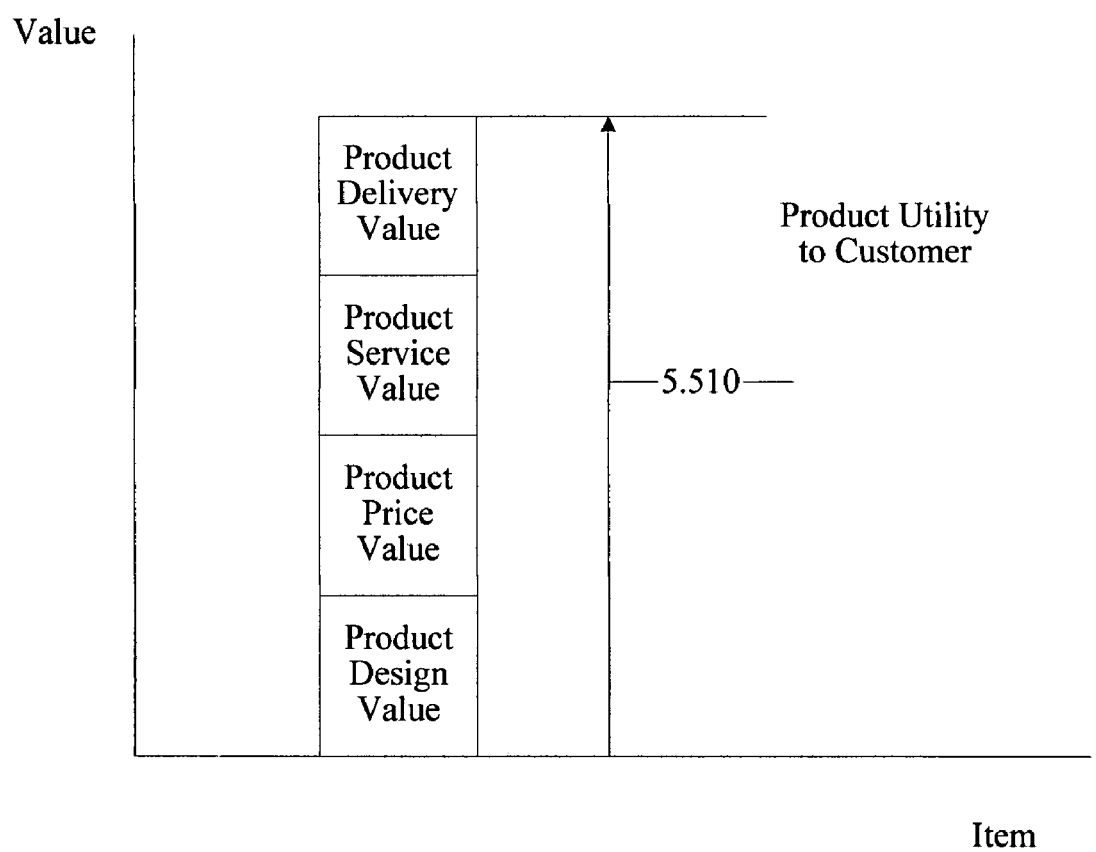

A customer derives certain utility by purchasing a particular product. The purchase utility value, typically, can be separated into many value segments. Customers value these segments (which include core qualities of the offering as well as options and contingent options i.e., options dependent on options) from the perspective of what is important to the customer through the whole buying and usage experience, starting from, searching for a product, placing a particular order and using the product throughout its lifecycle. To go further, it will be helpful to define two terms: value segment and value element. A "value element" is a distinct aspect/characteristic of a product's buying and usage experience that may affect the utility of the product to the customer. A "value segment" is a particular category of such value elements. While value segments may vary from industry to industry and will have to be selected by the individual or team that implements a particular instance of this system and method, for many industries, the four most important value segments are (a) product design value, (b) product delivery value, (c) product price value, and (d) service value. See boxes 3.320B to 3.320E. These value elements are shown in FIGS. 4 and 5, which are simply alternative views of the same information and will be discussed below. It should be noted, however, that these value segments are just provided for illustration purposes. Industries that can benefit from the system and method of the invention may have more or fewer than the listed value segments and/or a different list of value segments. Each value segment may have one or more value elements. Further, the actual number of value elements in each value segment may vary with the industry, the level of detail in the business model, and even the customers. The system implementer can choose the number of value elements in each value segment.

Total Value for Customers

A customer derives unique value from each value segment; the total utility value of the product to a customer (shown in FIGS. 4 and 5) is the combination of values derived from each of the value segments. A customer would benefit the most if the total expected value of his/her utility were maximized. Another important aspect to note is that every customer also has an acceptable range (e.g., equals, exceeds, or disappoints, minimum or maximum) for each individual parameter value. Even if a particular product has high overall value, a customer may not desire the product if it scores below the minimum level (i.e., low enough to reject the product) for any one or more of the value segments or value element. A company may use any method for calculating utility.

Concept of Tiered Value Perception

Figure 6:
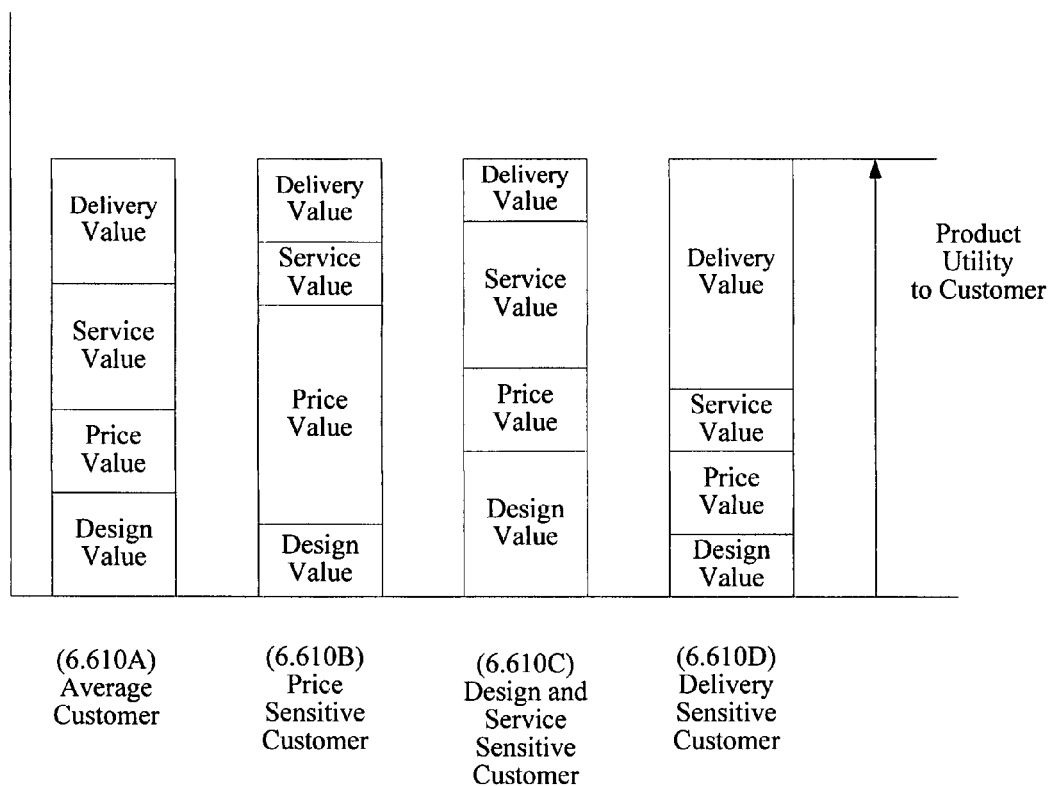
FIG. 6 is a diagrammatic illustration of the perceived utilities of a product by four customers.

Different customers may derive different utility from different aspects of the same product. As shown in FIG. 6, four different customers 610A-610D may compute to the same (total) overall utility even though they assign different utility values to each of the value segments. For example, a human resource manager, who has scheduled interviews with candidates, would value the timely ticket to his destination much more than a vacationer, who may be flexible. Consequently, the company needs, in some way, to define and learn about these value parameters for individual customers, along with relative preferences and utilities associated with each parameter. This will be illustrated below using the previously listed value segments. A web-based questionnaire is one excellent way to collect this information. The collected information is then stored in a customer profile or Itinerary in a database, such as database 2.210.

(a) Product Design Value

The "product design" segment refers to the value elements relating to the design features and characteristics of a product that the customer actually buys. Each customer places his or her own values on these different design value elements.

(b) Product Delivery Value

The "product delivery" segment refers to the value elements relating delivery or time-frame related aspects like, for example, lead-time and delivery schedule from the time the customer places an order. Again, each customer may place his or her own values on each of these value elements. The company collects detailed information on the product delivery needs of the customers.

(c) Product Price Value

The "product price" segment refers to the groups of value elements related to the price a customer pays to buy/use a product. Value elements in this segment may include total product price, delivery costs, warranty or after-sales service costs, and any other relevant costs incurred by the customer in buying and using the product. Some times, addition of all these price elements is also termed total cost of ownership (TCO). A customer derives maximum price value by paying the most desired price for a product. Any price paid either lower or higher than the desired price may change the value the customer gets from, the price of the product. The company collects information on the product price needs of the customers.

(d) Service Value

The "service value" segment refers to a group of value elements related to the service a customer receives from pre-sales and post-sales services offered by the company to facilitate the use of the products sold. Pre-sales services include services provided by a company to help its customers decide and choose products based on their requirements. Post-sales or after-sales service refers to the warranty, product support, maintenance support and other relevant activities that may help a customer to use the product effectively. A customer will derive maximum service value from a product if the services provided by the company completely match or exceed those desired by the customer. The company utilizing the invention collects information not only on the service needs of its customers, but also on customer preferences on different possible events that might occur during or after the purchase.

Summary of Capturing Customer Dynamics

Based on the method described above, the first Act for a company-user is to establish the value segments and value elements it will present to the customer for the customer's decision. It may establish these value segments and value elements in any way it chooses. An industry expert may choose to avoid such research and, instead to rely on experience.

(2) Assessment of Company Economics

The next Act in the first stage, as shown in FIG. 3, is to assess the crucial economic factors that affect the bottom-line and top-line of the company, Act 3.330A. For example, these factors may include but are not limited to revenues, fixed costs, inventory, available and scheduled capacity, constraints on product availability and total and marginal values for current direct and indirect product (and/or services) costs. For illustration purposes only, FIG. 3 shows the grouping of such factors into five major categories 3.330B-F, including costs, revenue, service, competition and other.

It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Company Economic Factors

A third Act, shown in Box 340 of FIG. 3, is to take the information collected from the previous two steps, analyze this data and find important value segments and elements that directly affect the crucial economic factors for the company. This operation involves creating a mapping between company factors and customer value segments, to establish direct and indirect relationships between the two.

(4) Formation of Value Option Framework

Figure 8:
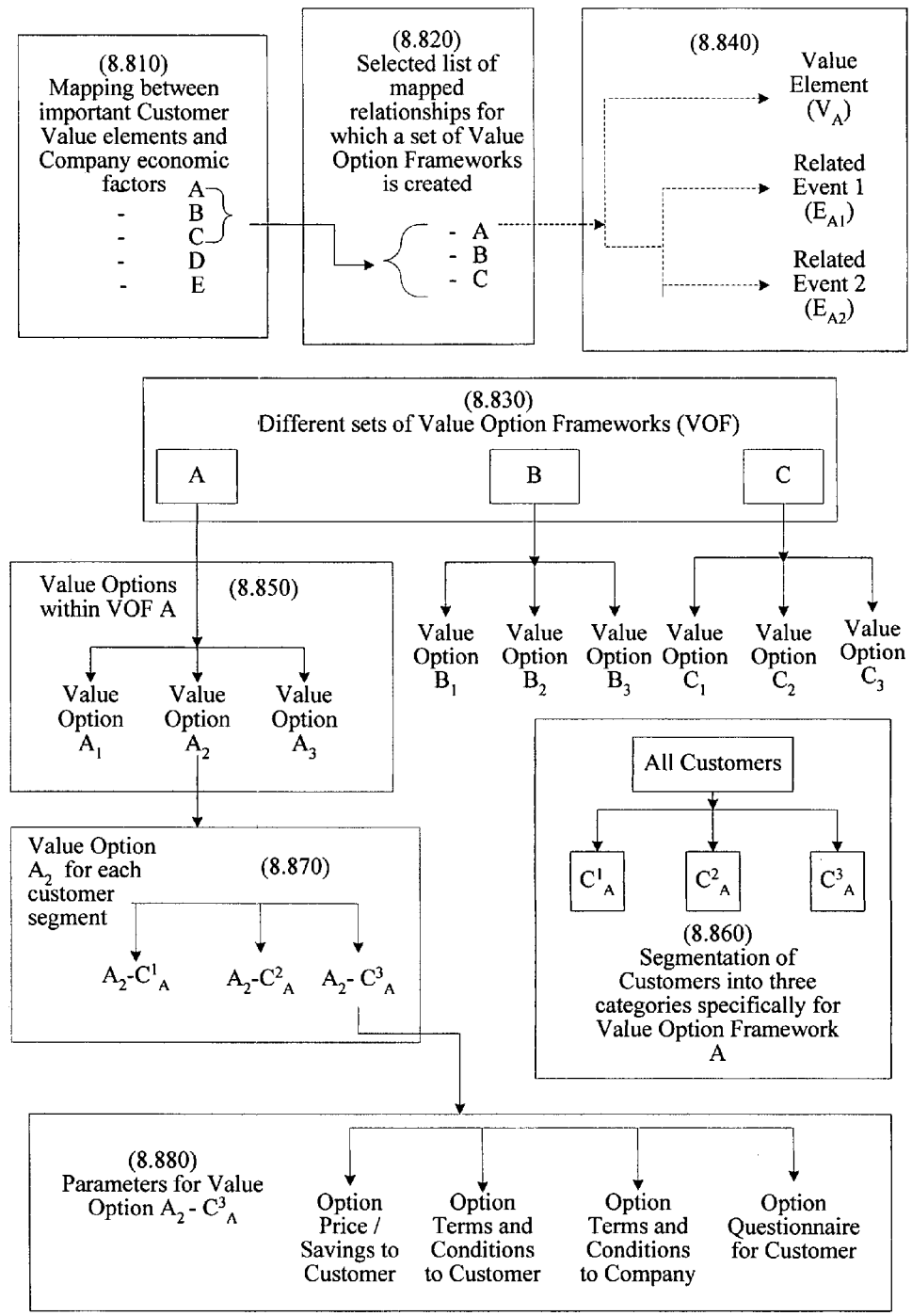
FIG. 8 is a partially-diagrammatic, partially-flow diagram representing the steps of a process for creating a value option framework.

The formation of a value option framework involves certain steps illustrated in FIG. 8. The value option framework is formed around important mapped value elements, allowing capture of detailed individual, customer-level data expressing needs, preferences, flexibilities and relative utilities so as to positively impact the company operations, while simultaneously enhancing the overall product utility for the customer. A value option framework (VOF) must allow the company to capture a customer's demand, preferences, flexibilities and relative utilities at an individual level in a format that can allow that information to be used to produce a cost savings or revenue enhancement for company operations while concurrently enhancing customer utility. The structure of a value option framework is defined in detail later.

The process to create a value option framework is shown in greater detail in FIG. 8. In Act 8.810, the process starts from that list. From this list, the company may select a list of mapped value elements which fulfill the criteria listed above, Act 8.820, and a value option framework is built around those value elements. One could build a value option framework around almost every mapped relationship, so the decision criteria to choose or reject any such relationship is simply pragmatics. It is probably to be desired to limit the number of relationships to keep the value option framework manageable, computationally and otherwise. In FIG. 8, there are three VOFs shown at 8.830, namely A, B and C. The number of value option frameworks shown is for illustration purposes only and could be fewer or more, depending on factors such as the industry selected and user discretion. As explained in detail later, each value option framework is related to a corresponding value element and one or more related event(s). For illustration purpose, in the Box 8.840, value option framework A is related to a value element $V_A$ and two related events, $E_{A1}$ and $E_{A2}$. In most situations, after the initial interaction between the customer and company related to a particular value element, one or more related events (or a series of events) would take place. The structure of a value option framework is defined below in detail.

Structure of a Value Option Framework

Figure 9:
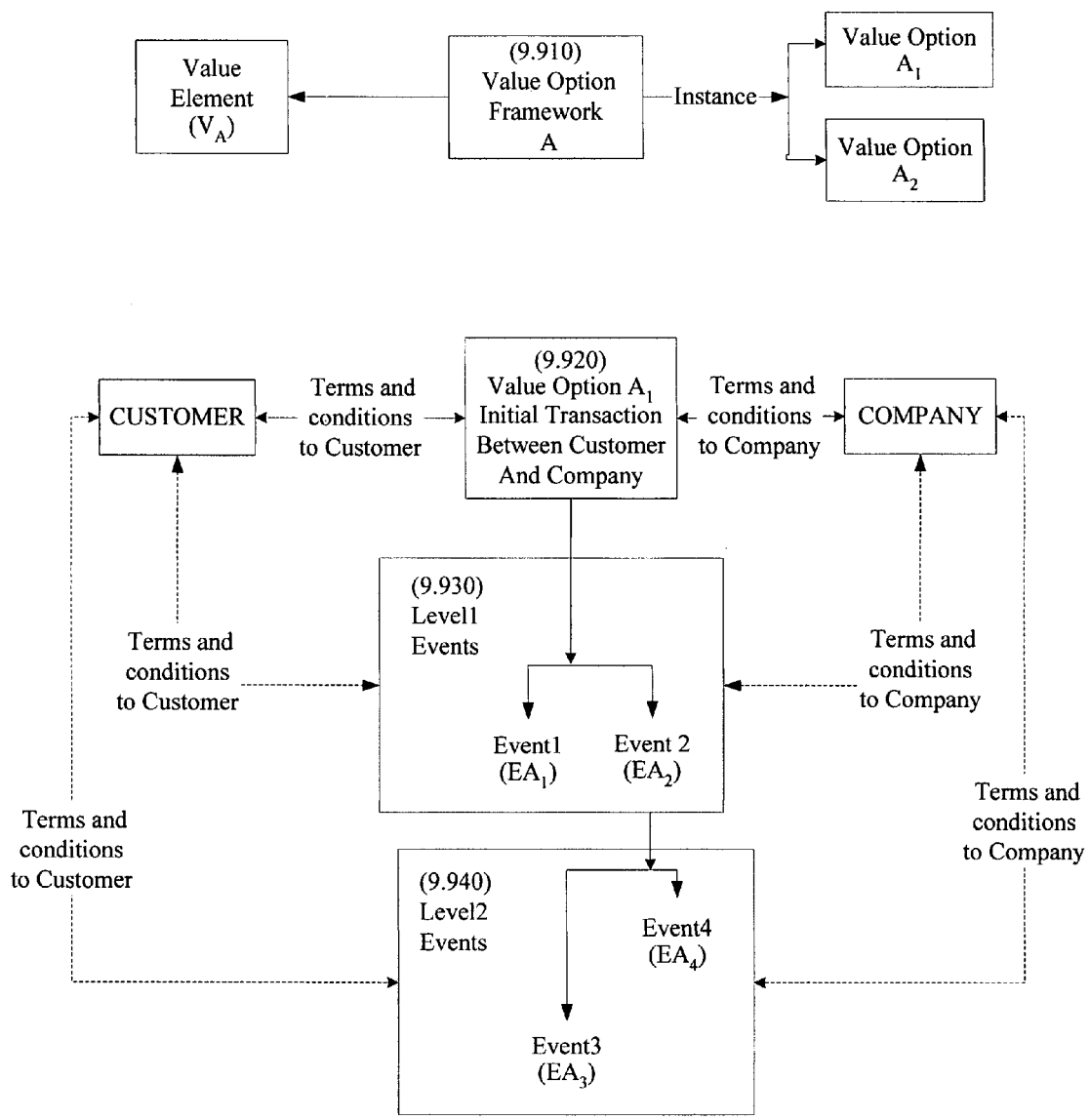
FIG. 9 is a diagrammatic representation of the generic structure of a value option framework.

FIG. 9 defines the structure of a Value Option Framework. The Box 9.910 shows a value option framework A. Every value option framework may be related to one or more value elements. As shown in the Box 9.910, value option framework A is related to value element $V_A$. One can create one or more instances of a value option framework as shown by the two value options ($A_1$ and $A_2$). The Box 9.920 shows the initial interaction between the customer and company where the company offers the value option $A_1$ to the customer. Every value option has an initial costs/savings and other benefits and conditions to the customer; and revenue/costs and other benefits and conditions to the company. The Initial Transaction is successful if the customer selects the given value option. Every successful transaction may be succeeded by one or more related events (or a series of events as shown by the Boxes 9.930 (Level 1 events) and 9.940 (Level 2 events). Just like the Initial Transaction, each event may also have costs/savings and benefits and conditions to the customer, and revenue/costs and benefits and conditions to the company, as shown by the linked arrows from Event $E_{A3}$ to both the customer and company.

The Initial Transaction may consist of one or more acts. One or more products may be selected, at one or more times, before, after, during the Initial Transaction, or any combination thereof. The Initial Transaction or any of the following events may have terms and conditions applicable to the customer, the company, another entity or any combination thereof. These terms and conditions may be set, preferably, to concurrently benefit both parties.

Consider, again, the process of formulating a value option framework. For each value option framework, the company-user also preferably categorizes its population of customers into one or more segments based on one or more criteria. Customer segmentation is based on customer behavior and needs. Individual customers are not necessarily segmented or grouped; a particular customer may fall within different customer segments at different times. It is the customer behaviors and needs that are segmented. To provide an example, in the Box 860 in FIG. 8, all of the company customers are categorized into three customer segments, namely, $C^1_A, C^2_A, C^3_A$ for the value option framework A. The number of customer segments could vary depending on the industry and value option framework, and this method does not put a limit on the number of customer segments. The number of customer segments shown is for illustration purposes only and could be fewer than or more depending on industry selected, value option framework and user discretion. Further, a company may segment its customers differently for different value option frameworks or they may use the same customer segmentation for a few or all value option frameworks. The customer segmentation is done because the customer behavior can be subdivided into different groups and customer showing similar behavior could be dealt in a similar fashion.

After formulating one or more sets of value option framework(s) around the selected value elements, the user creates one or more value options for each set of value option frameworks. In FIG. 8, the value options $A_1$, $A_2$ and $A_3$ are created in box 8.850 for the value option framework A. The number of value options shown is for illustration purposes only and could be fewer or more depending on industry selected, value option framework and user discretion.

For each value option created, the user defines parameters for option pricing, benefits and conditions to the customer, as well as revenue, costs and option conditions to the company, under which the option would be used. If necessary, a user may also need to create a separate questionnaire to be completed by customers, pertaining to each value option.

There may or may not be any payment transaction related to the Initial Transaction and/or other event related to the Initial Transaction and/or Value Option Framework. A price may include, but is not limited to, a set of one or more Product Prices, a set of one or more option prices, any other price or any combination of the above. The price may consist of a monetary value or a soft value (e.g., benefits, coupons or exchange of another service) or other consideration. The price may be fixed or variable, with or without bounds. The company may set permissible range(s) or boundary limit(s) within which the price can vary, or it may offer the customer a set of prices to choose from. Since price conditions may depend upon various factors, which may or may not be variable, the same may be decided at anytime. The price conditions may be determined by the customer, the company, a third entity, or any combination thereof, at one or more times.

As shown in FIG. 8, the user creates value options for each particular customer segment. Act 8.870. In FIG. 8, the structure for value option conditions for Value Option $A_2$ tailored to customer segment $C^3_A$ is shown in the Box 8.880. Similarly, the user creates conditions and parameter values for each value option for each customer segment.

For one type of value option, one or more parameters for different customer segments may be the same. Across multiple value options (within the same value option framework), one or more parameter values may be the same for one or more different customer segments. It is possible that one or more value options may not be valid for a particular customer segment or a sub-segment within a customer segment.

Figure 10:
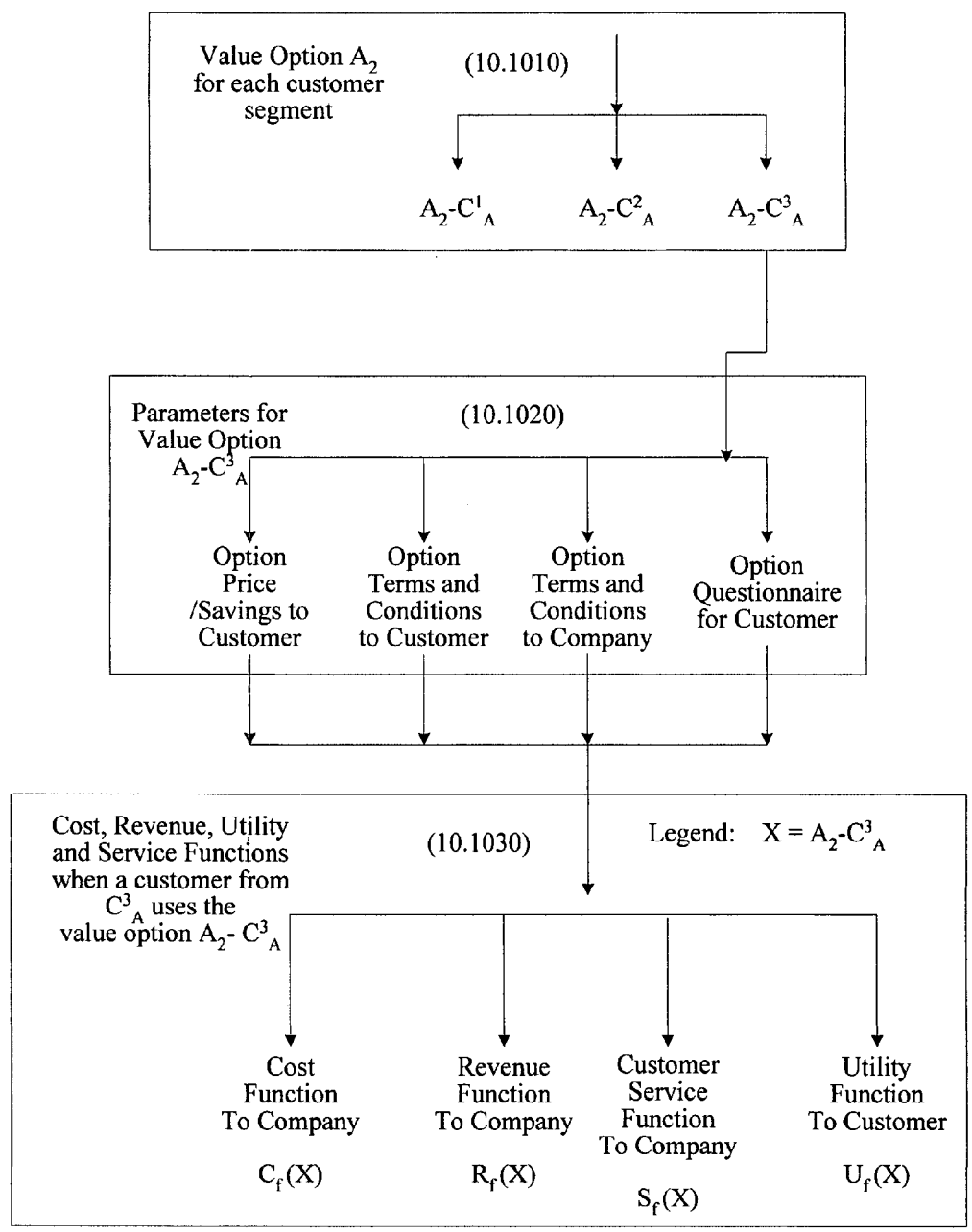
FIG. 10 is a diagrammatic illustration showing creation of a value option framework indicating how cost, revenue, utility and service functions.

Turning to FIG. 10, for each value option created for a specific customer segment, the user creates the following functions as shown in the Box 10.1030. (The number and type of functions shown is for illustration purposes only and could be fewer than or more depending on the industry selected, the value option framework and user discretion.) First, there is a Cost Function to the company, $C_f(X)$. This function expresses the cost elements to the company related to usage of a specific value option. For illustration purposes, FIG. 10 displays the cost function $[C_f(A_2-C^3_A)]$ to the company when a customer (within customer segment $C^3_A$) selects the value option $A_2$. This function expresses the costs to the company initially when the user selects the value option A2, and also for each of the related events if and when those related events take place. Next, there is a Revenue Function to the company, $R_f(X)$. This function expresses the revenue elements to the company related to usage of a specific value option. For illustration purposes, FIG. 10 displays the revenue function $[R_f(A_2-C^3_A)]$ to the company when a customer (within customer segment $C^3_A$) uses the value option $A_2$. This function expresses the revenue to the company initially when the user selects the value option A2, and also for each of the related events if and when those related events take place. Then there is a Customer Service Function to the company. This function expresses the customer service function to the company related to usage of a specific value option. For illustration purposes, FIG. 10 displays the customer service function $[S_f(A_2-C^3_A)]$ to the company when a customer (within customer segment $C^3_A$) uses the value option $A_2$. This function expresses the customer service level a company provides initially when the user selects the value option $A_2$, and also for each of the related events, if and when those related event take place. Finally, there is a Utility function to the customer. This function expresses the utility to the customer from use of a specific value option. For illustration purposes, FIG. 10 displays the utility function $[U_f(A_2-C^3_A)]$ to a customer (within customer segment $C^3_A$) when he or she uses the value option $A_2$. This function expresses the utility to a customer initially when he/she selects the value option $A_2$, and also for each of the related events if and when those related events take place.

To obtain the overall costs, revenue and service benefit for a particular value option framework, all the individual functions for each value option-customer segment combination are combined to determine the total overall costs and revenue benefits to the company and the service and utility benefits to customers. Benefits from all the value option frameworks can be simply added together to calculate total overall benefit values to the company.

(5) Optimization of Value Options

Figure 7:
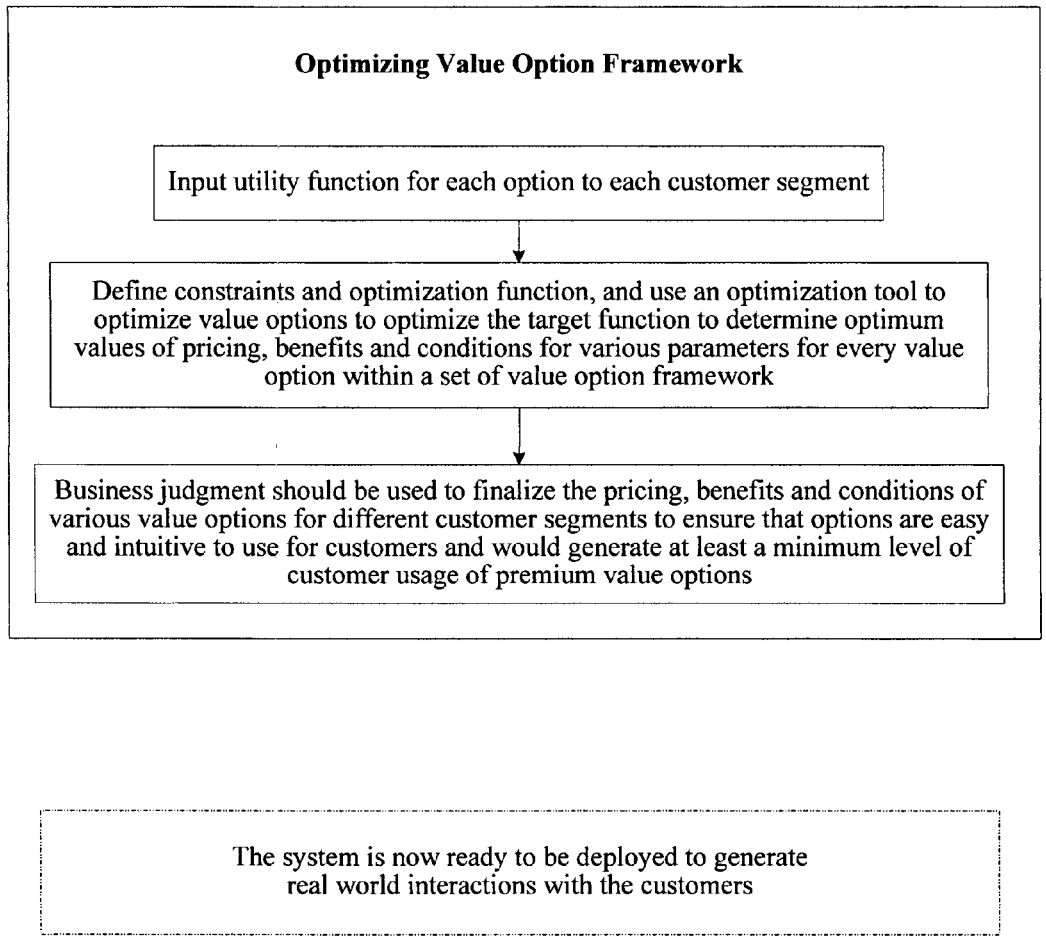
FIG. 7 is a flow chart illustrating optimization of a value option framework.

As an optional last Act in the first stage, as shown in FIG. 7, a financial analysis may be performed on the value option framework using the existing company and customer data to determine optimum pricing values and conditions of the value options. In other words, a company using the system and method can build utility functions based on cost and benefit equations of various options, and then can optimize across any one or combination of such functions. Any standard non-linear constrained optimization software tool can be used to run iterations to determine optimized pricing and benefit values for different value options. Using standard sensitivity and scenario analysis techniques, a user can run what-if scenarios to determine the robustness of the value option framework. It is not necessary to perform this optimization to generate benefit from the new method and system taught above. However, performing optimization at this level may tend to increase the benefit derived.

Second Stage: Using Value Option Framework

After completing the first stage of the method, the user has been able to create important value option frameworks and specific value options within those frameworks. The user has also segmented customers to be associated with each specific value option that may be applicable to each customer segment. The company is fully prepared now to use a structured format consisting of value options and questionnaire to interact with its customers in real time to generate benefits for both customer and company.

The second stage of the new system and method, as depicted in FIG. 11, involves using the value option framework to interact with the customer to capture his or her requirements in detail. Once the customer selects a particular option, the system moves to the Event Optimizer stage, 11.1130, where the system reacts based on the event that may take place. The Event Optimizer, depending on the event, invokes an optimization algorithm, assesses the company operations in real time and optimizes across company operations and customer information to produce results that concurrently maximize the benefits for the company and the customer. The optimization may or may not modify the company product offerings to better suit the customer while simultaneously maximizing the company operations. Both of these steps will now be discussed in detail.

1. Dynamic Interaction to Determine Customer Demand in Detail (Act 11.1120)

In this Act, the company interacts with its customers in a structured format asking questions and/or offering value options. Preferably, this interaction occurs using a web-based data collection system. As stated above while an Internet based interaction is probably the most cost-effective approach to data collection, other methods may be employed, if preferred, or a combination of methods may be used.

On a browser, which accesses the seller's (i.e., company's) web site, a series of questions are presented to the customer and the customer supplies answers. These questions may also present value options and ask the customer to answer and select the options that suit them the best, enabling the company to determine detailed preferences and flexibilities in customer needs. The questions/value options are supplied from the database 2.210 based on the value option framework created in the first stage to deal with different customer segments.

2. Event Optimizer

Figure 12:
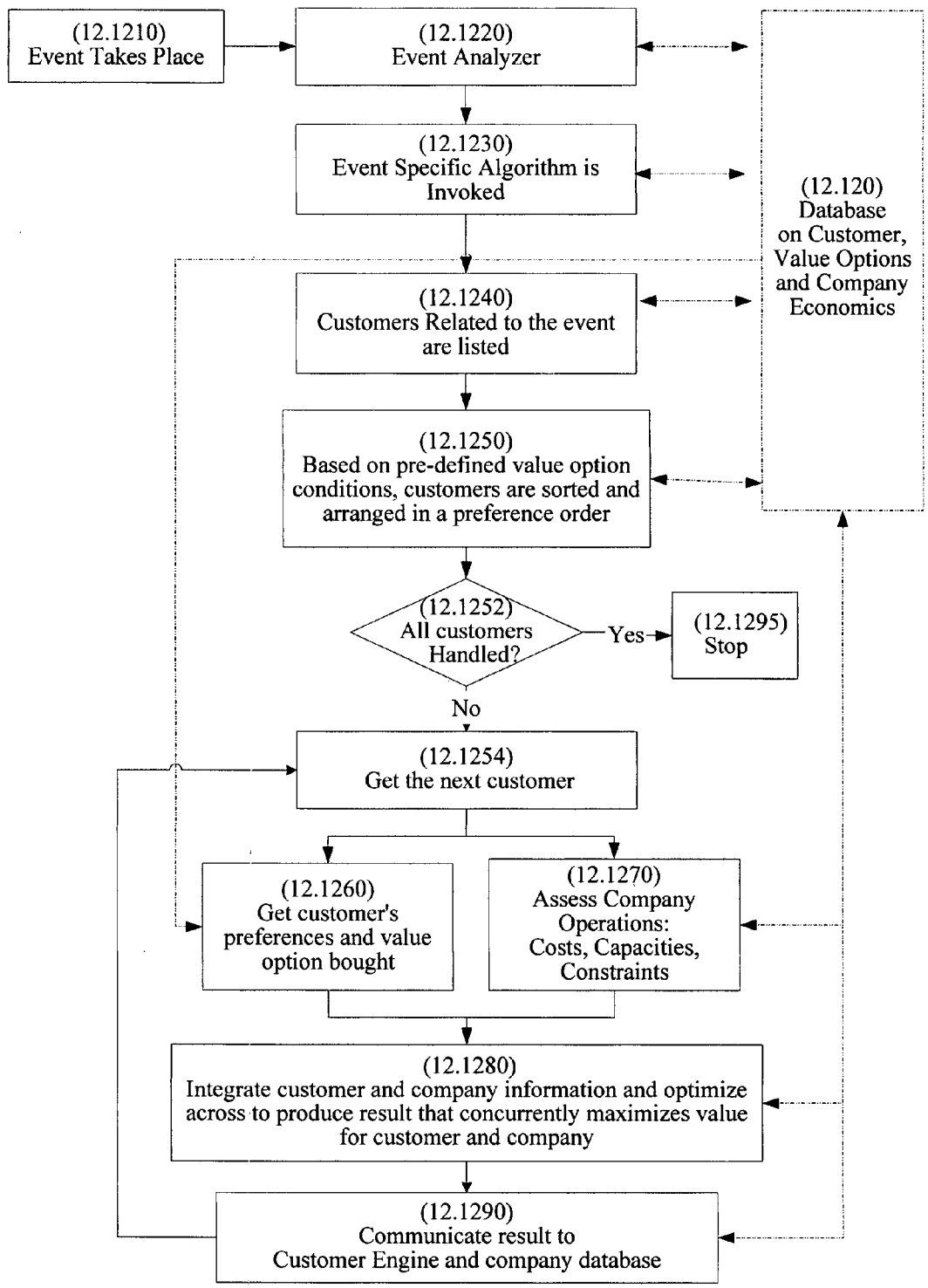
FIG. 12 is a diagrammatic illustration showing generally how an event is processed by the system and method shown, to fulfill a company's obligations to its customers as shown herein, delivering optimized results to the company and the customers.

Once the customer selects a value option, the system goes to the Event Optimizer phase where different steps are executed depending on the event that may occur. The event(s) is(are) related to the value option selected in the first Act. Turning to FIG. 12, the typical Event Optimizer architecture is shown. An Event Analyzer 12.1220 is a module that receives notifications of events and notes when a monitored event occurs. Event Optimizer analyzes 12.1210 the event and invokes an optimization algorithm specific to the event that is detected. Using that algorithm, the Event Optimizer collects the information on related customers and assesses the company operations in real time. A third Act takes the information collected from the previous two steps and uses predetermined criteria to optimize company operations along with customer demand. In this Act, the various scenarios are generated which optimize the total product value for the customer and profits and gains for the company. More details on the Event Optimizer are provided in the System Architecture section.

A user may create a value option framework, which includes a series of events. In this case, the Event Optimizer, after optimizing the result for the first event, may offer the results to the customer. The customer may or may not accept the results. If the customer does not accept the result, the Event Optimizer may move on to handle other subsequent related events, and may again come back to the customer with more results. This process could be repeated several times depending on industry selected, the configuration and type of value option framework, and customer behavior.

Summary of Second Stage

In the second stage of the new method and system, the company interacts with the customer in a structured format to capture customer needs, preferences, flexibilities and relative utilities in detail. The next stage involves an Event Optimizer as explained above. The customers associated with the event are enlisted and sorted by pre-defined criteria. The Event Optimizer collects customer information from the database and also assesses company operations in real time before integrating this information to produce one or more optimized results that concurrently maximize the benefits for the customer and company.

System Architecture to Use and Implement an Instance of the Method

The system architecture as shown in FIG. 2 may be used to implement the new system and method taught above.

The Value Option Creator allows the user to create and configure different value options that can be offered to the customers to capture their needs and preferences in detail and in a way that can be used to optimize across company operations. The Event Optimizer allows the company to optimize across company operations and customer needs when an event is triggered to provide a product offering that maximizes both customer utility and company profitability. A company would use the Customer Engine to interact with its customers via different channels. Each of these three sections is defined below in detail.

Customer Engine

The Customer Engine provides different interfaces that a company maintains at different channels, which are utilized to interact with the customers. These channels may include, but are not limited to, the company's website via the Internet, the company's call center via phone, and the company's retail outlet via in-person. The Customer Engine enables the company to ask questions and/or offer value options to customers in a pre-configured structured format. The Customer Engine generates its interfaces based on the data stored in the database and populated by the Value Option Creator. The customers provide their responses and select value options that suit them. The Customer Engine then communicates back and stores customer responses and selections in the database. The Customer Engine also may communicate the optimized results to the customer as and when generated by the Event Optimizer.

Value Option Creator (VOC)

The Value Option Creator allows a company to design, create and configure different value option frameworks and corresponding value options that can be offered to a customer to capture his or her needs and preferences in detail and in a way that can be used to achieve optimization across company operations. A company would use the Value Option Creator module to perform some or all of the following:

Develop various value option frameworks based on selected value elements and corresponding company economic factors.

Segment customers by one or more criteria. A customer segment may include one or more customers.

Develop costs, revenue and service functions based on a company's operations prior to using the herein-described system and method. The company may prefer to express cost elements in a real-time (i.e., up to date) dynamic fashion in order to be able to fully assess the profitability or contribution of each product sale opportunity.

Develop various value options within each value option framework.

Configure each value option differently (or keep it the same) for different customer segments. This involves choosing pricing, benefit conditions and the proper questionnaire for each value option for different customers.

Develop costs, revenue and service functions after the user (company) has designed and configured various value option frameworks.

To measure in real time or in quasi-real time the value benefit created for the passenger and/or company by implementing the new system and method in part or in full.

Optimize each value option framework and associated value options to determine optimized pricing and benefit schemes for the value options, in order to maximize the benefit for both the company and customers. What-if scenarios may be run to test the robustness of the value option frameworks' models.

The Value Option Creator (VOC) intakes the cost functions (marginal and total), revenue functions, utility functions, customer segments, capacity (scheduled and available) functions and other economic factor functions of the company. The VOC can be configured to store various customer value segments on which a user may want to build value option framework and associated value options. A user can also enter the constraints and ranges to perform pricing optimization to determine optimum pricing and the benefits of various options.

Ideally, a user may be able to create a Value Option Creator that is industry and company-independent and can be used in several industries. Due to time and resource constraints, however, it is perfectly satisfactory for a user to build a less scalable and flexible industry-specific Value Option Creator.

Event Optimizer

The Event Optimizer allows the company to optimize its "bottom line" across company operations and customer needs, when an event is triggered. This is achieved by providing a product offering that maximizes both customer utility and company profitability. A suitable system architecture (i.e., overall flow) for the Event Optimizer in shown in FIG. 12. The following describes each Act in detail:

The Event Optimizer may start its functioning when a particular event is triggered (i.e., occurs and is detected at the time of purchase or later), Act 12.1210. The Event Analyzer (12.1220) analyzes the type and category of the triggered event by matching it with the list of events listed in database 12.210. Once the event type is determined, the Event Analyzer searches the database for an optimization algorithm that is associated with the triggered event, and executes that algorithm. (Such algorithms, naturally, have been developed and stored in the database at an earlier time.) The algorithm collects from the database a list of the customers that are associated with the triggered event, Act 12.1240, and sorts them based on pre-defined criteria listed in the value option framework associated with the event, Act 12.1250. The first customer is taken from the sorted list and his or her preferences and value option selection are retrieved from the database. Act 12.1260. The algorithm then makes a real-time assessment of the company operations to get up-to-date costs, capacities and constraints. Act 12.1270. The information collected in the above two steps is then integrated (Act 12.1280) and, based on a pre-defined criteria, the algorithm optimizes across the company information and customer preferences to produce one or more results that concurrently maximize the benefit for both the company and the customer. The results are preferably communicated to the Customer Engine and to database 12.210, Act 12.1290. These steps are repeated until all the customers have been taken care of Steps 12.1252, 12.1254 and 12.1295.

Figure 13:
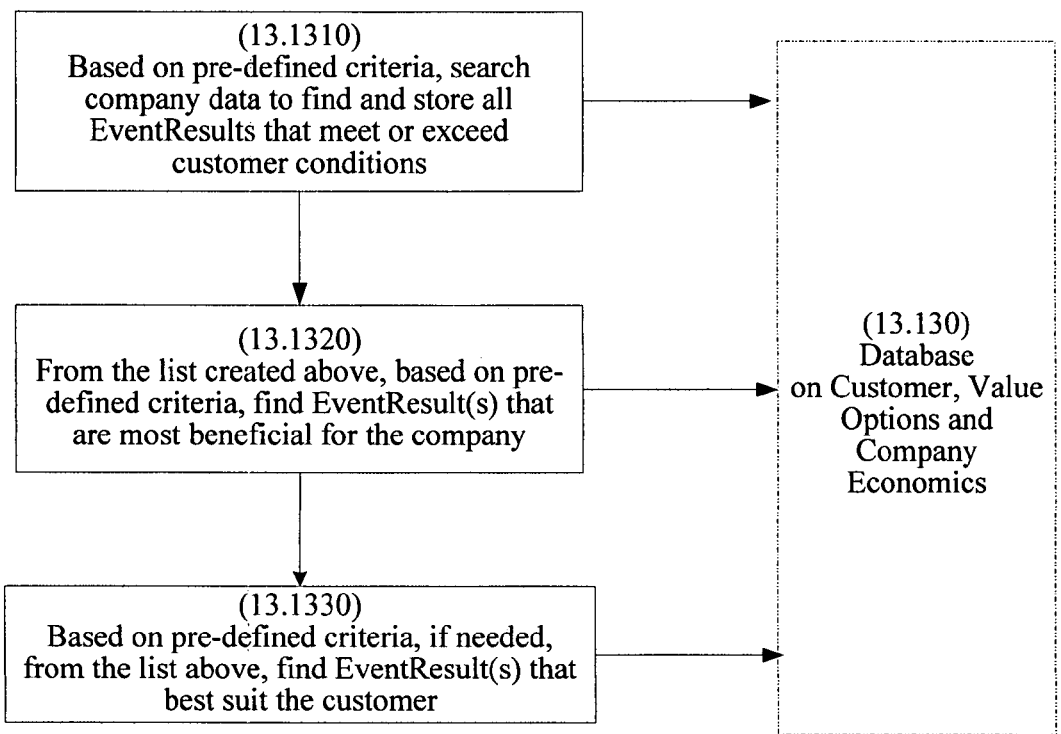
FIG. 13 is a flow chart expanding Act 1280 of FIG. 12.

FIG. 13 expands the Act 12.1280 to show the detailed sub-steps. The first Act (Act 13.1310) is to search the company data, based on pre-defined criteria, to determine and store all EventResults that meet or exceed the customer conditions (based on the value option selected and other preferences). An EventResult is a potential resultant output of an event to the customer and the company. The next Act 13.1320 is to determine from the stored list, those EventResults that are most beneficial to the company. If needed, another Act (13.1330) is performed to determine from the selected EventResults from the Act 13.1320, those results that best suit the customer.

Depending on the event type and related value option framework, the event-specific algorithm may communicate optimized results to the customer one or more times, depending on the algorithm and customer behavior.

Benefit of Using the System and Method

Through this method, a new efficient approach is introduced for managing customer relationships, sales cycles, marketing, customer service, market research and customer feedback. It eliminates manual, time-consuming processes and replaces those with an efficient, automatic process.

By maximizing total value for its customers, a company can greatly improve its overall business prospects. The company can look to build very high customer retention rates and also increase the number of new customers gained per unit time. It can help to increase the overall sales and thus help increase the overall business value. The company may distribute a portion of additional value gained back to its customers to further strengthen its relationships with them, if it wishes.

A company may encourage customers to "opt in" to this system and provide the customer's preferences by giving rewards to customers to provide these preferences and commit early. The value options may be created and priced to motivate customers to make choices that both satisfy their needs and simultaneously allow the company to improve its operations.

This method further adds new dimensions to business parameters like inventory. Previously, for a company, inventory was either "Committed" or "Available." This method adds a new dimension of "flexibility". With the customer preferences and needs taken beforehand, we add the dimension of flexibility to the inventory. For example, a booked flight seat would conventionally be called committed inventory. But now within the new methodology, if the ticket-holding customer is flexible, his ticket may fall into a pool of flexible inventory availability, which may be sold to other customers, if necessary.

Another advantage is that the method creates a new type of inventory, called customer inventory. Once the method had been used for some period of time, a company, by using its powerful value option framework, would be able to capture its customers' and potential customers' future needs in advance. In other words, within the realm of company product offerings, the company would collect information on which customers want to purchase what products, when and with what specifications or parameters. Combining this individual customer data across thousands of customers would generate a customer needs and preference database with appropriate classification and parameters. The needs (and/or preferences) of this database could be classified as customer inventory wherein the items in inventory are the needs of several groups of customer with similar needs. Once the company has built such a database, they can use the customer inventory as and when needed in optimizing their internal operations to maximize value for both the company and the customers.

The method allows a company to move from a knowledge-based system to an expert system, which optimizes the decisions based on customer preferences and company economics. The method allows the companies to market a whole new paradigm of services and products surrounded around their original product offerings. This is achieved partly by unbundling formally bundled components of existing products, into components offered to the customer and partly by building new products and services. This allows the customers to choose product features they wish to purchase and saves the company from making investments and incurring costs in providing product components to those who don't want or desire those components.

In summary, it can be said this method accomplishes the following: (1) makes a business more attractive to customers by enabling customers to express their preferences; (2) makes a business more efficient and reduces costs; (3) allows a company to handle problems and disruptions in a quick, efficient manner to generate high customer satisfaction and keep their costs low; (4) helps a company to increase and strengthen its customer base, improve sales per customer, and customer retention, and (5) helps to increase the value customers gain from the purchased products.

The above method may be applied to several industries including, without limitation, airlines, hotels, automobiles, media, entertainment (television, radio, internet, etc.), furniture, insurance, computer hardware, travel (e.g., vacations, car rentals, cruises), events (such as theatre, movies, sports games etc.). There may be several other industries that may benefit by using the new system and method.

Some value option frameworks related to the invention were described in full detail in incorporated-by-reference patent application Ser. Nos. 11/474,115 and 10/973,802 and discussions of these will be omitted or abridged herein. Such aspects are nonetheless intended to be part of this application and reference to these may prove helpful for a fuller appreciation of the invention. A few value option frameworks will now be described in detail.

(1) Flexibility Reward Option (FRO) Value Option Framework

The creation and utilization (in two stages or acts) of another value option framework will now be discussed. This is the Flexibility Reward Option (FRO) VOF. A company may implement the FRO VOF in any industry. The airline industry is assumed herein to demonstrate the system and methodology of the FRO VOF via examples. Selection of an industry provides a context and makes the understanding smoother and easier. The customer desire to trade-in flexibility (defined below) is used as the targeted value element. Within the airline industry, the customer desire to trade-in travel flexibility (defined below) is used as the targeted value element. A detailed demonstration of the FRO VOF is presented followed by a few examples of applying the FRO VOF within the airline industry and other industries.

The first stage in the FRO VOF involves steps (or acts) of: capturing customer dynamics, assessing company operations and economic factors, integrating customer dynamics with company economic factors, formulating the VOF and optimizing the VOF. The second stage involves carrying out a dynamic interaction with the customer and then executing an Event Optimizer process. The specific detailed steps with respect to the FRO VOF will now be discussed. A detailed demonstration of the generic FRO VOF is presented followed by an example of the FRO VOF in the airline industry.

Figure 14:
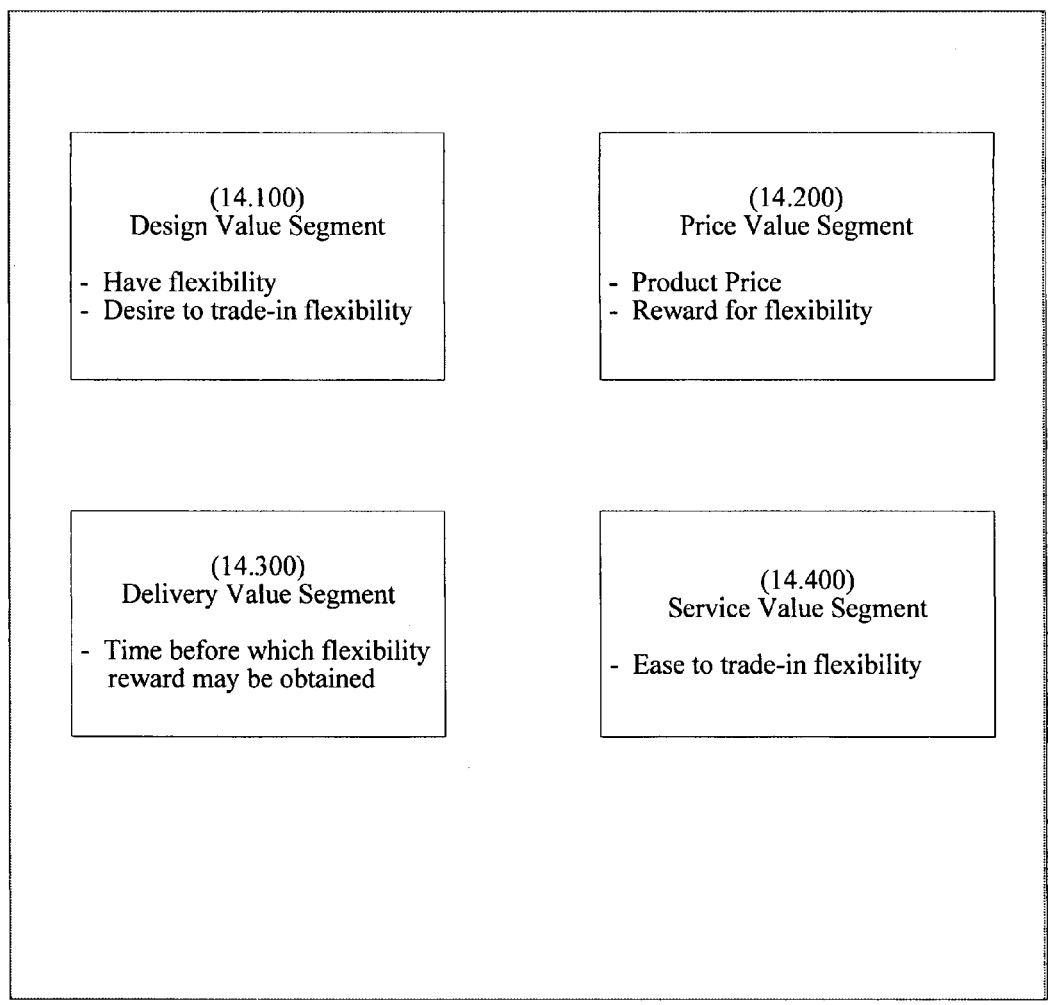
FIG. 14 is a diagrammatic illustration of an exemplary set of value segments and their value elements related to the FRO VOF.

First Stage Formulation of FRO Value Option Framework (1) Capturing Customer Dynamics FIG. 14 shows an analysis of the value elements that are believed to matter to customers in relation to a FRO. In the design value segment, shown in Box 14.100, important value elements include, but are not limited to, the customers' flexibility in purchasing products and their desire to trade-in their flexibility. In the price value segment, shown in Box 14.200, important value elements may include, but are not limited to, Product Price and desired monetary/non-monetary reward to trade-in flexibility. In the delivery value segment, shown in Box 14.300, important value elements may include, but are not limited to, time before which a customer may be able to trade-in his or her flexibility to obtain the desired reward. In the service value segment, the important value elements may include, but are not limited to, the ease to trade-in flexibility, as shown in Box 14.400. It may be important to estimate the relative preferences and utilities of these value elements to different types of customers.

The customers' desire to trade-in their flexibility is subjective in terms of the length of the "flexibility trade-in period" and the "range of flexibility". The term "flexibility trade-in period" refers to the time period during which a customer is willing to trade-in his or her flexibility. The term "range of flexibility" refers to a range of product features and/or components across which a customer is flexible. For example, in context of the airline industry, the range of flexibility may be expressed in terms of the periods for departure, arrival and stay, range of depart and/or arrival cities, flight services/amenities needed during travel and so forth. The flexibility trade-in period, range of flexibility and reward (as desired by customers in lieu of flexibility) are subjective and may differ from customer to customer, or even for the same customer, may differ from one situation to another.

(2) Assessment of Company Economics

An assessment of the crucial economic factors of a company, as indicated in Box 15.100, may reveal the factors to include, but not be limited to, fixed and variable costs, non-uniform distribution of demand across different Products under the same category (or products from various categories), costs and customer dissatisfaction and ill-will from oversale, opportunity loss from capacity shortages and spoilage and so forth.

In the context of the airline industry, the crucial economic factors may include, but are not limited to, the varying and unbalanced demand across different flights, the difficulty to accurately forecast demand, the inability or difficulty to shift customers from overloaded flights to low-demand flights, spill-demand from customers who are denied seats, regulatory requirements from government or other regulatory bodies regarding overbooking and overbooking compensation, an exponential increase in oversale costs and customer ill-will due to increase in the overbooking limit, the pressure to process customers in an organized manner under time-constrained conditions at the airport, increased competition from the low cost carriers, the need to develop sustainable competitive advantages, customer attrition rate, and the commoditization of the airline industry.

(3) Integration of Customer Dynamics with Company Economic Factors

FIG. 15 also illustrates an example of how a mapping may be done, between the customer and company profiles, for the FRO VOF in any industry. On one side, there are customers who have flexibility and desire to trade-in their flexibility in lieu of rewards or benefits. However, customers are also concerned about any hassles, delays, frustration that one may go through if they participate in such an exchange. On the other side, a company faces an unbalanced demand that is difficult to forecast accurately. It would be certainly very helpful for a company to know the relative flexibilities of customers to receive different products. For example, in an airline industry, an airline may benefit from knowing the relative flexibility of a customer to fly on a flight within a given set of flights.

Airlines usually have a higher aggregate capacity than aggregate demand. However, the demand is non-uniform and often leads to oversale, revenue spill or spoilage or any combination thereof, in flights. The issue of last minute cancellations and no-shows (CNS) further complicates the issue. To deal with the revenue spills and spoilages, and to concurrently hedge against the CNS, the airlines overbook flights. Overbooking is a risky proposition due to associated costs, customer ill-will and/or regulatory or government rules. If a flight takes off with one or more empty seats, that condition probably represents the loss of potential revenue for that airline. The airline may have turned down potential customers due to the risk of high cost of overbooking in the concerned flight or other flights (of the same or different airline). The overbooking factor in flights other than said flight represent potential revenue loss because there may be one or more customers on such other flights who could have been willing to be shifted to the flight with empty seats in lieu of reward, and thus, releasing capacity for new potential customers (who may be willing to pay a lot higher) in said other flights. However, today there is no framework that allows companies to do so in an optimal fashion such that both company and the customer benefit at the same time. An opportunity, thus, exists to concurrently generate an incremental revenue benefit for the company, and to maximize the purchase utilities for the customers (includes those who want to trade-in flexibility and those who want to obtain specific products even at higher prices).

The FRO VOF is created based on the value element "desire to trade-in flexibility". More specifically, as shown in the interaction between the Box 15.200 and Box 15.300, a mapping is performed between important customer value elements and the company economic factors. The value element "desire to trade-in flexibility" is extracted, as shown in Box 15.400 and a FRO value option framework is created. For example, in the airline industry, the FRO framework is created based on a value element "desire to trade-in travel flexibility" once mapping is done between the customer value elements with airline economic factors.

Figure 16:
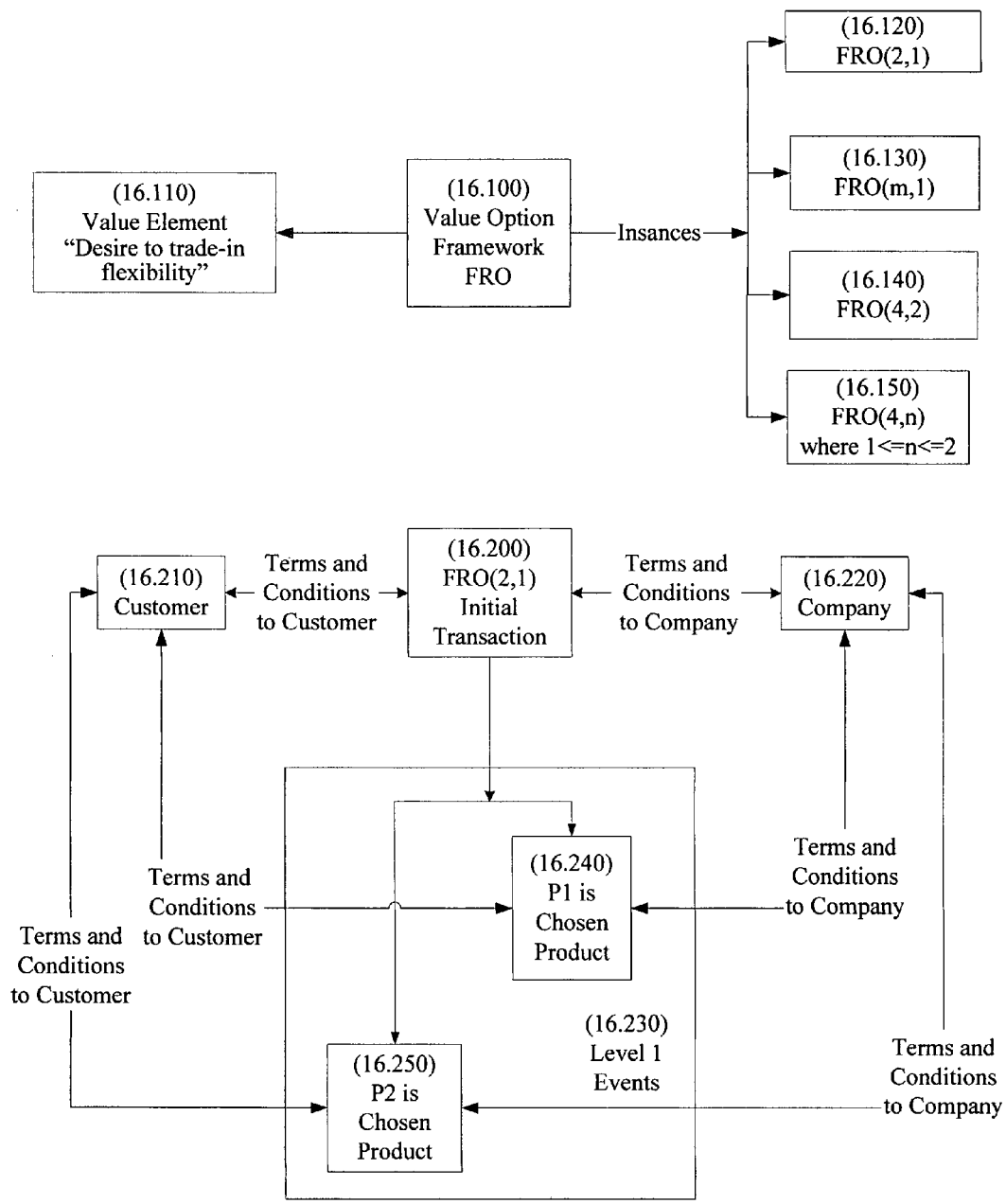
FIG. 16 is a partially-diagrammatic, partially-flow diagram representing the structure for creating a FRO Value Option Framework.

(4) Formulating the "FRO" Value Option Framework
Structure of FRO Value Option Framework in any Industry
FIG. 16 displays the structure of a FRO value option framework (shown in Box 16.100) in any industry. The FRO value option framework is related to the value element "desire to trade-in flexibility", as shown in Box 16.110.

In the "Initial Transaction" for FRO, shown by Box 16.200, a customer (shown by Box 16.210) and a company (shown by Box 16.220) transact on the FRO value option. There may be one or more Events (shown by Box 16.230) that follow the Initial Transaction.

In a successful Initial Transaction for a FRO, the customer receives an option to utilize up to 'n' out of 'm' selected products (said 'm' products termed "FRO Products"). The 'n' products that are finally selected to be utilized are termed "Chosen Products". After each of the 'n' Chosen Products is defined (or selected or chosen or received), the customer has the right to utilize (or can utilize) said Chosen Product. Apart from the 'n' Chosen Products, the remaining 'm-n' products are termed "Released Products". The Released Products (especially if held or blocked for said customer) may be sold to other customers as normal products or FRO Products or used for other purposes. The Released Products in relation to said option may be reused by the company before, after, at or any combination thereof, the time the Released Products and/or Chosen Products are defined (or received or selected).

The term "receiving" or "receives" here refers to, without limitation, purchasing, utilizing, receiving for free, receiving without requirement of a physical delivery or any combination thereof. The term "selected" or "select" or "selects" refers to, without limitation, selecting, defining, choosing, expressing a preference for or any combination thereof. In some situations, said terms (related to "select") may also refer to, without limitation, receiving, purchasing or any combination thereof (including any grammatical forms of these term's such as noun, adjective, verb etc.). Said terms (related to "select") are used interchangeably as and when the context requires.

Numerically, the value of 'm' is greater than or equal to 1 and the value of 'n' may vary from '0' to 'm' depending upon the specific implementation of the FRO framework, both m and n being whole numbers. Usually, value of n may be limited to less than the value of m, or n<m (i.e., n<=m-1); however, in some situations, n may be equal to m. The value of 'n' may be defined before, after, at or any combination thereof the time of the Initial Transaction, and may be defined by the company, the customer, another entity or any combination thereof. For example, the value of n may not be defined at the time of Initial Transaction.

The FRO Products may be selected by the company, the customer, another entity or any combination thereof. The FRO VOF may enable a company to obtain flexibility from FRO customers (i.e., those who select FRO) and use said flexibility to satisfy the product needs of other customers (i.e., who have relatively fixed or strong preferences). Therefore, the company would usually have the right to select (or define) the Chosen Products. However, in different implementations of FRO VOF, the company, the customer, another entity or any combination thereof may select the Chosen Products. The FRO Products and the Chosen Products may be selected by the same entity, different entities or any combination thereof. For example, the customer may select the FRO Products and the company may select the Chosen Products out of the FRO Products. The company may incorporate the customer information and the data related to the FRO into the sales, production, inventory, other database or information system or any combination of the above.

The time when an Initial Transaction is completed (i.e., the customer receives the FRO option on said m Products) is referred to as the Initial Transaction Time (or ITT, in short). One or more of said m Products may be selected, at one or more times, before, after, during, or any combination thereof, the Initial Transaction. All the FRO Products may be selected concurrently (i.e., all together in one transaction) or sequentially (i.e., in multiple transactions).

In the sequential case, a customer may select one or more Products in one or more transactions before the Initial Transaction. The said selected Product(s) (let's say X number of them), thus, may be considered as part of said m FRO Products of the FRO (m,n) transaction, and the customer may select only the remaining (m−X) number of FRO Products during the Initial Transaction. All the transactions used to select (or receive) all the m FRO Products of a FRO (m,n) instance are related to each other, and hence, are considered as "related transactions" (as defined earlier, i.e., each transaction may take into effect the result of one or more previous transactions with regard to selecting Products and/or in regard to other terms and conditions of the option contract).

In a FRO VOF, the sequential process may consist of a number of "related transactions" when all the FRO Products are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof.

A company may choose to create one or more instances of the FRO VOF based on factors including, but not limited to, number of FRO Products, Chosen Products or Released Products, pre-determination of a number of Chosen Products or Released Products, flexibility trade-in period, other factors or any combination thereof. For example, a FRO based on a combination of the number of FRO Products (or m) and Chosen Products (or n) would be FRO (m,n). Some FRO instances are shown in Boxes 16.120, 16.130, 16.140 and 16.150. If the number of Chosen Products is pre-determined, the FRO (4,2) instance may imply that the customer receives 4 FRO Products, on the condition that the company may select any 2 out of 4 Products as Chosen Products. When the number of Chosen Products is not pre-determined, the FRO (4,2) instance may imply that the customer receives 4 FRO Products, on the condition that the company may select none, one or 2 Chosen Products out of FRO Products. There may also be a minimum limit on n. For example, the FRO (4,n) (where $1<=n<=2$) instance limits the company to select either 1 or 2 Chosen Products out of the 4 FRO Products.

The FRO (2,1) instance, two FRO Products and one Chosen Product, is used here as an example to demonstrate the details of the structure of a FRO VOF. Box 16.200 refers to the Initial Transaction between the customer and the company, in which they transact on a FRO (2,1) value option. In a successful Initial Transaction for FRO (2,1), the customer selects two FRO Products and the company may select any 'one' of those two Products as the Chosen Product.

The Initial Transaction may have terms and conditions applicable to the customer or the company or both. These terms and conditions may be set, preferably, to concurrently benefit both parties. The connections between Box 16.200 and 16.220, and Box 16.200 and 16.210 refer to the terms and conditions to the company and the customer, respectively.

The FRO VOF may or may not include any constraints on the FRO Products. For example, a company may restrict FRO applicability and availability on Products that satisfy specific criteria. The two FRO Products may or may not include practically constrained Products. Practical constraints may include one or more constraints that will prevent a customer to utilize a given Product or prevent the customer from utilizing all the FRO Products. Such constraints may include, but are not limited to, time constraints, location constraints and so forth. In other words, it may or may not be practically possible for a customer to utilize both the selected Products due to at least one practical constraint.

A customer may select (or receive) FRO Products in several ways; through mutual agreement (e.g., during a direct interaction such as a Product purchase), or the company may grant the FRO Products to the customer without soliciting their interest or permission. For example, to enhance customer satisfaction or for any other purpose, a company may grant FRO Products to customers based on the past customer behavior, interaction and so on.

The Initial Transaction may impose one or more conditions on the company. A company may be required to explicitly notify the customer prior to or no later than a given date and time (referred to as the Notify Deadline) regarding the Chosen Product. For simplicity, it is assumed that whenever the term Notify Deadline is used in the following sections, the condition requires notification prior to the Notify Deadline. If there is no such explicit notification condition, the Chosen Product may be decided as per the terms and conditions of the option contract. In either case, (explicit or implicit notification), the date and time when the selection of the Chosen Product is notified to the customer is referred to as the Customer Notification Time (or CNT, in short). In the current discussion, the explicit notification condition is assumed unless specifically mentioned otherwise.

A company may determine one or more Notify Deadlines for a product at one or more times (e.g., before, during, after the Initial Transaction or any combination thereof) using factors including, but not limited to, customer needs, expected value of the product, company profitability goals, any other factors or any combination of the above. Customer factors should also be considered in determining the Notify Deadlines, such as the flexibility trade-in periods desired by customers, or any other factor that may affect the behavior of a customer.

In the context of the FRO VOF, the terms "price" or "reward" or "discount" normally refer to the price which the company may offer to the customer in relation to the FRO. The terms "price" and "reward" are used interchangeably as and when the context requires.

The FRO VOF may impose additional terms and conditions on the customer. A customer may receive one or more rewards (or prices) in relation to the FRO. There may or may not be any payment transaction related to the Initial Transaction and/or other event related to the FRO. There may be one or more prices related to the FRO. A price may include, but is not limited to, a set of one or more Product Prices, a set of one or more FRO Prices (or Rewards or Discounts) or any combination of the above. A company may choose to implement FRO Prices in many ways. For example, a customer may pay a Product Price to receive a group of products, and then, may choose to get FRO on said products and thus, receive FRO reward. A company may use the method of its choosing to decide on all the Product Prices.

The customer may receive one or more prices during the Initial Transaction (which is referred to as an Initial Price), at the CNT (which is referred to as an Exercise Price) and/or at any other time, which may or may not be pre-determined between the customer and the company. The price may be a function of number of FRO Products and/or Chosen Products, specific products to be granted for FRO Products and/or Chosen Products, Notify Deadline, one or more Product Prices, any other factors of company's choosing or any combination of the above.

The price may consist of a monetary value or a soft/non-monetary value (e.g., benefits, coupons or exchange of another service) or other consideration. The FRO Price may be fixed or variable, with or without bounds. The company may set permissible range(s) or boundary limit(s) within which the FRO Price can vary, or it may offer the customer a set of prices to choose from. Since price conditions may depend upon various factors, which may or may not be variable, the same may be decided at anytime. The price conditions may be determined by the customer, the company, another entity, or any combination thereof at one or more times. One or more prices (FRO Initial or FRO Exercise or any other price) may be a negative value, which reflects that instead of the company rewarding the customer, the customer shall pay a fee to the company to get the desired Product as the Chosen Product.

Different price strategies may be implemented in the FRO (2,1) instance. For example, a single Initial Price could make it attractive and easy for the customer to participate in the FRO program. One or more of the FRO prices (rewards) may be embedded with the Product Price by using a special Product Price. A customer may be presumed to accept the FRO offer while displaying the Product Price (that has the FRO Price embedded in it). These presumptions may or may not include soliciting prior interest of the customer regarding the FRO offer. In case, the FRO price is merged with the Product Price, and where such price may or may not be separately identifiable, the customer may or may not receive a separate price for FRO.

The Notify Deadline may be pre-determined or may be determined later (i.e., after FRO grant) by the company, the customer or mutually by both. There may be one or more Notify Deadlines, where each Notify Deadline may have a different price associated to it. There are several ways to implement this condition. One way is given, as follows. The price associated to the First Notify Deadline (i.e., the earliest among the Notify Deadlines) may be offered if the customer is notified anytime before the First Notify Deadline. The price associated to the Second Notify Deadline (i.e., the second earliest among the Notify Deadlines) may be offered if the customer is notified after the First Notify Deadline and before the Second Notify Deadline.

The terms and conditions of the FRO VOF may not allow the company to notify the customer after the Last Notify Deadline (i.e., the latest among the Notify Deadlines). As an operational measure, a rule may be set that if the company fails to notify the customer before the Last Notify Deadline, the customer may select either of the FRO Products as the Chosen Product. Another approach may be (e.g., for customer/company) to designate one of the two products as a Default Product (during or after receiving the FRO) that will be selected as the Chosen Product if the company fails to notify the customer of the Product selection before the Last Notify Deadline. Any entity (e.g., the company or the customer) may (or may not) be allowed to change the Default Product once it is selected. The FRO Exercise Price (if any) in the default case may or may not be equal to the FRO Exercise Price for the Default Product for the Last Notify Deadline. In the current discussion, a single Notify Deadline is assumed.

The FRO Exercise Price may be a function of Notify Deadline, Chosen Product, any other factor or any combination thereof. In such situations, the company may pay a price to the customer based on the selection of the Chosen Product at a given time.

The FRO VOF may also include conditions imposed on the customer. A customer may be under a mandatory condition to accept the Chosen Product once it is selected (for e.g., by the company).

A company may determine customer preferences, either explicitly or implicitly, regarding utilization of up to n of m selected Products. The preferences may also include, but not limited to, customer preferences for various products and services, needs, associated relative utilities, flexibilities, preferences regarding choice of Products, quality of Products, acceptable delays (relative) to receive different Products and so forth. A company may seek customer preferences on flexibility to utilize various products, desire to trade-in their product flexibility, any other parameters or any combination thereof. The company, one or more entities other than the company or any combination thereof may seek customer preferences.

A company may also offer FRO options to one or more customers on the basis of customer preferences, so obtained or collected. The company may offer said FRO options based on the dynamics of the company including, but not limited to, inventory, operational data, revenue management data, cost data, financial data, accounting data, any other internal data, any combination thereof and so on.

A company may seek such preferences from the customers prior, during or after the customer has purchased the Product or any combination thereof. These customer preferences may help the company to perform concurrent optimization of value for the company, the customers, one or more entities other than the company or any combination of two or more of the above. The customers may also include the customers whose preferences have not been determined or collected. The data pertaining to the company, customers, one or more entities other than the company, any combination thereof, may be integrated to concurrently optimize the value for at least any two of the said entities. There may or may not be any payment transaction between the company, one or more other entities and/or the customers regarding seeking such customer preferences, delivering FRO options, customer participation in FRO and so on.

The company may operate one or more systems and/or services to monitor the company dynamics. Monitoring may include, but is not limited to, monitoring of capacity, days to utilization, return and/or potential return of Products, flexible inventory that may be created in relation to said obtained preferences, analyzing various cost, revenue, operational or any other internal data and so on. The company may have one or more systems and/or services to analyze such data on a real-time or quasi real-time basis and draw conclusions on the basis of such analysis. Any of the systems and/or services may be operated by the company, one or more entities other than the company or any combination thereof.

A company may operate a system that defines customer preferences regarding at least utilizing up to n of m selected products, where m and n are whole numbers, and n is less than m, operate a system that enables use of said preferences to optimize value for at least one of customers, said company and an entity other than said company. Said system may be used to enhance product selling capacity (or helps to increase the overselling limits of products). The company may use such preferences to offer FRO. A company may concurrently optimize value for at least two of customers, said company and at least one entity other than said company.

The company may utilize such preferences to meet its capacity shortages. These customer preferences may enable the company to increase the capacity limits for its products. The company may start entertaining more requests from the customers and hence may increase the oversale limits for their Products. The company may be able to sell the Products at higher prices to the potential customers due to increase in capacity and oversale limits and thereby enhance its revenues. Such preferences may help the company to allay fears of customer ill-will and dissatisfaction in case of an oversale situation. The company may utilize these preferences to deal with the oversale situation more effectively, efficiently and in timely manner. Increasing the capacity limits may or may not have any negative impact on the company. Thus, it may eventually allow the company to capture demand that may otherwise, have been spilled or turned down and thereby enhancing its revenues without having any negative impact due to increase in capacity limits.

A company may offer FRO to all customers or any selected customers, such selection may be based on any criterion including, but not limited to, such as those who have expressed their relative preferences, those who have not expressed any preferences. By integrating the company dynamics and collected customer preferences, a company may offer appropriate incentives and terms and conditions for FRO to generate desired participation. A company may exercise its right (from FRO) to define the Chosen Products for one or more FRO customers depending on company's internal need to regenerate product capacity for products with low availability or shortages. A company may be in a better position to offer appropriate FRO offers at a later stage due to many factors including, but not limited to, the company having better knowledge of internal and external dynamics, a relatively better estimate on how many customers required to avoid oversale situation in the end and so on. A company may choose to handle any shortfalls in capacity using FRO or by any other method of its choosing.

Once the Initial Transaction is successful, there may be at least two possible related events, as shown by Box 16.230. The two events are (1) that P1 is the Chosen Product (as shown by Box 16.240) and (2) that P2 is the Chosen Product (as shown by Box 16.250). Each of these two events may be associated with various terms and conditions on the customer and/or the company. As explained above, the events may take place in two ways: either the company selects the Chosen Product to satisfy its business needs, or the Chosen Product is selected based on pre-determined rules. The company may have to pay an additional exercise price at the CNT depending on the terms and conditions of the option contract. Once the Chosen Product is selected, the company and/or the customer may not change the Chosen Product except within the bounds of the terms and conditions in the option contract. The company or the customer may (or may not) have the right to enforce the Chosen Product on the other party as per the terms and conditions of the option contract.

A customer who receives a FRO is termed "Y". In one implementation of FRO, a company may want to hold capacity for the customer in only one of the FRO Products, in which the status of said Y customer is termed "Ya" (i.e., Accounted) and in the other FRO Product(s), the status is termed "Yw" (i.e., Awaiting) (both Ya and Yw have been defined above). A "Y" customer converts to an N customer after the CNT. Thus, at any given time, a company may have N, Ya and Yw type of customers for its products.

The FRO VOF may help a company in one or more ways. For example, it may help to accommodate product requests from potential customers. Any new potential customer who requests to obtain a product is assumed to be an N customer. If the available quantity for the desired product (desired by N customer) is insufficient to satisfy the request, then the company may use the quantity (if any, of desired product) that has been assigned to Ya customers, and reassign the same to said N customer. Consequently, the company may then assign the Awaiting products (i.e., the products where said Ya customers have Awaiting status) to said Ya customers. By implementing such shifting or removing of Ya customers from their Accounted products to Awaiting products, a company may better serve incoming demand for products. An event where such request comes to the company for a product is termed "Buy_N". The act to remove (or shift) a Ya customer from its Accounted product to its Awaiting product is termed "Remove_Y". Detailed algorithms are presented below that may be used to manage a system consisting of N, Ya and Yw type of customers.

The above terms and conditions of the FRO VOF may be set in a way to concurrently benefit both the customer and the company. The company gets to seek a way to create a flexible inventory of Products. The customer benefits from trading their flexibility for the desired rewards. The company benefits from enhanced customer satisfaction (loyalty and repeat business), incremental revenue from the high price paying customers, incurring lower costs on capacity shortages and selling (reusing) the Released Products, and other operational benefits.

A FRO VOF may include a right for the customer to utilize each of the m FRO Products, and a right for the company to limit the Products (to fewer than m) the customer can utilize, if the company notifies the customer on a stated Notify Deadline. The right may include the condition that the company may notify the customer before, at or after the stated Notify Deadline or any combination thereof. To provide some flexibility to the customers, the company may offer (or allow) the customer to express their preferences regarding the Chosen Product(s) before the stated Notify Deadline. The company may or may not exercise their right to limit the customer to utilize fewer than said m products. The right may include a condition that the company may limit the customer after the customer expresses his/her preference for the Chosen Products. There may be a condition imposed on the customer to make at least one payment to the company when the customer expresses his or her preferences for the Chosen Products.

A company may choose to define all the Chosen Products at one or more times. All Notify Deadlines may or may not be associated with each of the related FRO Products. For example, a Notify Deadline may be after the time when the Product would have been utilized or the company may choose not to offer a Notify Deadline on a specific Product due to one or more reasons including, without limitation, high FRO Price, customer utility reasons and expected load factor. A company may select any of the selected FRO Products as the Chosen Products prior to a Notify Deadline. The company may also choose not to select any Chosen Products at one or more of the specified Notify Deadlines.

The costs, revenues, benefits, terms and conditions shown here are for illustration purposes only and actual values could be different depending upon specific values selected by the company for value options, customer behavior, company characteristics, Notify Deadline(s) and other relevant factors.

The FRO VOF structure may be implemented in several ways depending upon the terms and conditions associated with the FRO contract. The FRO VOF structure presented above for the FRO (2,1) instance can be extended to implement any other FRO instance.

The FRO concurrently optimizes value for both the company and its customers. The customers receive rewards for trading their flexibility in utilizing a product while the company gets the flexibility to optimally allocate products (including sold products) across various customers. The company gets to know the relative preferences and utilities of a customer for various products as some customers take this option and others don't. The presumption here is that customers make a logical decision to take part in the FRO value option framework if they desire to trade-in their flexibilities. The company benefits from higher customer loyalty, as customers receive higher satisfaction from using the company services, and can optimize its profitability by reusing/reselling the Released Products at typically higher than average prices.

FRO VOF Structure in the Airline Industry

A summary of the FRO VOF structure in the airline industry is presented now. The FRO VOF structure in the airline industry would be similar to the structure mentioned above for the generic FRO VOF. Some details and variations of the terms and conditions presented in the generic FRO VOF structure mentioned above have been omitted or abridged herein to enhance the readability and understanding. Such details are nonetheless intended to be part of FRO VOF structure in the airline industry and reference to these may prove helpful for a fuller appreciation of the structure.

In a successful Initial Transaction for a FRO, a customer receives an option to fly on up to 'n' of 'm' selected flights (said 'm' flights termed "FRO Flights"). The 'n' flights that the customer can fly on are termed "Chosen Flights". After each of the 'n' Chosen Flights is defined, the customer has the right to fly on (or can fly on) said Chosen Flight. Apart from the 'n' Chosen Flights, the remaining 'm−n' flights are termed "Released Flights". The released seats in the Released Flights (if any, that were probably held or blocked for said customer) may be sold to others or used for other purposes. The Released Flights in relation to said option may be reused by the airline before, after, at or any combination thereof, the time the Released Flights and/or Chosen Flights are defined. Numerically, the value of 'm' and 'n' may vary as defined in the generic FRO VOF structure, and may be defined as per specific implementation of a FRO VOF.

The phrase "selecting a flight" for option purposes includes selecting one or more seats within the same or a different cabin (or a section or compartment) within the same flight.

The FRO Flights may be selected by the airline, the customer, another entity or any combination thereof. The FRO VOF may enable an airline to obtain flexibility from FRO customers (i.e., those who select FRO) and use said flexibility to satisfy the Flight needs of other customers (i.e., who have relatively fixed or strong preferences). Therefore, the airline would usually have the right to select (or define) the Chosen Flights. The FRO Flights and the Chosen Flights may be selected by the same entity, different entities or any combination thereof. One or more of said m flights may be selected, at one or more times, before, after, during the Initial Transaction or any combination thereof. All the FRO Flights may be or selected concurrently (all together in one transaction) or sequentially (i.e., in multiple transactions).

In the sequential case, a customer may select one or more Flights in one or more transactions before the Initial Transaction, and may select only the remaining FRO Flights during the Initial Transaction. All the transactions used to select (or receive) all the m FRO Flights of a FRO (m,n) instance are related to each other, and hence, are considered as "related transactions".

An airline may choose to create one or more instances of the FRO VOF based on any factors similar to those mentioned above or any other factors of airline choosing. The FRO (2,1) instance used in the generic FRO VOF structure, with two FRO Flights and one Chosen Flight, is used here as an example to demonstrate the details of the structure of a FRO VOF.

The two FRO Flights may or may not include practically constrained flights. Practical constraints may include one or more constraints that will prevent a customer to fly on a given flight. Such constraints may include, but are not limited to, schedule conflicts, time constraints, location constraints and so forth. The time constraints may include, but not are limited to, constraints from departure and/or arrival times of the two FRO Flights. The location constraints may include, but are not limited to, due to the distance between the location of the departure and/or arrival airports of the two FRO Flights. In other words, it may or may not be practically possible for one customer to fly on both the selected flights due to at least one practical constraint. For example, one flight may be scheduled to be airborne when the other flight is scheduled to depart, thus not allowing any customer on the former flight to take the latter flight, or the distance between the departure airports of the two flights may prevent customers from flying on both flights (that depart within hours of each other). For example, a customer may receive a FRO to fly on each of the m selected flights that include at least one practically constrained flight, where it will not be possible for the customer to fly on all the m selected flights. The two selected flights may or may not have the same origin and/or destination airports (or location).

The FRO VOF may include constraints on the FRO Flights based on Ticket Prices (defined elsewhere) or other factors. For example, the airline may offer only those flights as FRO Flights whose Ticket Prices at or before the ITT are less than a specified value, or may add a constraint on the maximum difference between the highest and the lowest Ticket Prices across a set of FRO Flights offered within a specific FRO. A company may use any method of its choosing to decide on all the Ticket Prices for FRO.

The Initial Transaction may impose one or more conditions on the customer and/or the airline. The airline may be required to explicitly notify the customer prior to or no later than a given set of one or more Notify Deadlines regarding the Chosen Flight. The FRO VOF may impose additional terms and conditions on the customer. A customer may be under a mandatory condition to accept the Chosen Flight as selected by the airline. There may or may not be any payment transaction related to the Initial Transaction and/or other event related to the FRO. A customer may receive one or more rewards in relation to FRO. There may be one or more prices related to FRO. A price may include, but is not limited to, a set of one or more Ticket Prices, a set of one or more FRO Prices (or Rewards or Discounts) or any combination of the above. An airline may choose to implement FRO Prices in many ways.

The customer may receive one or more prices during the Initial Transaction (which is referred to as an Initial Price), at the CNT (which is referred to as an Exercise Price) and/or at any other time, which may or may not be pre-determined between the customer and the airline.

The price may be a function of number of FRO Flights, Chosen Flights, specific flights to be granted for FRO Flights and/or Chosen Flights, Notify Deadline, one or more Ticket Prices, any other factors of airline's choosing or any combination of the above. The price may consist of a monetary value or a soft value (e.g., benefits, frequent flyer miles, travel coupons or exchange of another service) or other consideration. The price conditions may be determined by the customer, the airline, a third entity, or any combination thereof at one or more times. The FRO Exercise Price may be a function of Notify Deadline, Chosen Flight, any other factor or any combination of the above factors. One or more prices (FRO Initial or FRO Exercise or any other price) may be a negative value, which reflects that instead of the airline rewarding the customer, the customer shall pay a fee to the airline to get the desired Flight as the Chosen Flight.

One or more of the FRO prices (rewards) may be embedded with the Ticket Price by using a separate fare class or enhancing features on a currently existing fare class. A customer may be presumed to accept the FRO offer while displaying the embedded Ticket Price. These presumptions may (or may not) include soliciting prior interest of the customer regarding the FRO offer. In the case that the FRO price is merged with the Ticket Price, and where such price may or may not be separately identifiable, the customer may or may not receive a separate price for FRO.

An airline may determine one or more Notify Deadlines for a Flight at one or more times (e.g., before, during, after the Initial Transaction or any combination thereof) using factors including, but not limited to, customer needs, expected seat value, airline profitability goals, any other factors or any combination of the above. The Notify Deadline may be pre-determined or may be determined later (i.e., after the Initial Transaction) by the airline, the customer, any other entity, or any combination thereof.

A FRO VOF may include a right for the customer to fly on each of the m selected FRO Flights, and a right for the airline to limit the flights (to fewer than m) on which the customer can fly if the airline notifies the customer on a stated Notify Deadline. The right may include the condition that the airline may notify the customer before, at or after the stated Notify Deadline or any combination thereof. To provide flexibility to the customers, the airline may offer (or allow) the customer to express their preferences regarding the Chosen Flight(s) before the stated Notify Deadline. The airline may or may not exercise their right to limit the customer to fly on fewer than FRO Flights. The right may include the condition that the airline may limit the customer after the customer expresses his/her preference for the Chosen Flights. There may be a condition imposed on the customer to make at least one payment to the airline when the customer expresses his or her preferences for the Chosen Flights. The airline or the customer may have the right to enforce the Chosen Flight on the other party as per the terms and conditions of the option contract.

Once the Initial Transaction is successful, there may be at least one related event, as mentioned in the generic FRO VOF Structure. Each said event may be associated with various terms and conditions on the customer and/or the airline. The airline and/or the customers may have the right to enforce the Chosen Flight(s) on the other party as per the terms and conditions of the option contract.

The FRO VOF may help an airline in one or more ways, for example, to accommodate flight requests from potential customers (i.e., any new potential customer, N). If the available capacity for the desired flight (desired by N customer) is insufficient to satisfy the request, then the airline may generate capacity in desired flight by shifting (or removing) the Ya customers (who currently hold booking for desired flight) to their Awaiting Flights. For example, an airline may do so if the price paid by the new N customer is higher than the cost incurred due to the shifting of the Y type customers. Detailed algorithms are presented below that may be used to manage a system consisting of N, Ya and Yw type of customers.

The above terms and conditions of the FRO VOF in the airline industry may be set in a way to concurrently benefit both the customer and the airline. The following section presents illustrative example for a FRO instance in an airline industry.

Example of FRO VOF Structure FRO (2,1)

FIG. 17 demonstrates an illustrative practical example of using the FRO (2,1) instance in the airline industry. Consider a customer who interacts with an airline to get FRO. Per Act 16.200, an Initial Transaction takes place between the airline and the customer. FIG. 17 displays some of the details of the Initial Transaction. The customer selects/receives two FRO Flights, F1 (shown in Box 17.100) and F2 (shown in Box 17.200), and the airline can select either of the flights as the Chosen Flight. The customer is under the condition to accept the Chosen Flight as selected by the airline.

The customer receives a reward of $15 as the Initial FRO Price from the airline while the customer pays $500 as the Ticket Price to the airline as part of the Initial Transaction. Hence, the customer pays a net amount of $485 to the airline at Initial Transaction. The Initial Transaction takes place on the 14$^{th}$ day of April (i.e., the ITT, shown in the second row of the Box 17.300). There is an explicit notification condition wherein the airline has to select and notify the customer regarding the Chosen Flight before the Notify Deadline. An example of terms and conditions included with FRO are presented. A scenario is considered with different Notify Deadlines (shown in Box 17.400) and the Notify Deadline is expressed in terms of the number of days to departure (DTD) of F1, the earlier of the two flights.

Box 17.400 displays a set of FRO Exercise Prices that are a function of both the Notify Deadline and the Chosen Flight. There are four Notify Deadlines associated with the FRO. The FRO Exercise Price increases from $5 (for the First Notify Deadline of 30 DTD) to $20 (for the Last Notify Deadline of 1 DTD) if the Chosen Flight is F1 and from $10 to $50 if the Chosen Flight is F2. If the CNT is before 30 DTD, then the customer receives $5 as the FRO Exercise Price from the airline if the Chosen Flight is F1, and receives $10 as the FRO Exercise Price if the Chosen Flight is F2, as shown in the second column of the second and third rows in the Box 17.400, respectively. If the CNT is after 30 DID and before 7 DTD, then the customer receives a FRO Exercise Price of $10 or $25 if the Chosen Flight is F1 or F2, respectively, as shown in the third column of the second and the third rows, respectively, in the Box 17.400. Similarly, the customer receives a FRO Exercise Price of $15 for F1 or $35 for F2, if the CNT is after 7 DTD and before 3 DTD, and $20 for F1 or $50 for F2, if the CNT is after 3 DTD and before 1 DTD, as shown in the fourth and fifth columns of the second and the third rows in the Box 17.400, respectively.

5) Optimization of FRO VOF

As mentioned earlier (shown in FIG. 7), in the form of an optional last step in the first stage, a financial analysis may be performed using the existing company and customer data to determine the optimal terms and conditions of the FRO VOF. 'What-if' scenarios may be executed to determine an optimal pricing strategy. The company may want to divide customers using one or more criteria and design separate FRO VOF for each customer segment.

Second Stage Using the FRO Value Option Framework

After completing the first stage of the method, the company has created a FRO VOF and specific options within that framework. The company has also segmented customers and designed options accordingly. The company is fully prepared to use a structured format consisting of one or more FRO value options to interact with its customers in real time to generate benefits for both the company and its customers. The second stage of the FRO VOF is now presented.

Figure 18:
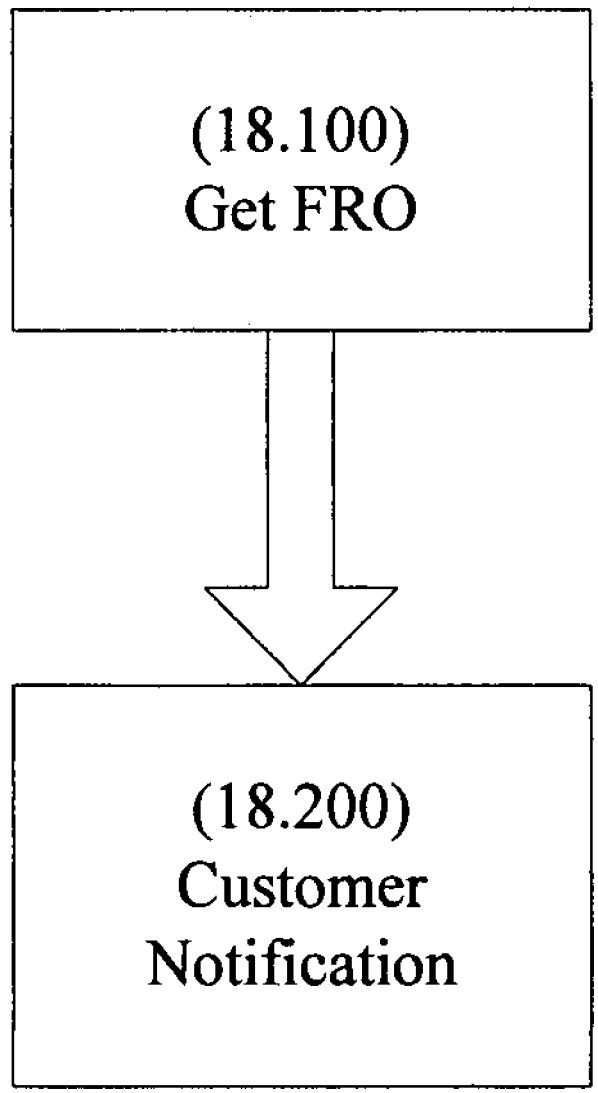
FIG. 18 is a diagrammatic illustration, in a high level flowchart, of a process for FRO VOF implementation.

The implementation of the FRO VOF between the company and its customer takes place through two high level acts, as shown in FIG. 18. In Act 18.100, the 'Get FRO' process, an interactive event between the customer and the company's web server, runs to carry out the Initial Transaction of the FRO VOF. In this Act, a number of algorithms, may be executed (e.g., availability, FRO Price, Product Price and Notify Deadline) on the company's server to optimally calculate the terms and conditions of the FRO VOF to concurrently benefit both the company and the customer. In Act 18.200, the customer notification process (explained later) is executed. In this process, the Chosen Product is notified to the customer. The process may also consist of one or more event optimizer algorithms that may help to optimally select the Chosen Product and/or to optimally use (or reuse) the Released Product.

Figure 26:
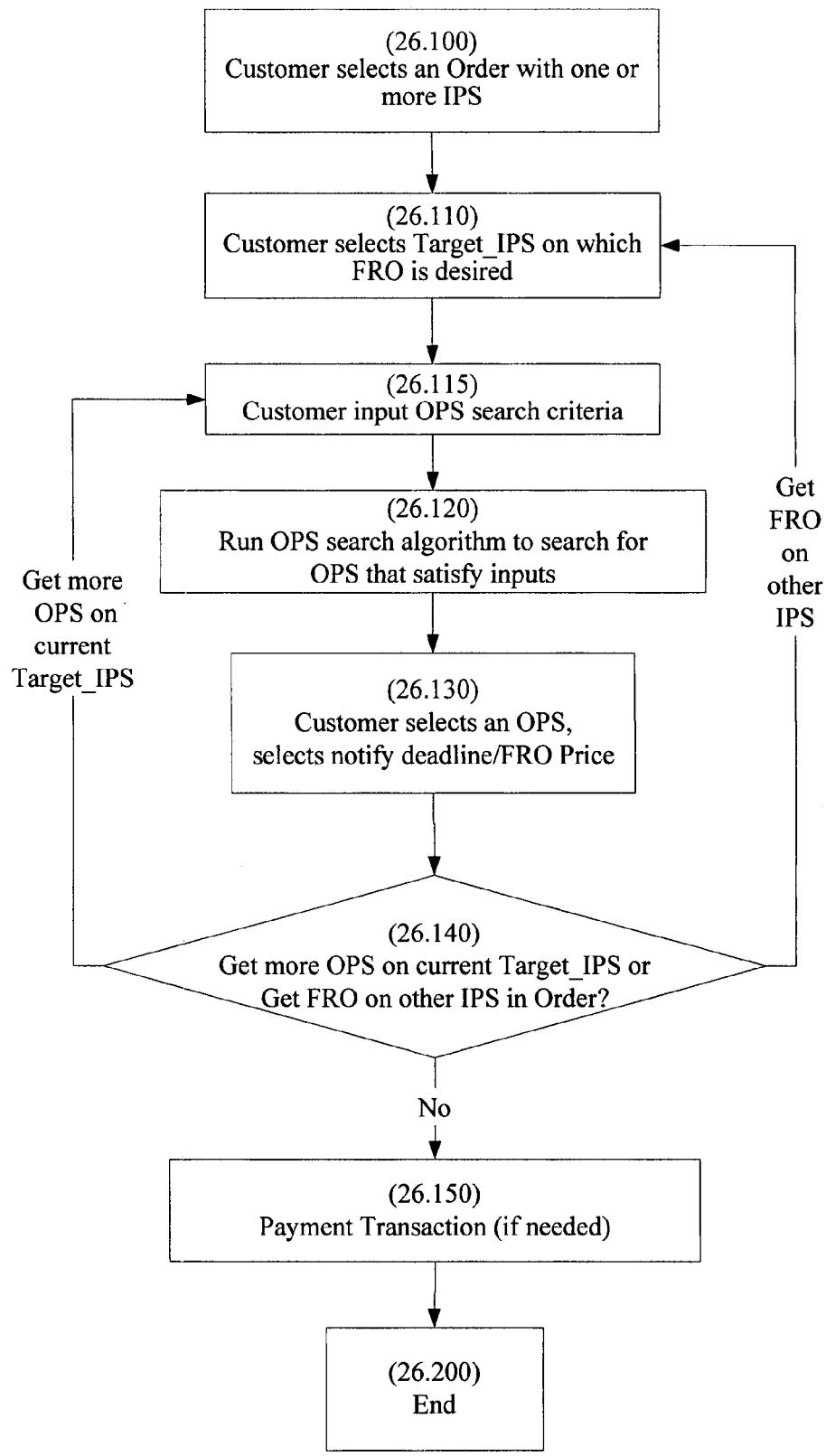
FIG. 26 is a flowchart that expands Act 100 of FIG. 18, illustrating a high level algorithm for the "Sequential Get FRO" process.
Figure 28:
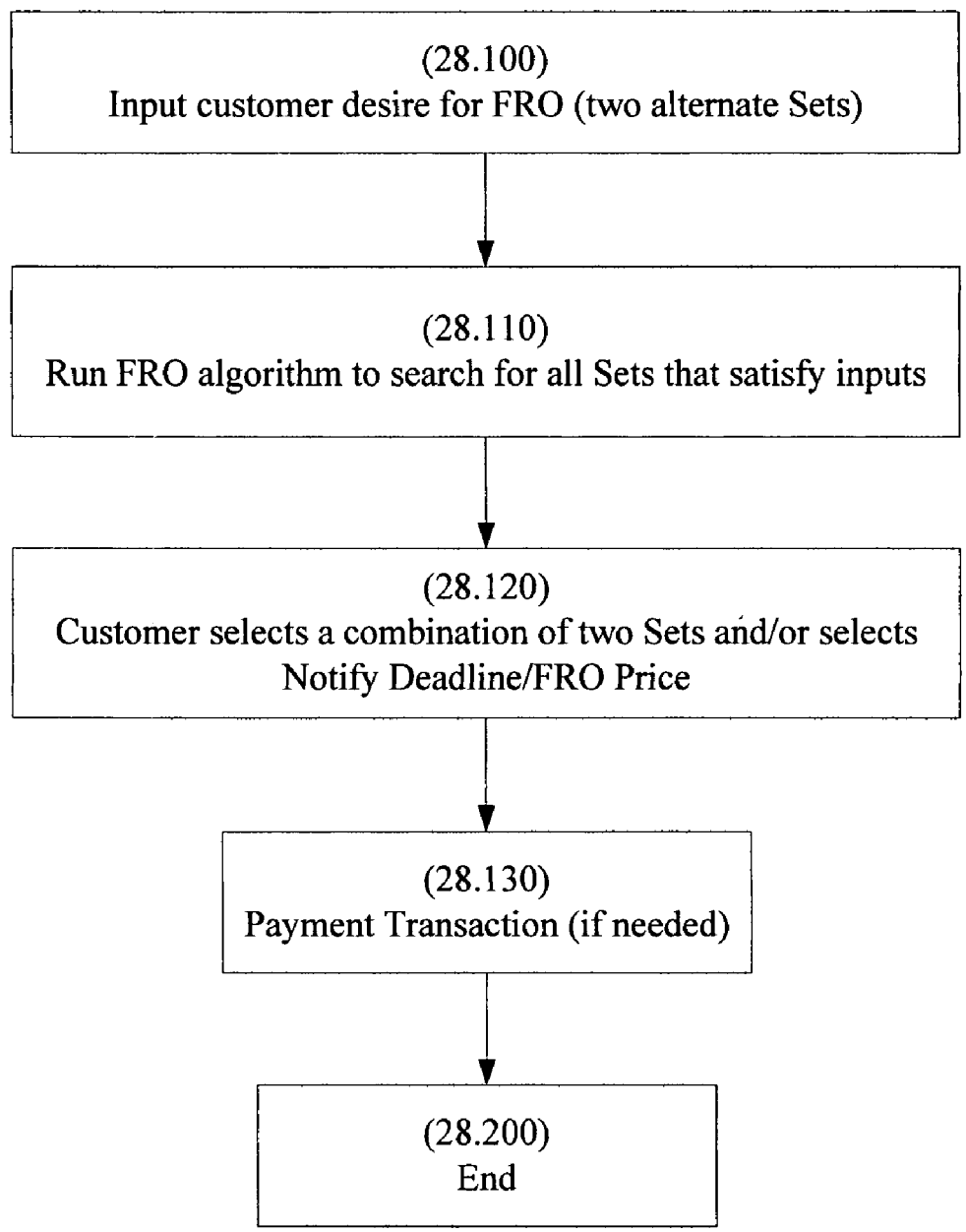
FIG. 28 is a flowchart of an algorithm for the "Concurrent Get FRO" process, an alternative process to FIG. 26.

As explained above, the Get FRO process may be implemented via the Sequential (shown in FIG. 26) or the Concurrent (shown in FIG. 28) process. There are many ways to do the Sequential process. As an example of the Sequential process, a customer may select (or purchase) a Product/Set/Order before the Initial Transaction begins. In such situations, said Product/Set/Order may be referred to as Initial Product/Initial Set/Initial Order or IP/IS/IO, in short, respectively. The Initial Set is also referred to as Initial Product Set (or IPS, in short). A customer may get a FRO, i.e., get one or more FRO Products/Sets/Orders on an IP/IPS/IO, respectively. A FRO Product/Set/Order is also referred to as Option Product/Option Set/Option Order, or OP/OS/OO, in short, respectively. An Option Set is also referred to as Option Product Set (or OPS, in short). The two events (one for the Initial Product and the other for the Initial Transaction) may be executed with a minimal (one just after another) or a significant time gap (e.g., few minutes, hours, days and so forth) in between them.

The FRO VOF may be implemented at different levels including, but not limited to, Product, Set and Order. Illustration of these three levels is given through an example in the airline industry as shown in FIGS. 19, 20 and 21, respectively. In the airline industry, the terms, Leg, Segment and Itinerary correspond to the terms, Product, Set and Order, respectively.

FIG. 19 displays a practical example of implementing a FRO (2,1) at the Itinerary (Order) level. The customer selects two separate itineraries, FRO Itinerary 1 and FRO Itinerary 2 (shown in Boxes 19.100 and 19.200), and the airline may select either of them as the Chosen Itinerary.

FIG. 20 displays a practical example of implementing a FRO (2,1) at the Segment (Set) level. A customer selects a round-trip Itinerary with two IFS as shown in Boxes 20.100 and 20.200. The customer then takes FRO on the Onward Journey, i.e., the first IFS, as shown in Box 20.120 and the airline may select either this IFS or the related OFS (Option Flight Segment) as the Chosen Flight Segment for the onward journey.

FIG. 21 displays a practical example of FRO implementation at the Leg (Product) level. A customer obtains FRO on Leg 2 (i.e., Initial Flight Leg or IFL, in short) in the onward journey, and receives one Option Flight Leg (or OFL, in short) on the Leg2, as shown in Box 21.200. The airline may select either the IFL or the associated OFL as the Chosen Flight Leg (or CFL, in short) for Leg2 in the onward journey.

An airline may choose to implement the FRO at any level(s). In a specific FRO interaction between a customer and the airline, the implementation level should be the same for all the FRO Flights, Chosen Flights and Released Flights. For example, if FRO is implemented at the Itinerary level, then all the FRO Flights and Chosen Flights would refer to FRO Itineraries and Chosen Itineraries, respectively.

1. 'Get FRO'—Dynamic Interaction to Capture Customer Demand

In the Get FRO process, a customer interacts with the company's server to receive a FRO. The interaction may take place (for example) via phone, in-person or on a website. The Sequential Get FRO Process is presented first along with its detailed algorithms, followed by a short summary of the Concurrent Get FRO Process.

Sequential Get FRO Process

There are several ways to implement the Sequential process. The following presents an example of the Sequential Get FRO Process when a FRO is implemented at the Set level. It is also assumed here that the customer first purchases an Initial Order with one or more IPS, and then opts to receive a FRO on any of the included IPS.

To demonstrate the process, an example of the FRO VOF in the airline industry is used. As an instance of the Sequential Get FRO process in the airline industry, a customer has purchased an Itinerary and then gets a FRO through the interactive interface of the web pages as shown in FIGS. 22, 23, 24 and 25. FIG. 22 displays the summary of the purchased Itinerary, which is made of two Segments: BOS to ATL (onward journey) and ATL to BOS (return journey). Clicking on the marketing banner representing "Get FRO", the customer is linked to the Web page shown in FIG. 23 and a Get FRO interaction begins.

The series of web pages in FIGS. 23, 24 and 25 may (for example) be displayed in a customer's browser by a company's web server, to facilitate the interaction between the customer and the airline when the customer comes to participate in Get FRO (during or after the Initial Itinerary is purchased). The Initial Itinerary is displayed in FIG. 23. The customer may choose to Get FRO on any IFS by clicking the "Click here to Get FRO Flights" link corresponding to that IFS. Once the link is clicked, the "Search FRO Flights" section appears (shown in FIG. 23), where the customer may enter the search criteria for OFS and then click on the "Search FRO Flights" button. After the click, the Get FRO algorithm running "behind the scenes" on a server of the company qualifies the availability, applicability and price (i.e., the discount for customer) conditions on all the available OFSs (Option Flight Segments) and displays them in the screen as shown in FIG. 24. For each of the OFSs, Instant FRO Discount (Price), a set of one or more Notify Deadlines and the corresponding FRO Exercise Discounts (Prices) are shown in the form of "Select" buttons (shown in the "FRO Notify Deadline/FRO Exercise Discount (Price)" section in FIG. 24). The customer may select any desired OFS (along with the Notify Deadline and FRO Exercise Discount (Price)) by clicking on a "Select" button associated with any of the Notify Deadlines displayed in the corresponding row. Once the customer clicks the "Select" button, he/she is hyperlinked to the web page as shown in FIG. 25, where the summary of the IFS and the selected OFS is shown.

Next, the customer may choose to get more OFS on the same IFS, or to get FRO on another IFS in the Initial Itinerary. To receive another OFS on an IFS, the customer may repeat the OFS search process for that IFS. Once all the desired OFSs have been selected, the customer clicks the "Continue" button (shown in FIG. 25). The customer receives the Instant FRO Discount (Price), and then a payment transaction is executed to complete the purchase.

The following presents an algorithmic illustration of the Sequential Get FRO process. Consider FIG. 26. In Act 26.100, the customer selects (and/or purchases) an Order (with one or more IPS). Next, in Act 26.110, the customer reaches an interactive interface of the company's web server to Get FRO page, where the customer selects the IPS (referred to as Target_IPS) on which a FRO is desired. Next, the customer inputs the OPS search criteria for the current Target_IPS in Act 26.115.

Next, on clicking the "Search FRO Products" button, control goes to Act 26.120, where the OPS search algorithm is executed to search for an OPS. The OPS search algorithm returns a list of valid OPSs, along with a list of Comb_NDs (defined elsewhere) and associated FRO Prices (or discounts). The details of the OPS search algorithm are presented later. Next, the search results are displayed for the customer, who then selects the desired OPS and one or more associated Comb_ND(s)/FRO Price(s), as shown in Act 26.130.

Next, in Act 26.140, a test is performed to determine whether the customer wants to get more OPSs on the current Target_IPS or on another IPS. If the customer wants to get an OPS on another IPS, control loops back to Act 26.110, where the customer selects another IPS as the Target_IPS, and then the process is repeated again for the new Target_IPS. If the customer wants to get more OPSs on the current Target_IPS, control loops back to Act 26.115, where the customer enters the OPS search criteria, and then the process is repeated for the new OPS search criteria. If the customer does not want to get any more OPSs, control goes to Act 26.150, where a payment transaction (if needed) may be executed. For example, a customer may need to pay a price for the Product after taking into consideration the Initial FRO Price (discount, if any) using a credit card, direct bank account debit or any other payment transaction mechanism. Next, the algorithm ends in Box 26.200. The computation may be performed using a processor that may calculate results in optimal time.

OPS Search

Figure 27:
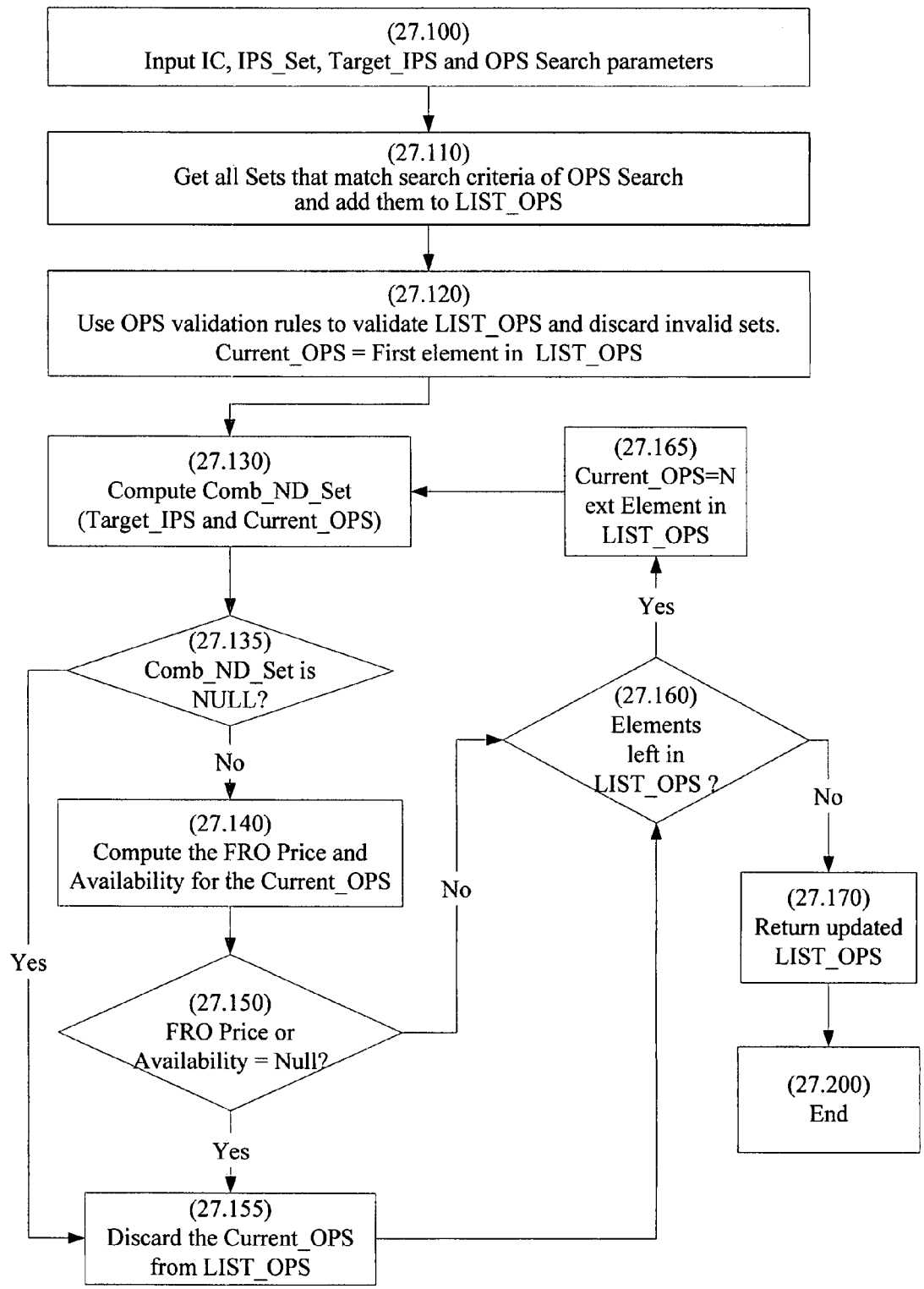
FIG. 27 is a flowchart that expands Act 120 of FIG. 26, illustrating an algorithm to search for FRO Product Sets.

The following algorithm (shown in FIG. 27) determines and validates an OPS for a given set of conditions including, but not limited to, availability, Notify Deadline and FRO Price.

In Act 27.100, the number of customers (IC), IPS_Set (containing all IPS in the Initial Order, and all the OPSs, (if any) already selected/received along with Comb_ND_Set(s) and Comb_OP_Set(s), for each IPS), Target_IPS and the OPS Search parameters are input to the system. The definitions and details of Comb_ND_Set and Comb_OP_Set are provided later. The OPS search parameters include, but are not limited to, date, time and location, number of Products per Set, Notify Deadline, FRO Price (Initial and Exercise) and so forth. A customer may be allowed to input Notify Deadline and/or FRO Price on the basis of which valid OPSs (that satisfy the given criteria of Notify Deadline and/or FRO Price) may be searched for and displayed for the customer. In the airline industry, for example, a customer may be asked to input the origin and destination related parameters, and then a set of Notify Deadlines and FRO Prices may be computed for the flights that match the given criteria. In another example, a customer may input both the origin and destination and Notify Deadline and/or FRO Price as inputs and then a search may be performed for valid OFSs. In yet another example, a customer may input to the system, one or more flights, and/or inputs to search for one or more additional flights (e.g., origin and destination, price etc.) to search for OFS that may be combined with one or more input flights (by the customer) to constitute the total set of flights for a FRO. In such situations, an airline may also validate the flights input by the customer to determine if said flights are eligible to be the FRO Flights.

Next, control goes to Act 27.110, where an OPS Search is performed for the given criteria. The search may be best performed using a processor that may calculate results in optimal time. The order in which search parameters are executed may be optimized to reduce the search time, however, it may or may not affect the final outcome. A company may select any order of its choosing.

In Act 27.110, Product Sets are determined that match the search criteria and the resulting Sets are added to a list termed LIST_OPS. Next, in Act 27.120, a list of OPS validation rules is obtained from the company's FRO VOF database and the rules are used to validate all the Sets in the LIST_OPS list. Sets that do not satisfy the rules are discarded. Validation rules may include, but are not limited to, a Maximum Number of Products per Set Rule, a Maximum Product Price Rule and so forth. A Maximum Number of Products per Set Rule discards the Sets that have more Products than specified. A company may implement any validation rule of its choosing to further qualify the Sets in the LIST_OPS list. As a last Act in Act 27.120, the first element in the updated LIST_OPS list is designated as the Current_OPS.

Next, control goes to Act 27.130, where a group of Comb_NDs is computed for the combination of the Target_IPS, all the existing OPS of the Target_IPS and the Current_OPS, and added to a set called Comb_ND_Set. Next, in Act 27.135, a test is performed to determine whether the Comb_ND_Set obtained in the previous Act is Null. If so, control goes to Act 27.155. If not, control goes to Act 27.140, where the FRO availability and FRO Price for the Comb_ND_Set are determined. Next, in Act 27.150, another test is performed to determine whether the FRO Availability or the FRO Price is Null. If so, control goes to Act 27.155. If not, control goes to Act 27.160.

In Act 27.155, the Current_OPS is discarded from the LIST_OPS list, and control goes to Act 27.160, where a test is performed to determine if more elements are left in the LIST_OPS list. If so, control goes to Act 27.165. If not, control goes to Act 27.170.

In Act 27.165, the next element in the LIST_OPS list is designated as the Current_OPS and control loops back to Act 27.130 to repeat the process for the new Current_OPS. In Act 27.170, the updated LIST_OPS list is returned as the search result, and the algorithm ends in Box 27.200.

Computation of Notify Deadlines

A company may set one or more Notify Deadlines of its choosing for its Products. Once the Notify Deadlines have been set for each Product, the next Act is to create a framework to compute the Notify Deadlines for a group of Products (such as a Set, an Order or any other group). The following sections present an example of a framework that may be used to obtain a set of Notify Deadlines applicable to a group of Products. A company may use any framework and algorithm of its choosing to obtain the same.

A set of Notify Deadlines associated with a Product, a Set and a combination of two or more Sets is called Product_ND_Set, Set_ND_Set and Comb_ND_Set, respectively. Each element in the Product_ND_Set, Set_ND_Set and Comb_ND_Set is termed Product_ND, Set_ND and Comb_ND, respectively. The Comb_ND_Set may be computed by combining the Set_ND_Sets of all the given Sets. A Set_ND_Set may be computed by combining the Product_ND_Sets of all the Products under that Set. The Notify Deadlines can be computed based on various parameters and factors of the company choosing. One example to compute a Comb_ND_Set is as follows. First compute Set_ND_Set for all Sets. A Set_ND_Set is computed by first selecting earliest of the Notify Deadlines of each Product within the concerned Set, and then picking the latest of those Deadlines, and noting that as the Target_Deadline. Next step is to pick all those Notify Deadlines that fall after the Target_Deadline. Notify Deadlines thus obtained may be validated using various validation rules based on company factors such as customer utility, product parameters and so forth. Similarly, the Comb_ND_Set may thus be computed by repeating the above process for Set_ND_Sets, thus obtained for each Set.

Available Capacity Check

The FRO capacity for an OPS may depend on one or more factors including, but not limited to, Notify Deadline, FRO Prices, expected Product value and so forth. A company may use any method of its choosing to determine FRO capacity of a product. For example, a company may choose to have a fixed FRO capacity for one or more of its products.

An instance to compute FRO capacity is discussed below. Consider the case, when FRO Capacity is dependent on Notify Deadline. In such situation, the objective is to determine those Comb_NDs within the Comb_ND_Set on which FRO is available for the given OPS. The FRO Capacity and the Used FRO Capacity (the total number of Products on which FRO has been sold but not exercised) may be calculated for each Comb_ND within the Comb_ND_Set. Available Capacity (AC) would then be the difference of FRO Capacity and Used FRO Capacity for the given Product. If the AC is greater than or equal to the number of incoming customers desiring a FRO, then the FRO capacity is available at a given Comb_ND for the given OPS. The process may be repeated for all Notify Deadlines within Comb_ND_Sets.

FRO may be made available on a given OPS for a given Comb_ND, if FRO is available on all the Products of OPS for the given Comb_ND.

Price Calculation

A company may set FRO Prices for a Product using any method of company's choosing. Once the FRO Prices have been set for each Product, the next Act is to create a framework to compute FRO Price for a group of Products (such as a Set, an Order or any other group) by using FRO Prices for each Product in the group.

The parameter Product_OP refer to FRO Price (and may or may not be corresponding to a Notify Deadline) associated with a Product. Similarly, Set_OP and Comb_OP refer to FRO Price (may or may not be corresponding to a Notify Deadline) associated with a Set and a combination of two or more Sets, respectively. A set of Product_OPs, Set_OPs and Comb_OPs is termed Product_OP_Set, Set_OP_Set and Comb_OP_Set, respectively. The Comb_OP_Set is computed by combining the Set_OP_Sets of the IPS and all the OPSs (existing and new). A Set_OP_Set is computed by combining the Product_OP_Sets of all the Products under that Set. One or more Set_OP_Rules may be read from the company's database and applied to calculate Set_OP_Set for each input Segment (IPS and all OPSs) using the Product_OP_Sets of all the Products of said Set. A company may use any Set_OP_Set Rule of its choosing. Set_OP_Rules may be defined to calculate Set_OP as the sum, average, highest, lowest or any other function of Product_OPs of all the Products at a given Comb_ND. Similarly, a Comb_OP_Set consists of one or more Comb_OPs, and is calculated using one of the pre-determined rules, termed Comb_OP_Rules, to combine the Set_OPs of all the Sets in the combination. A company may use a Comb_OP_Rule of its choosing. Comb_OP_Rules may be defined similar to the Set_OP_Rules.

Concurrent Get FRO Process

As explained above, in the Concurrent Get FRO process, a customer receives all FRO Products concurrently in one transaction. An algorithmic illustration of the Concurrent Get FRO process is displayed in FIG. 28. The FRO (2,1) instance is assumed here as an example. Consider a customer who desires to trade-in his/her flexibility in lieu of a price (reward) offered by the company. In Act 28.100, the customer desires for FRO are input, including, but not limited to, a search criteria for two Sets according to customer's utility (may be similar to the search criteria defined above for the Sequential Get FRO process).

Next, in Act 28.110, the FRO algorithm is run to determine the combinations of two Sets that satisfy inputs. A list of such search results is displayed for the customer along with the associated terms and conditions including, but not limited to, Notify Deadlines, Initial FRO Price, FRO Exercise Price and Product Price for each such combination. The FRO algorithm for the Sequential Get FRO process (defined above) may also be used for the Concurrent Get FRO process.

Next, in Act 28.120, the customer selects a desired combination of two Sets and the associated conditions such as FRO Exercise Price/Notify Deadline. Next, in Act 28.130, a payment transaction is executed, if needed. For example, the customer may pay the Product Price after taking into consideration the Initial FRO Price using a credit card, direct bank account debit or any other payment transaction mechanism. Next, the algorithm ends in Box 28.200. The computation may be performed using a processor that may calculate results in optimal time.

2. Event Optimizer

After the completion of the Get FRO process, the next stage is the Event Optimizer. In this stage, the customer notification (or CN, in short) process as shown in Act 18.200 is executed. In this process, one or more decisions on the selection of Chosen Product(s) is notified to the customer. The details of the CN process are provided later.

The FRO VOF helps to create a flexible customer inventory. In other words, by using the FRO VOF, a company may obtain rights to allocate any of the selected FRO Product to a FRO customer, and thus, said FRO customer acts like a flexible customer inventory that the company may manage at known cost and conditions. A company may design one or more uses of such flexible customer inventory, where each such use may include one or more events that follow the Initial Transaction. An example (the Buy_N process) was explained earlier. In the Buy_N process, a company may use the FRO VOF to accommodate requests from potential customers for products. As an example, the Buy_N process may especially be used to satisfy requests for products that have already been sold or have low (or no) availability. The details for the Buy_N process are presented below.

Another example to use the FRO VOF would be to use the FRO VOF in conjunction with one or more other VOFs, for example, the APO (the Alternate Product Option) VOF (details are provided later). A company may form a group of one or more APO customers and one or more FRO customers, where the options (APO and FRO) obtained by the group members are complementary in nature. As an example, consider a customer (A) who bought an APO to choose either of P1 and P2 as Chosen Product, and consider a customer (B) who received a FRO and is flexible to take any of P1 and P2 as Chosen Product. Thus, if A decides to choose P1 as the Chosen Product, the company may assign P2 as the Chosen Product for B, and vice versa. The customers A and B have taken complementary options and may form a group. The company may need to hold only one unit of inventory in P1 and P2 to satisfy the needs of both A and B (assuming each A and B only need one unit of product). Such a combination of complementary options or VOFs may improve efficiency and concurrently enhance value for all the parties involved (in the given example, for A, B and the company). More details on combining VOFs are provided later.

The FRO VOF may also be used to reduce operational costs, constraints or other goals that are impacted by the allocation of products among different customers. For example, the FRO VOF may be used to shave off production costs by reducing production capacity for one or more products that are low in demand. For example, in the airline industry, if an airline experiences a flight with very low ticket sales, it could offer FRO to customers on that flight and thus, be able to economically and efficiently shift them to different flights and thereby be able to cancel said flight to save its flying costs (such as crew costs, staffing costs like gate agents, ground mechanics, maintenance costs and so forth). If an airline wants to do the same on a low demand flight today (after booking few customers on it) without using FRO, it may be more difficult, tedious and costly affair to contact all the booked customers on that flight and/or to convince them to shift to other flights.

The FRO VOF structure in the airline industry may enable an airline to optimize operational levels such as flight loads (or load factors), airport congestion, flight scheduling, airport staff and crew scheduling and so forth. The FRO VOF may also enable an airline to identify the optimal aircraft sizes/structures and flight schedules on specific routes. There may be many other instances of optimization an airline can achieve by using FRO, thus, generating additional revenue, greater customer satisfaction and loyalty or any combination of these.

A company may use the FRO VOF for any other purpose of its choosing. In all such uses, the company may use a system defined below that can help to optimally allocate product capacity among customers. The following system presents an example of a system (along with its methods and algorithms) that may be used to shift FRO customers within their selected FRO Products. However, a company may use any other process of its choosing to shift FRO customers within their selected FRO Products. The Buy_N process is used as an example to demonstrate the system and its set of methods and algorithms.

The process of shifting Y customers (i.e., FRO customers) within their selected FRO Products is termed "Remove_Y" process. The Remove_Y process may allow the company to remove FRO customers from their Accounted Products and optimally shift them to one of their Awaiting Products to satisfy a pre-defined goal.

Buy_N Process

Figure 29:
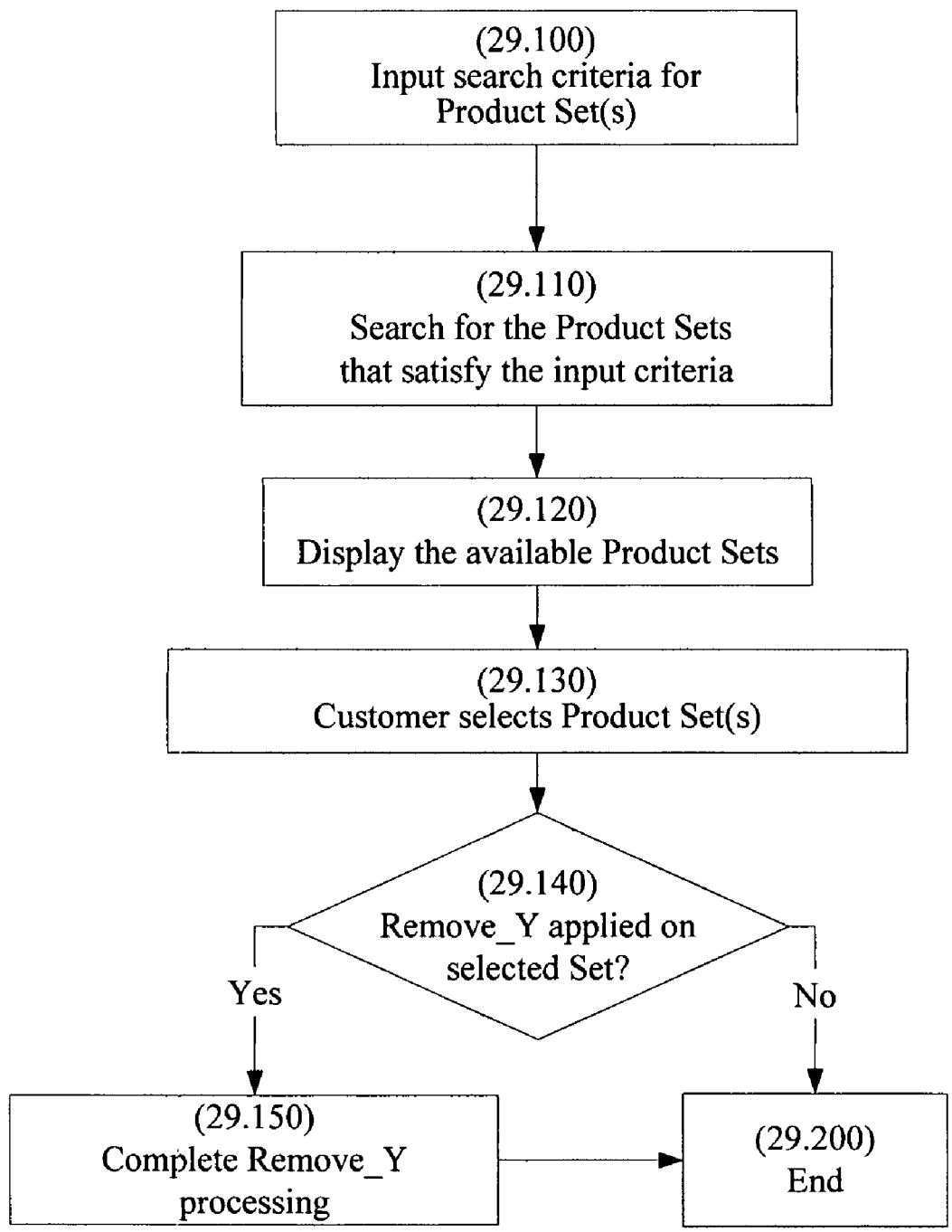
FIG. 29 is a flowchart illustrating the Buy_N process for a Product Set of a company that has implemented the FRO VOF.

FIG. 29 displays a flow chart of an example of a Buy_N algorithm, which is executed during a dynamic interaction between the customer and the company. As an example, an interaction may include a situation when a customer interacts with a company to obtain (or purchase) products, or when a company presents offerings to a customer (with or without a solicitation by the customer). A few parameters have been assumed to add context and enhance understanding. It is assumed that a customer is interacting with a company to purchase products, and that FRO VOF is implemented at the Set level. In Act 29.100, the search criteria are input. Various search parameters for a desired Product Set (as desired by the customer) are taken as the input to the system.

Next, in Act 29.110, a search process is executed to search for all Product Sets that satisfy inputs. The details of the search process are described later. Next, in Act 29.120, all the search results are displayed before the customer in an interface (such as in a web browser, a telephone operator stating the search results over the phone etc.). Control then goes to Act 29.130, where the customer selects a Set (or Product Set). The selection of the Set may be followed by a payment and/or purchase of the selected Set.

In Act 29.140, a test is performed to determine whether Remove_Y process has been applied on the selected Set. If so, control goes to Act 29.150, where the Remove_Y process is completed for the selected Set, and control then goes to Box 29.200. If not, control goes to Box 29.200, where the algorithm exits. The completion of the Remove_Y process may include one or more Acts that may be executed to incorporate the fact that said Set was selected by the customer. For example, one of such acts may be to record the selection of said Set to a database and/or to change the Accounted Status for one or more FRO customers (who were affected in the Remove_Y process).

Figure 30:
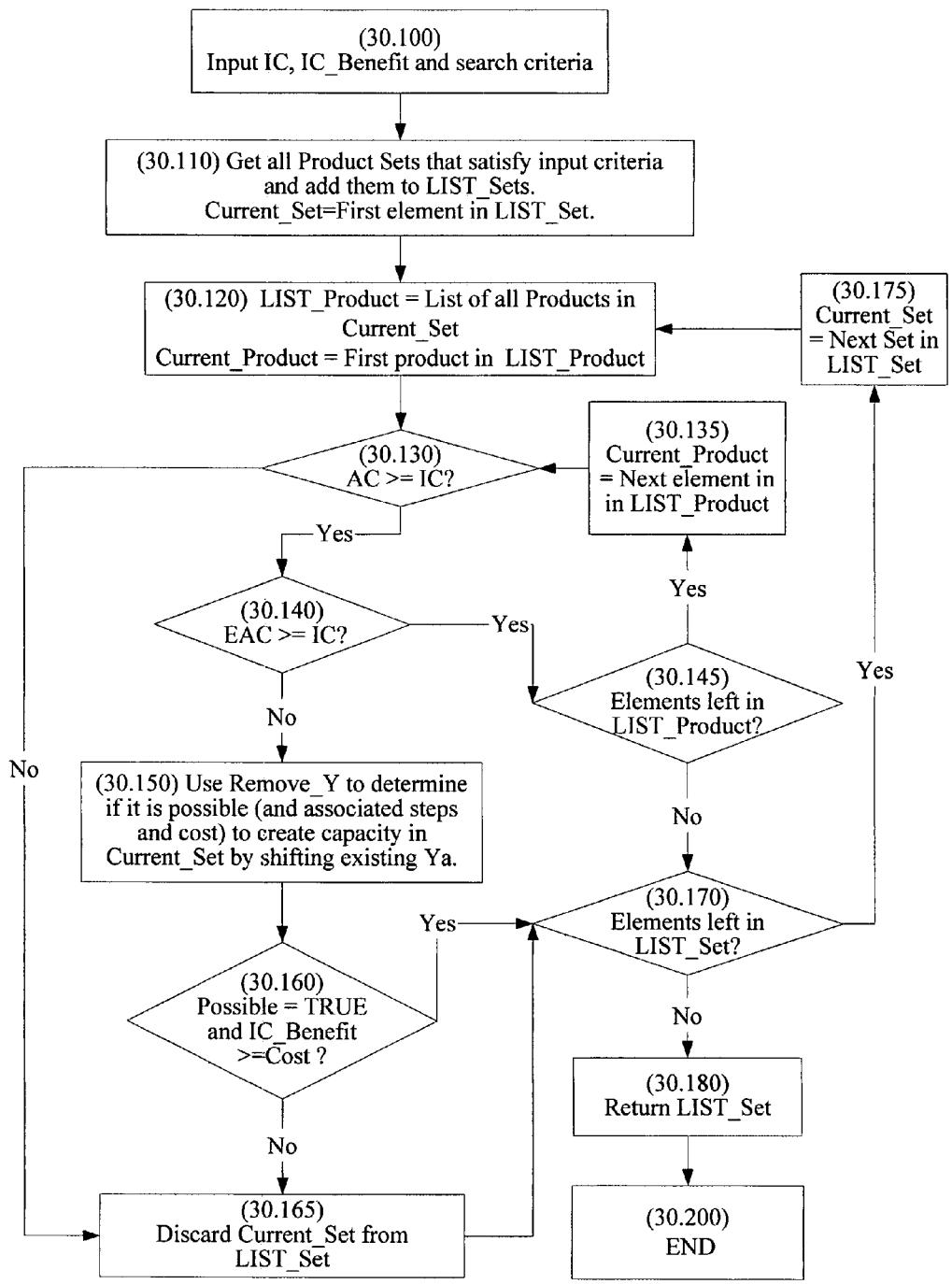
FIG. 30 is a flowchart that expands Act 110 of FIG. 29, illustrating an algorithm for the Buy_N search process.

FIG. 30 expands Act 110 of FIG. 29 and demonstrates an example of a search algorithm that may be used to determine Product Sets that satisfy the inputs. In Act 30.100, IC (number of incoming customers), IC_Benefit (i.e., the benefit that a company may receive if the incoming customers select and/or purchase one or more Sets) and the input search criteria are taken as the input parameters to the system. The term "Incoming Customers" refers to the customers who interact with the company in the current transaction (Buy_N). It is assumed that each customer desire one unit of capacity and thus, total units of capacity desired is equal to the total number of incoming customers. In some situations, IC_Benefit and/or IC may not be available as an input, and may be calculated during the search process. Next, in Act 30.110, all the Sets that satisfy the 'search criteria' are searched from the company database.

The Sets, thus obtained, are added to a list termed LIST_Set. The first element in the LIST_Set list is designated as Current_Set.

Next, in Act 30.120, all the Products in the Current_Set are added to a list termed LIST_Product. The first element in the LIST_Product list is designated as Current_Product. Next, in Act 30.130, a test is performed to determine whether the Available Capacity (AC) of the Current_Product is greater than or equal to IC. If so, control goes to Act 30.140. If not, control goes to Act 30.165.

In Act 30.140, another test is performed to determine whether EAC (Effective Available capacity) of the Current_Product is greater than or equal to IC. If so, control goes to Act 30.145. If not, control goes to Act 30.150, where the Remove_Y algorithm is executed to determine the possibility (and associated process steps and costs) to create capacity in the Current_Set.

Next, in Act 30.160, a test is performed to determine whether it is possible (by using Remove_Y) to create capacity in the Current_Set and the IC_Benefit is greater than or equal to the cost to create that capacity as determined in the Act 30.150. If both conditions are true, control goes to Act 30.170. If either condition is false, control goes to Act 30.165. In Act 30.165, the Current_Set is discarded from the LIST_Set list, and control then goes to Act 30.170.

In Act 30.145, a test is performed to determine whether more elements are left in the LIST_Product list. If so, control goes to Act 30.135, where the next element in the LIST_Product list is designated as the Current_Product and control loops back to Act 30.130, to repeat the process for the new Current_Product. If not, control goes to Act 30.170.

In Act 30.170, another test is performed to determine whether more elements are left in the LIST_Set list. If so, control goes to Act 30.175, where the next element in the LIST_Set list is designated as the Current_Set and control loops back to Act 30.120, where the process for the new Current_Set is performed. If not, control goes to Act 30.180, where the LIST_Set list (the most recently updated version after discarding the invalid Sets, if any) is returned. Next, the algorithm ends at Box 30.200.

Figure 31:
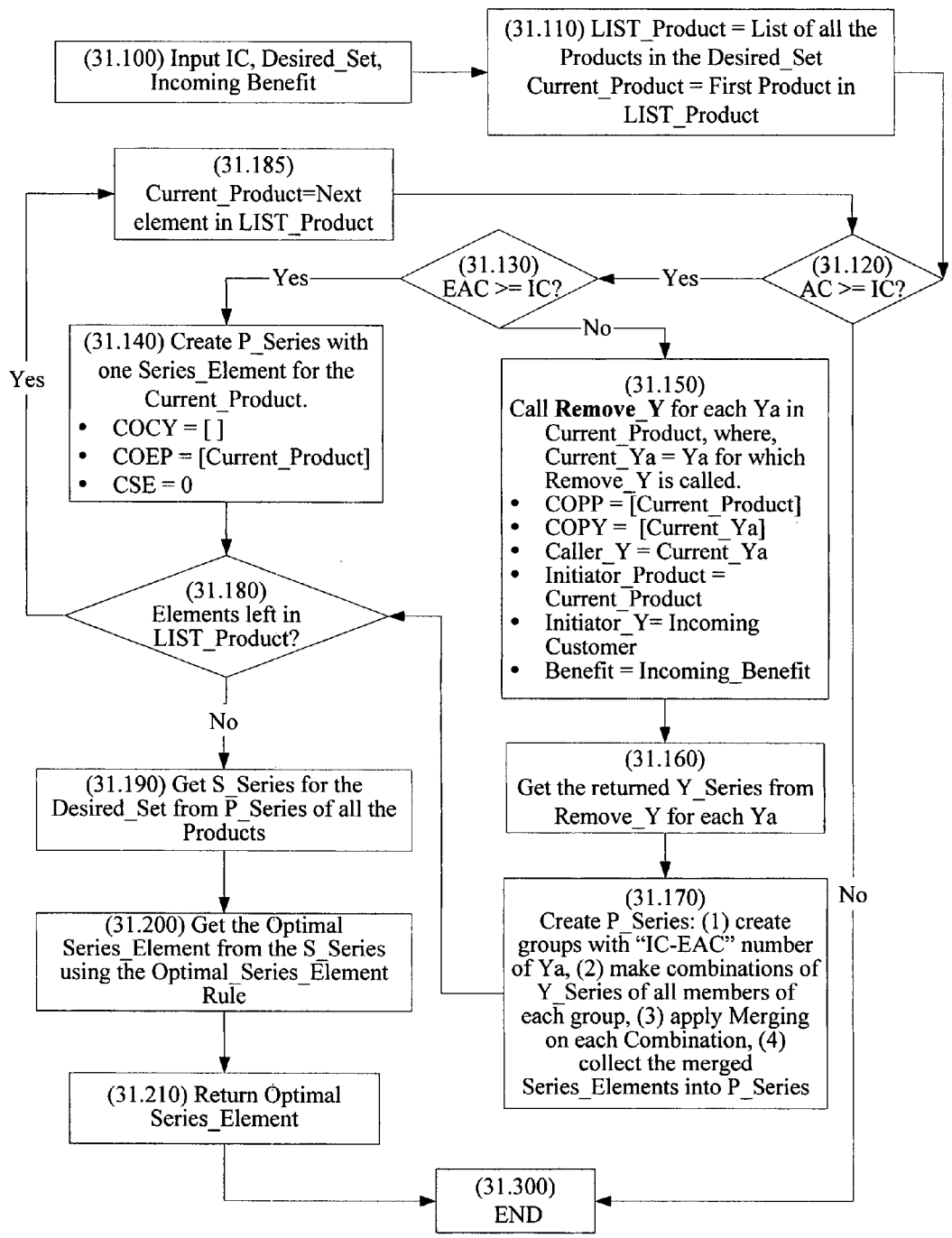
FIG. 31 is a flowchart that expands Act 150 of FIG. 30, illustrating an algorithm to create capacity using the Remove_Y algorithm.

FIG. 31 expands Act 150 of FIG. 30 and demonstrates an example of an algorithm to apply the Remove_Y algorithm to create one or more than one unit of capacity in one or more Product(s) within a Desired_Set (the Set in which capacity needs to be created). In Act 31.100, various input parameters are taken in the system. Input parameters include IC, Desired_Set and Incoming_Benefit (i.e., benefit a company may realize if capacity is created in the Desired_Set)

Next, control goes to Act 31.110, in which all the Products in the Desired_Set are listed in the LIST_Product list. The first Product in the LIST_Product list is designated as Current_Product; Next, in Act 31.120, a test is performed to determine whether the Available Capacity (AC) of the Current_Product is greater than or equal to IC. If so, control goes to Act 31.130. If not, control goes to Box 31.300, where the algorithm ends. In Act 31.130, another test is performed to determine whether EAC (Effective Available capacity) of the Current_Product is greater than or equal to IC. If so, then control goes to Act 31.140. If not, control goes to Act 31.150.

In Act 31.140, a P_Series is created for the Current_Product. Since the Current_Product is an End_Product, there will be only one Series_Element in the P_Series collection. The Series_Element will consist of COEP with the Current_Product as the only element, COCY with no elements and CSE with zero value (since no Ya needs to be removed from Current_Product, and hence, no cost to create capacity). Next, control goes to Act 31.180.

In Act 31.150, the Remove_Y algorithm is called for each Ya in the Current_Product and the algorithm follows a recursive loop. Each of the Ya becomes Current_Ya for the corresponding Remove_Y call. The necessary input parameters for each of the Remove_Y includes the Current_Product as 'COPP', Current_Ya as 'COPY', Current_Ya as 'Caller_Y', Current_Product as 'Initiator_Product', one of the incoming customers as 'Initiator_Y' and Incoming_Benefit as 'Benefit'. The Remove_Y call returns a Y_Series collection for each Ya in the Current_Product. The details of the Remove_Y algorithm are discussed in the next section.

Next, control goes to Act 31.160, where all the Y_Series collections are obtained as returned from the Act 31.150. Next, in Act 31.170, a P_Series collection for the Current_Product is calculated through the following operations: (1) create groups of Ya from all Ya of the Current_Product for which Remove_Y was called, where the number of Ya in each group is equal to "IC-EAC" (EAC of the Current_Product), (2) make combinations of the Y_Series collection of all members of each group (combine each Series_Element of each Y_Series of each member with that of each of the rest of the members of that group), (3) merge all members within each combination to formulate a merged Series_Element, (4) collect all such merged Series_Elements, thus obtained, into P_Series collection of the Current_Product. Details on making combinations and merging are provided later.

Next, in Act 31.180, a test is performed to determine whether more elements are left in the LIST_Product list. If so, control goes to Act 31.185, where the next element in the LIST_Product list is designated as the Current_Product and control loops back to Act 31.120 to repeat the process for the new Current_Product. If not, control goes to Act 31.190.

In Act 31.190, a S_Series collection for the Desired_Set is calculated from the P_Series collections of all the Products using the combination and merging process (details provided later). Next, in Act 31.200, an optimal Series_Element from the S_Series collection is determined using Optimal_Series_Element Rule (which is read from a database). Next, control goes to Act 31.210, where the optimal Series_Element is returned and the algorithm exits at Box 31.300.

'Remove_Y' Algorithm

Figure 32:
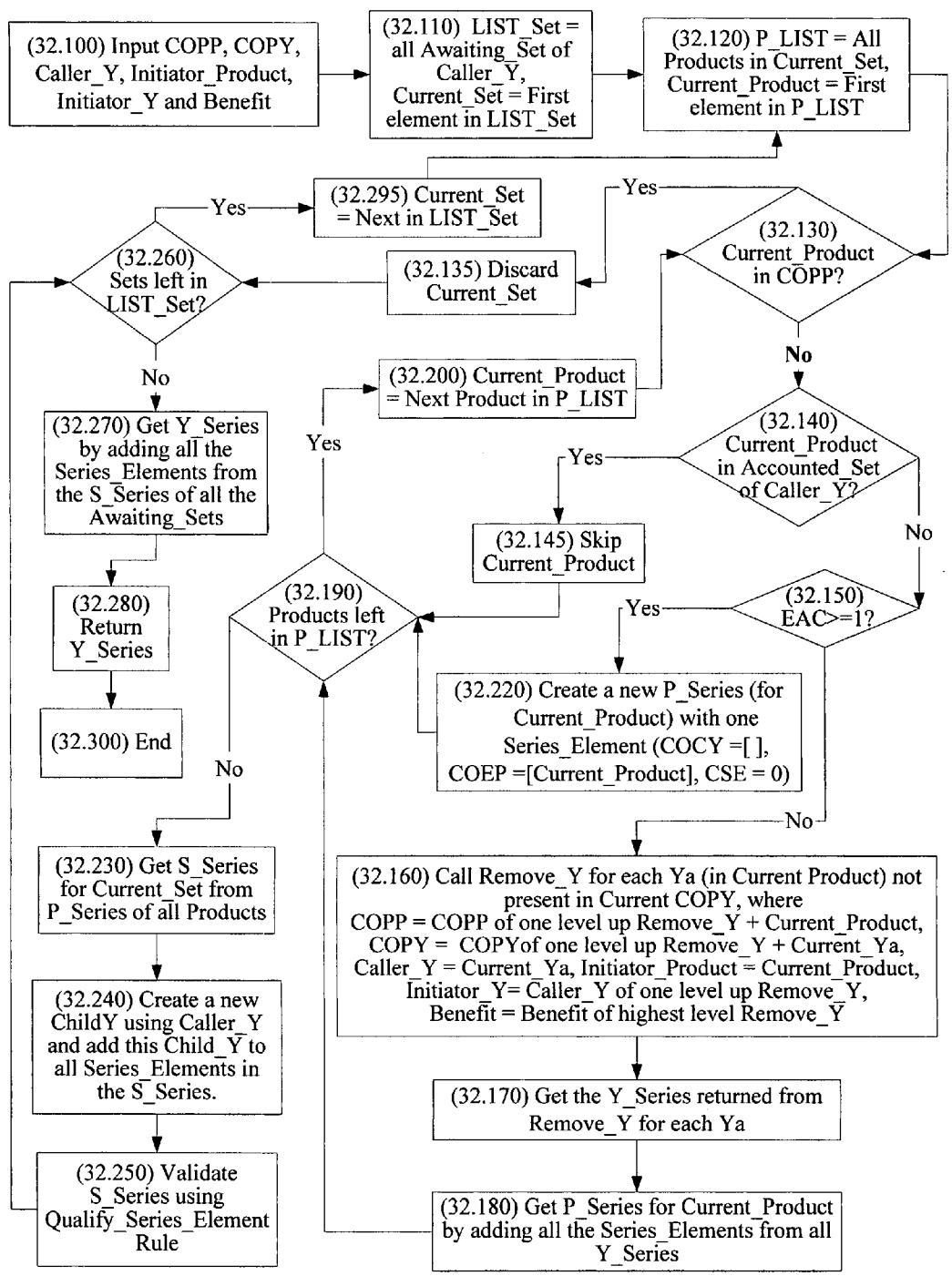
FIG. 32 is a flowchart that expands Act 150 of FIG. 31, provides an algorithmic illustration for the Remove_Y algorithm.

The following algorithm presents an example of an algorithm that may be used to create one unit of capacity of a Product by shifting a Ya Accounted in a Product to its Awaiting_Set. FIG. 32 represents an algorithmic illustration for Remove_Y. The Remove_Y is a recursive algorithm, which returns a collection of Series_Element termed "Y_Series" collection for the Ya for which the algorithm has been called.

In Act 32.100, a set of parameters including COPY, COPP, Caller_Y, Initiator_Product, Initiator_Y and Benefit are input to the system. Next, in Act 32.110, all the Awaiting_Sets of the Caller_Y are added to a list termed LIST_Set. The first element in the LIST_Set list is designated as Current_Set. Next, in Act 32.120, all the Products that belong to the Current_Set are added to another list termed P_LIST. The first element in the P_LIST list is designated as Current_Product.

Next, in Act 32.130, a test is performed to determine whether the Current_Product is present in the COPP. If so, the Current_Set is discarded in Act 32.135, and control goes to Act 32.260. If not, control goes to Act 32.140.

In Act 32.140, another test is performed to determine whether the Current_Product is present in the Accounted_Set of the Caller_Y. If so, the Current_Product is skipped in Act 32.145, and control then goes to Act 32.190. If not, control goes to Act 32.150, where another test is performed to determine if the EAC of the Current_Product is greater than or equal to 1. If so, control goes to Act 32.220. If not, control goes to Act 32.160.

In Act 32.220, a new P_Series collection is created with only one Series_Element, since the Current_Product is an End_Product. The Series_Element will consist of COEP with the Current_Product as the only element, COCY with no elements and CSE with zero value. Next, control goes to Act 32.190.

In Act 32.160, the algorithm enters into a recursive loop where the Remove_Y algorithm is called for each of the Ya in the Current_Product that is not present in the COPY. Each of the Ya becomes Current_Ya for the corresponding Remove_Y call. The necessary input parameters for each of the Remove_Y includes 'COPP' (includes the COPP of one level up Remove_Y and the Current_Product), 'COPY' (includes the COPY of one level up Remove_Y and the Current_Ya), the Current_Ya as 'Caller_Y', the Current_Product as 'Initiator_Product', Caller_Y of one level up Remove_Y as 'Initiator_Y' and benefit of the highest level Remove_Y as 'Benefit'. Each of the Remove_Y call returns a Y_Series collection for every Ya for which Remove_Y was called.

Next, in Act 32.170, the algorithm receives the returned Y_Series collection from all the Remove_Y algorithm calls in Act 32.160. Control then goes to Act 32.180, where a P_Series collection for the Current_Product is calculated by adding all the Series_Elements from all the returned Y_Series collection obtained in Act 32.170. Control then goes to Act 32.190.

In Act 32.190, a test is performed to determine whether more Products are left in the P_LIST list. If so, control branches out to Act 32.200, where the next Product in the P_LIST list is designated as the Current_Product, and control then goes to Act 32.130 where the process is repeated for the new Current_Product. If not, control goes to Act 32.230.

In Act 32.230, the S_Series collection is calculated for the Current_Set by combining and merging all the P_Series collection of all the Products (not taking the skipped Product(s) into consideration, if any). Next, in Act 32.240, a new ChildY is created using the Caller_Y. The ChildY consists of COI (where the current Initiator_Product is designated as Initiator_Product and the current Initiator_Y is designated as Initiator_Y), Accounted_Set of the Caller_Y designated as the Initial_Accounted_Set, current Awaiting_Set designated as the Final_Accounted_Set, and the cost to shift current Caller_Y from the Initial_Accounted_Set to the Final_Accounted_Set designated as the CCY. The ChildY, thus created, is added to every Series_Element in the S_Series collection and the CCY of the same ChildY is added to the CSE (Cost of Series_Element) of every Series_Element. Control then goes to Act 32.250.

In Act 32.250, a Qualify_Series_Element rule is read from the company's database and is applied to validate all the Series_Elements in the S_Series collection. The invalid Series_Elements are discarded from the S_Series collection. A company may select any rule of its choosing. For example, a Qualify_Series_Element rule may only qualify those Series_Elements for which the CSE is less than or equal to the 'Benefit'. Next, control goes to Act 32.260.

In Act 32.260, a test is performed to determine whether more Sets are left in the LIST_Set list. If so, control branches out to Act 32.295, where the next element in the LIST_Set list is designated as the Current_Set, and then control loops back to Act 32.120, where the process is repeated for the new Current_Set. If not, control goes to Act 32.270, where the Y_Series collection is obtained by adding all the Series_Elements of all the S_Series collections for all the Awaiting_Sets of the Caller_Y. Next, the Y_Series collection is returned in Act 32.280, and the algorithm ends in Box 32.300.

Combinations of P_Series in order to formulate S_Series are calculated by cross multiplication of Series_Elements (of each P_Series). A company may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, $C1=\{S_1[1], S_2[1], S_3[1], \ldots S_n[1]\}$, where, $S_p[1]$ denotes the first Series_Element of $p^{th}$ Series; $C2=\{S_1[2], S_2[1], S_3[1], \ldots S_n[1]\}$, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of Y_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various products involved. A given unit of product capacity at any given point must only be accounted for one customer, otherwise, it may lead to a shortage situation, where one product is allocated to more than one customer leading to dissatisfaction for customers. A company may choose any method of its choosing to perform merging of Series_Elements, and specifically to perform merging of two Series_Elements. The method of merging chosen may affect the total value realized. One example of such a method is given. In one approach, a company may choose to discard all merged Series_Elements that have either one or more common ChildY or common End_Product. A common ChildY in two Series_Elements suggest that in both Series_Elements shifting of one specific Ya is needed. If each Series_Element requires shifting of Ya to two different Sets, it may present a contradictory situation. Similarly, a common End_Product in two or more Series_Elements (that are to be merged together) may require to shift more than one Ya customer to a specific Product, which may or may not be feasible depending on the AC (and EAC) of that product. Thus, a common End_Product may also represent one or more contradictory or invalid situations.

A company may use any set of rules to validate or invalidate one or more constituents of any of the merged components. For example, a merged Series_Element, M, obtained from merging of two Series_Elements S1 and S2, may consist of the COEP (addition of COEP of S1 and S2), COCY (addition of COCY of S1 and S2) and CSE (addition of CSE of S1 and S2).

Customer Notification Process

In the customer notification (CN) process, a decision for the Chosen Product is notified to the customer. As mentioned earlier, the Chosen Product may be defined by the company, the customer, another entity or any combination thereof. However, the company may want to keep the right to select (or define) the Chosen Product in the FRO VOF. A company may use any method of its choosing to define the Chosen Product. A company may use a software application built on the method defined above to optimally define the Chosen Product to FRO customer.

Figure 33:
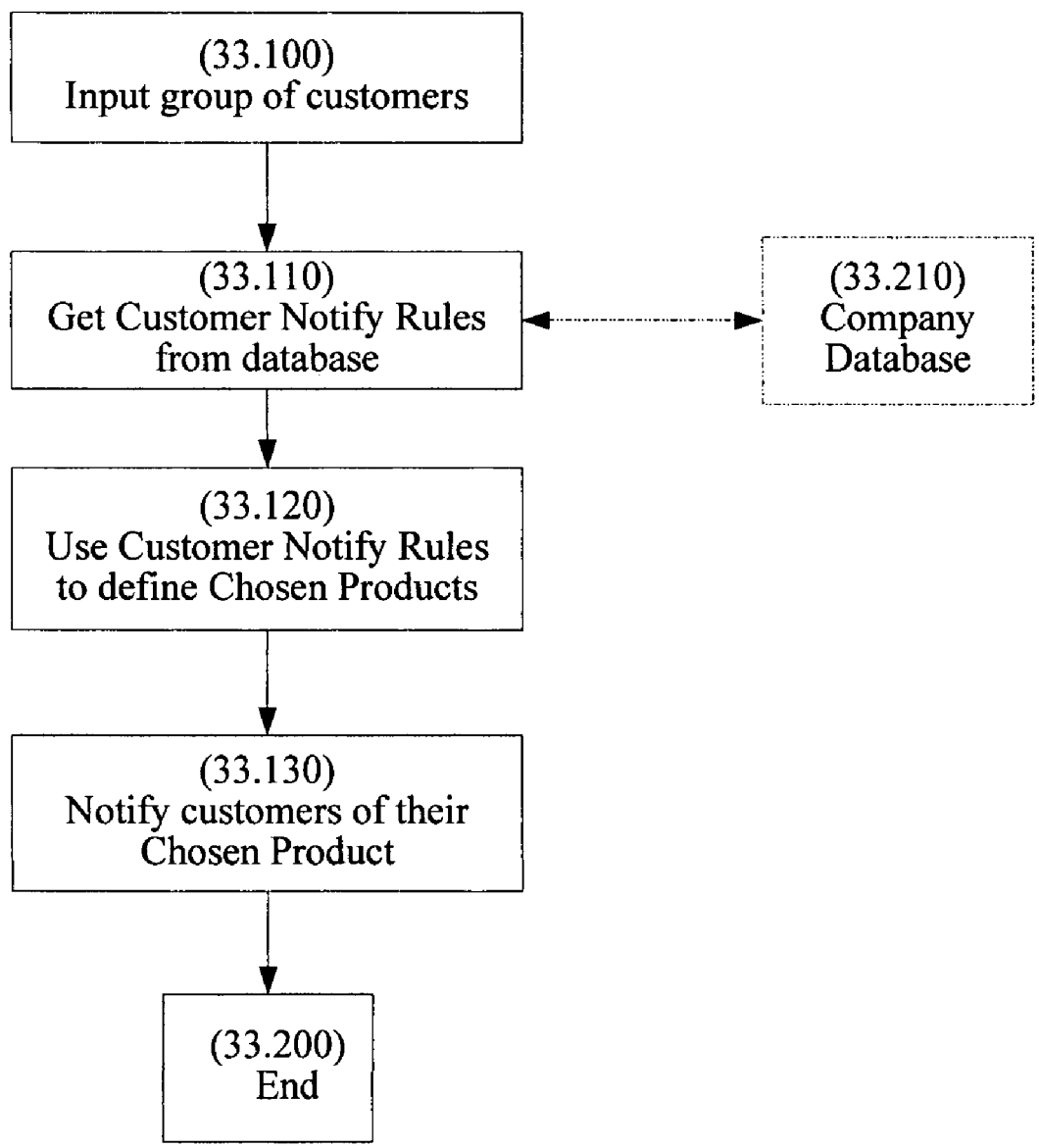
FIG. 33 is a flow chart illustrating an example of an algorithm of Customer Notification process.

FIG. 33 displays an example of an algorithm that may be used to execute the Customer Notification process. In Act 33.100, a group of (one or more) customers is taken as input. Next, in Act 33.110, a set of one or more Customer Notify Rules may be used to define the Chosen Product. A company may choose any Customer Notify Rule of its choosing. The Customer Notify Rules may depend upon expected value of the Product, expected sales volume and so forth. For example, a company may choose a Customer Notify Rule which selects the Product with the higher value as the Chosen Product. Alternatively, a rule may be chosen which selects the Product with the lower value as the Chosen Product. While defining the Chosen Product, a company may also want to use the Remove_Y algorithm (as used in the Buy_N process given above) to determine the optimal Chosen Product that satisfies a pre-determined goal. Thus, during the CN process, one or more Ya may be shifted in the process of selecting the optimal Chosen Product. A Customer Notify Rule may also select the Product with the higher sales volume as the Chosen Product. A Customer Notify Rule may specify that if FRO VOF is used in conjunction with any other VOF (such as APO VOF and so on), then the Grouping Rules (defined later) may govern the selection of the Chosen Product.

Next, in Act 33.120, the Customer Notify Rules, thus obtained from the company's database, are used to define Chosen Product(s). Next, in Act 33.130, the customers are notified about their Chosen Product(s), and the algorithm then ends in Box 33.200.

Implementation of FRO VOF in Conjunction with Other VOFs

FRO VOF may be used in conjunction with one or more other VOFs, for example, the APO (the Alternate Product Option) VOF. A customer who receives an APO is termed "A" type of customer. A company may form a group of one or more APO customers and one or more FRO customers, where the options (APO and FRO) obtained by the group members are complimentary in nature. As an example, consider an A customer who bought an APO to choose either of P1 and P2 as the Chosen Product, and consider a Y customer who received a FRO and is flexible to take any of P1 and P2 as the Chosen Product. Thus, if A decides to choose P1 as the Chosen Product, the company may assign P2 as the Chosen Product for Y, and vice versa. The customers A and Y have taken complimentary options and may form a group. The company may need to hold only one unit of inventory in P1 and P2 to satisfy the needs of both A and Y (assuming each A and Y only need one unit of product). Such a combination of complimentary options or VOFs may improve efficiency and concurrently enhance value for all the parties involved (in the context of the current example, enhance value for A, Y and the company).

The implementation of the grouping of A type and Y type of customers may be done in one or more ways. One way to implement such grouping is to first have one or more Y type of customers and based on such customer(s), the company may offer complimentary APOs to customers to make groups. In another implementation, the company may first offer APO and based on such APO customer(s), company offers complimentary FROs to customers to make groups. In yet another implementation, the company may offer APO and FRO separately and then define a process to make complimentary groups of A and Y customers (such groups termed "AY_Groups").

A company may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an APO to choose either of P1 and P3 as the Chosen Product, a Y1 customer who received a FRO and is flexible to take any of P1 and P2 as the Chosen Product and a Y2 customer who has also received a FRO and is flexible to take any of P2 and P3 as the Chosen Product. A notation A-Y1-Y2 represents this example. Thus, if A decides to choose P1 as the Chosen Product, the company may assign P2 as the Chosen Product for Y1 and P3 as the Chosen Product for Y2. Alternatively, if A decides to choose P3 as the Chosen Product, the company may assign P1 and P2 as the Chosen Products for Y1 and Y2, respectively.

It is assumed that a "unit" represents one unit of product (or product capacity) and each customer needs only one unit of a product. Continuing with the above example, if the company were to not consider the complimentary nature of options obtained by A, Y1 and Y2 customers, the company may need to hold (or block) a total of 4 units of capacity to ensure complete satisfaction of needs of A, Y1 and Y2, i.e., 2 units for A (1 unit each of P1 and P3 as A could choose any product), 1 unit for Y1 (of either P1 or P2) and 1 unit for Y2 (of either P2 or P3). This implies, to satisfy a total need of 3 units of products, the company may need to hold (or block) 4 units of product capacity, creating a redundant capacity of 1 unit that the company may not be able to use otherwise. By creating a complimentary group of A-Y1-Y2, the company needs to only hold (or block) 3 units of capacity (1 unit each in P1, P2 and P3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

A company may choose to implement grouping at various product levels such as Product, Set and Order. A company may also change terms and conditions of one or more option contracts of one or more FRO and/or APO customers (for e.g., price, notify deadline and so on) to solicit customer participation in FRO/APO to create more AY_Groups. The company may also offer incentives to customers to choose complimentary FRO/APO offerings to enable the company to create more AY_Groups. The implementation methods mentioned above for grouping are for illustration purposes only and a company may choose to implement grouping in one or more other ways or by combining above said methods or by combining one or more other ways along with one or more above said methods.

Figure 34:
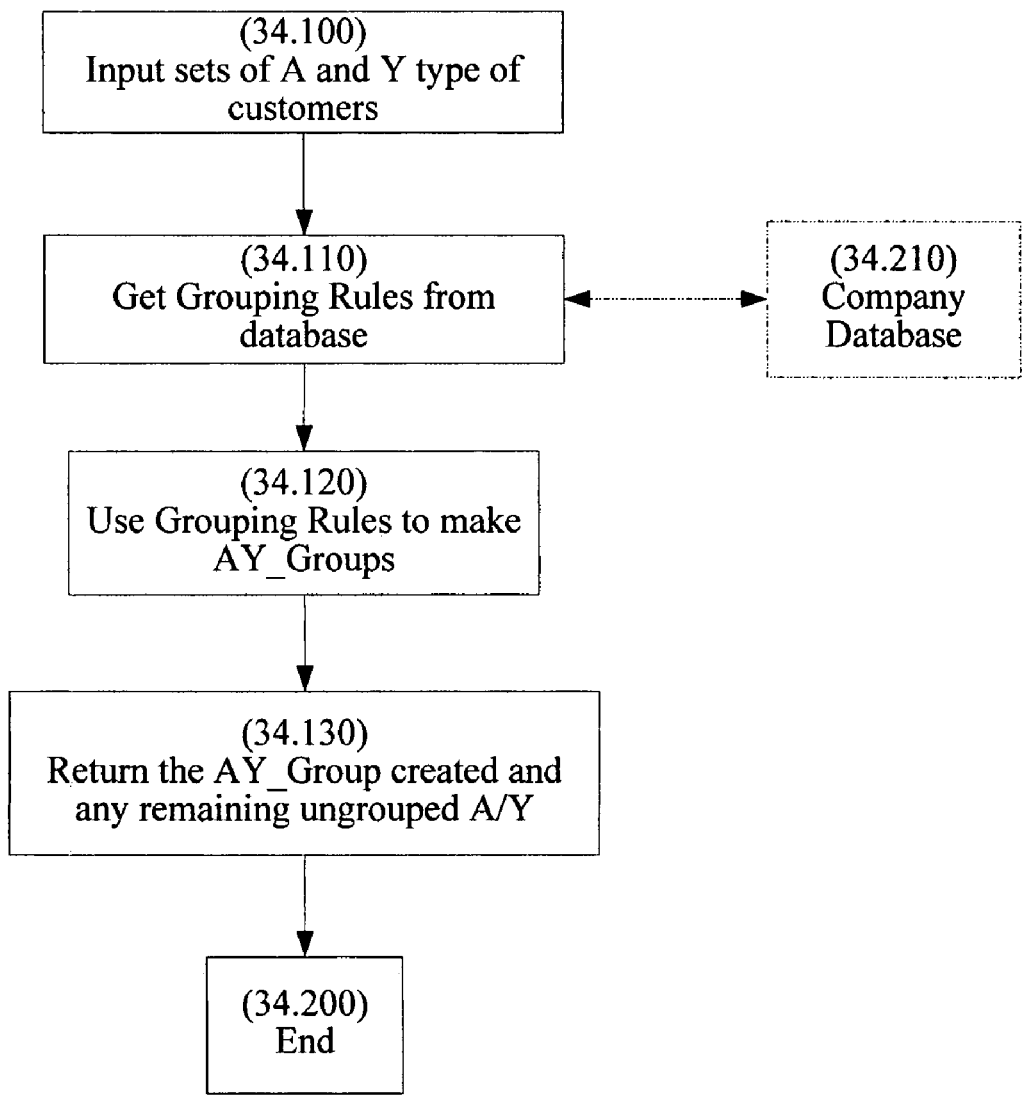
FIG. 34 is a flowchart illustrating an example of an algorithm to implement grouping of A and Y type of customers.

FIG. 34 displays a flow chart that illustrates one way of implementing grouping of A and Y type of customers. In Act 34.100, sets of A and Y customers are taken as input. Next, in Act 34.110, a set of one or more Grouping Rules is read from the company's database (34.210). A grouping rule may depend upon the number of A and/or Y type of customers, desired capacity redundancy in the system, the permissible time factor to create AY_Groups, any other rule of company choosing, any combination thereof and so on. For example, a company may choose a Grouping Rule whereby new groups are created by first ungrouping one or more of the AY_Groups (created earlier but unexercised, for example, groups for which the customer has not been notified, or if notified, the customer has not utilized the Product and the terms of option contract provides for changing the Chosen Product). A Grouping Rule may create groups of only those A and Y type of customers who have yet to be grouped and discarding all A/Y customers which have already been grouped. A company may implement any Grouping Rule to formulate AY groups. The choice to Grouping rules may enhance the overall value for the company (for example, reduce the total capacity required to satisfy product needs for all A and Y customers). Theoretically, the number of units of the Product required (or blocked) should be equal to the number of customers buying the Product (assuming each customer wants one unit of product). Thus, by implementing the grouping and with the help of appropriate Grouping Rules, the company may attempt to achieve such theoretical minima.

Next, in Act 34.120, the Grouping Rules, so obtained from the company's database, are used to make AY groups. Next, in Act 34.130, the AY groups so created are returned along with ungrouped A/Y, if any, and the process then ends in Box 34.200.

The grouping may enhance customers' experience, and may comprise operating a system that delivers a FRO to at least a "first customer" to utilize up to n of m selected products for said first customer, where m and n are whole numbers, and n is less than or equal to m; operating a system that delivers an APO to at least a "second customer" to utilize up to k of p selected products, where k and p are whole numbers, and k is less than or equal to p; operating a system to define each of the k chosen products, whereby after each of the k chosen products is defined, said second customer can utilize said chosen product; operating a system wherein a company defines t chosen product(s) for said first customer after each of the said k chosen products is defined, wherein after each of said t products is defined, said first customer can utilize said defined product, where t is a whole number less than or equal to n. Said t products may be a subset of n, m or both products. Said t or n or both products may also include one or more products not included in said m selected products. Similarly, k products may be a subset of p products, or may include one or more products other than said p products. The grouping may be performed for a multiplicity of at least one of said first or second customers and may combine together at least one of each of said first and second customers to formulate at least one group with at least one complementary set of options. The grouping may enable a company to utilize at least one of said m or p products at least after delivery of any of said first or second options.

Other Applications of FRO in the Airline and Travel Industry

There are several other situations where the customers may trade-in their flexibility. In such situations the FRO VOF may be used to deliver the customers the option to share their flexibility with the company. Some of these instances are given below.

FRO may be used for creating a flexible travel package program. A company may offer the customers a reward if the customer takes the FRO option on two or more travel packages. For example, a customer may select two vacation packages for Hawaii and Bahamas, and may be flexible to use any. The company may select the vacation package, choose and notify (inform) the customer up to a given Notify Deadline. The customer gets a reward for trading his or her flexibility for the travel package. The vacation providers (e.g., an airline and other participating partners like hotels and/or car rental companies) may be able to better manage demand fluctuation by allocating the most optimal Chosen travel package to the customer and get additional revenue and enhanced customer satisfaction.

In another example, a FRO may be implemented for the airline cargo services. Customers are given an option to book cargo capacity for two or more flights and then allow the company to choose and notify a decision on the Chosen Flight prior to a Notify Deadline.

In another version of FRO implementation, a customer may select all flights that belong to a specified time period. The airline may select any flight out of those flights as the Chosen Flight. In other words, instead of flights, a customer receives a time period in which the company may select any of the flights as the Chosen Flight. For example, a customer may receive a FRO (on the $28^{th}$ of April) to fly on any flight (of the airline) that flies from Boston to Atlanta, and departs between 6:00 pm on the $4^{th}$ of May and 11:00 am on the $5^{th}$ of May (i.e., the FRO Time Period). There may be a Notify Deadline on the $3^{rd}$ of May, prior to which the airline may choose any desired flight (that satisfies the above conditions of the option contract) as the Chosen Flight and notifies the customer prior to said Notify Deadline.

An airline may also combine two or more VOFs together to create synergies and/or better value propositions for both airline and the customers. The FRO and UTO VOFs may be combined together in one or more ways. For example, a customer who has booked a seat in the First cabin may be offered FRO on a seat in the Coach cabin of the same flight. The airline may notify the customer about his/her Chosen Seat up to a given Notify Deadline. If the customer is allocated a seat in the coach cabin, he/she may be rewarded with a compensation, which may compensate the customer for the value of trading his/her cabin flexibility. The airline may also benefit by selling the First cabin seat at a much higher prices.

Application of FRO VOF in Other Industries

FRO VOF may be implemented in any industry where the customer may trade-in his/her flexibility. Specifically, industries with significant gap between the purchase time and the time when products are delivered and/or utilized may be able to create significant benefits from a FRO VOF. Such industries may include, without limitation, hotels, car rental, cruise, special events, automobile, insurance, media, manufacturing and so forth.

A FRO VOF may be implemented in the hotel industry to allow the customers to trade-in their flexibility in booking rooms across one or multiple hotel properties. A hotel may offer a discount (or a reward) to a customer, who desires to accept flexible bookings on multiple days and/or at multiple locations. As the check-in date approaches, the hotel may notify the customer about his/her Chosen Booking. In this way, the hotel may better satisfy its demand with minimal revenue spill by optimally allocating hotel rooms to FRO customers.

Similarly, the FRO VOF may be implemented in the car rental industry to trade-in the flexibility of the customers by renting one or multiple cars at multiple locations and/or for multiple rental periods. As travel date approaches, the company may select the Chosen Product for the customers and notifies the same. In this way, a customer receives the price for sharing his/her flexibility and the car rental companies get the opportunity to better manage demand across various customers.

A FRO VOF may be applied to offer customers with more than one time slots (or schedule) for shows, programs, soaps, advertising, live shows etc. in the media industry (e.g., television, radio, print media, web media, online advertising). A customer may select two or more time slots for showing a particular item/event and before a Notify Deadline, the media company (e.g., a television channel, a website and so forth displaying the corresponding event) may select the Chosen Time Slot and notify the customer (e.g., a production company for the corresponding event).

In another example, a FRO VOF may be applied in buying products online or otherwise such as premium cars, special quality of ornaments, cloths and so forth. The customers may be offered a reward for sharing their flexibility to purchase products. The customers may be asked to select two or more products apart from the desired product (for example two models of premium cars), and the provider then notifies the customer (i.e., a car manufacturer) about the Chosen Product before a given Notify Deadline.

The FRO VOF may be used in the special events or entertainment industry. A customer may select/receive a FRO on two or more selected products such as tickets for an event, an arena, a stadium or a theatre hall or any other event, for two or more time slots (or events), and the provider then selects the Chosen Product and notifies the customer before a given Notify Deadline under the terms and conditions of the option contract.

In the real estate industry, a customer may be offered an option on two or more properties (for example at pre-construction time). The company may notify the customer about the Chosen Property before a Notify Deadline within the terms and conditions of the option contract.

Business Model to Implement FRO

Different business models may be used to implement a FRO VOF. The business models mentioned below, without limitation, may be used to implement the FRO VOF in any industry. The airline industry is assumed to provide a context and enhance understanding. As an example, an airline may choose to implement a FRO VOF individually or in conjunction with one or more partners and/or other companies.

An airline may allocate some seat inventory to another entity. The term "allocation of seat(s)" or "allocation of seat inventory" "allocation of flight(s)" implies, without limitation, assigning one or more seats of one or more flights to an entity for any purpose or use by the entity either exclusively or non-exclusively. For example, an entity may use the allocated seats to offer FRO to customers and/or to sell the seats as regular seats. The allocation of seat may be conditional. For example, one of the conditions may require a return of at least one allocated seat within a specified time period and/or other consideration(s).

The customer may select or purchase one or more flights from the airline and/or said entity and then interact with said entity to receive one or more FRO Flights in relation to said (already purchased) flights. Said entity may also receive seat allocation from more than one airline, and thus, offer flights from multiple airlines to a single customer during the Initial Transaction for FRO.

An airline may choose to allocate one or more seats on one or more flights to another entity (referred to as "Option Aggregator" or OA, in short). The OA may use those seats and operate a service to offer FRO to the airline customers. A customer may select one or more flights from the OA, and then receive FRO on those selected flights from the OA. Another approach would be for a customer to select one or more flights from the airline and then receive FRO on those selected flights from the OA. In another example, a customer may select one or more flights from both the airline and the OA, and then receive the FRO option on those selected flights from the OA. It is also possible that the customer receives FRO from the airline or both from the airline and the OA on a given set of selected flights.

The OA and the airline may simultaneously offer FRO to the airline customers, i.e., a customer may either approach the airline or the OA to receive FRO on desired flights. In another model, the OA may operate as the sole provider of FRO to all the customers of an airline. In yet another model, the OA and the airline may choose to work together and jointly offer FRO to the airline customers. The OA or the airline may offer FRO to customers using either or both of the Sequential or the Concurrent Get FRO processes.

An OA may be able to offer FRO on flights from one or multiple airlines. An OA may receive allocation of flight seats from two or more airlines. A customer may purchase one or more flights from one or more airlines and/or from the OA, and then receive FRO on those selected flights from the OA. Even if the OA may not be entitled to or does not receive seat allocation from an airline, it may still be able to formulate an agreement with one or more airlines to offer FRO on the flights of said airlines. Thus, a customer may be able to receive FRO on flights from multiple airlines, giving the customer more value to trade-in their flexibility and variety to choose from. For example, a customer may receive FRO on two flights from two different airlines, and the OA and/or any one or all of the airlines will then notify the customer about the Chosen Flight within the terms and conditions of the option contract. This may provide a lot of value to the customers for trading their flexibility, especially when the customer itineraries include destinations only served by a few airlines. An OA may be able to thus create a multi-airline FRO VOF Framework, which may tremendously enhance the value to the customers. All the participating airlines that allocate seats to and/or partner with the OA to offer FRO may also gain from the FRO network (benefits include reduced revenue spill, higher revenues from selling the FRO Flights at higher prices, and/or to sell FRO on those flights, enhanced overall customer satisfaction and/or other operational benefits). Either or both of the OA and the airline may process the tickets for the Chosen Flights associated with FRO received by the customer. A customer may receive tickets from the OA or the airline for the flights related to the FRO grant. An entity (the OA and the airline) may process tickets for the flights offered only by that entity or by either of the two entities.

The OA and the airline may engage in a business agreement to implement the FRO program. The business agreement may divide the total benefit generated by the FRO program between the two parties using any mechanism or criteria as desired. The total FRO Revenue Benefit may be shared between the two parties. The airline may allocate seats to the OA. One or more airlines may allocate only few or their entire seat inventory to the OA to offer those seats to the customers by way of regular and/or FRO seats. The OA may offer those seats as FRO Seats to customers. In return, the OA may offer some revenue or fee to the airline for all or a portion of the seats allocated. This fee may be given only for the seats that the OA is able to utilize or for all the allocated seats. The lending fee may be a lump sum amount, may depend upon the number of seats allocated or may depend on one or more factors as desired. The agreement may include a provision where the OA may return the allocated seats back to the airline at a certain time and date. There may be one or more conditions associated with the return of unused FRO seats and/or seats from the Released Flights, including, but not limited to, returning the same seat, returning a higher value seat and so on. The company may allot OA at least one product and said OA may deliver FRO on at least one of said allocated products. The OA may or may not enter into an agreement with the company to provide such option on its products. The OA may sell back at least one allocated product to said company or to at least one entity other than the company or both.

An OA may offer an airline flexible customer inventory (generated from FRO) at one or more terms and conditions. The airline may be able to use this flexibility to generate benefit from one or more ways, such as the Buy_N process, reducing operational costs and so forth. Some of these examples have been explained earlier.

An OA may formulate an agreement with one or more airlines on one or more VOFs, such as on both APO and FRO VOFs, to offer a combination of VOFs to customers.

An OA may include, but is not limited to, a traditional travel agent, an online travel agent, an airline, an airline that offers FRO on its own and/or other airline flights, more than one entity, any entity formed by airline(s) (may or may not be solely for this purpose), any other entity or any combination thereof.

The FRO VOF may include different conditions regarding the payment of prices related to the FRO. For example, a customer may receive FRO Price only from the airline even if he/she is receiving flights and/or options from the OA. Similarly, the customer may receive FRO Price only from the OA even if he or she selected the flights and/or received the options from the airlines. The condition may also be set for a customer to make one or more payments to the airline for the flights and receive one or more payments from the airline for the options received from that airline, and to make one or more payments to the OA for the flights and receive one or more payments from the OA for the options received from that OA. The condition may allow the customer to receive partial payments from the airline and the rest from the OA or vice versa, the basis of which distribution may depend upon various factors, including, but are not limited to, the factors of airline's choosing, the arrangement between the OA and the airline and so on. In another example, the customer may receive the FRO Price from the third party or may receive FRO Price from any of the combination of the entities mentioned above.

Information Technology System for FRO

A client-server architecture may be used to implement the FRO VOF. However, a company may use a computer hardware and software infrastructure of its choosing to implement a FRO VOF.

The FRO VOF may be best implemented using one or more computer-implemented methods to operate a computer-implemented service to offer FROs to the customers, that includes, but not limited to, recording the information pertaining to the offered and/or used FROs in a database. It may also include operating a computer-implemented service (and/or system) or other service (and/or system) to define the Chosen Products, and recording said Chosen Products (or defined Products) and all the Products related to a FRO in a database.

For the stage one (i.e., to formulate the FRO VOF), an application server may be used along with a database (e.g., a relational database) that stores all the information relevant to the company and the customer. The database may include all the relevant information sufficient to identify Products the company chooses to make eligible for FRO. One or more users (e.g., a business analyst or manager) may have full access to this server through Intranet or highly secured VPN environment to design an optimal value option framework. The database shall also store all the information pertaining to all the acts (in stage one) used by the company while formulating the FRO VOF.

A similar or a different application server and/or a cluster of application servers (functioning concurrently) along with one or more web servers and a set of one or more database servers may be used for the Get FRO and CN (Customer Notification) processes in the stage two of the FRO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get FRO process and the Even Optimizer processes may be computer-implemented. All the customer interactions and the related information such as customer needs, inputs, payment transactions etc. are stored in this database, including information pertaining to the interactions with those customers who may not receive FRO. The systems for stage two and stage one should be maintained in a synchronized environment so that each system has access to the most current information and can communicate with each other.

A customer may interact with either one or more of the Get FRO, Buy_N, the CN processes either directly or indirectly using a local or a remote terminal (e.g., a computer with a browser and an access to the Internet) that is able to access the web server(s) that host the Get FRO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one may be hosted and run by the company, an OA, a third party service provider or any combination of the above. Similarly, the system for the stage two may be hosted by the company, an OA, a third party service provider or any combination of the above. In the model, where the OA receives Product allocation from the company and offers FRO to the customers directly, the web server, application server and database for both stage one and stage two shall be managed by the OA. The OA may also have partial (or complete) access to the company database and systems through a highly secured environment (for example, a virtual private network). In the model, when an OA and a company tie-up together to offer FRO, all the computer hardware and software infrastructure for both stage one and stage two may be hosted by and/or property of either or both (mutually) of the sides depending upon the business agreement between them.

The system for the stage one and/or stage two may be hosted and run by an airline, an OA, a third party service provider or any combination of the above. In the model, where the OA receives seat allocation from the airline and offers FRO to the customers directly, the web server, application server and database for both stage one and stage two shall be managed by the OA. The OA may also have partial (or complete) access to the airline database and systems. In the model, when an OA and an airline tie-up together to provide FRO, all the computer hardware and software infrastructure for both stage one and stage two may be hosted by and/or property of either or both (mutually) of the sides.

The above system and architecture may be explained and used for any industry.

Each company using the system and method taught herein can make its own choices as to how extensively to deploy the method. For example, an airline can implement as few or as many of the foregoing options as it desires; or it may perceive and implement one or more other options.

Similar options can be identified and pricing/service or product alternatives made available in other industries, such as the Hotels Industry, Car Rental and Cruises, travel, media, insurance, automobile, furniture, computer manufacturing, other manufacturing and other industries as also mentioned in the above paragraphs.

While the invention has been described with respect to a limited number of embodiments, those skilled in the art, having benefit of this disclosure, will appreciate that other embodiments can be devised which do not depart from the spirit and scope of the invention as disclosed herein. Accordingly, the scope of the invention should be limited only by the attached claims.

What is claimed is:

1. A computer-implemented system to provide options on products, comprising:
    a. a data processor being adapted to store a data structure in a data store, wherein the data structure includes data representing a value that is realized on exercising at least one option which provides to the option holder a right exercisable upon occurrence of a specified condition to shift at least one first customer from a first previously selected product to at least one first other product, in response to at least one second customer being shifted from a second previously selected product to at least one second other product or products;
    b. a data processor being adapted to receive at least one input to receive and process said data and to determine from the possible combinations of customers, at least one customer who may be shifted;
    c. a data processor being adapted to receive at least one input to exercise at least one said option and shift said at least one first customer who is to be shifted in response thereto; and
    d. a data processor being adapted to record information pertaining to said shifting of the at least one first customer who is to be shifted, in a data store.

2. The system of claim 1 wherein at least two of said data processors are a same processor.

3. A computer-implemented method to provide options on products, comprising:
    a. via a data processor, storing a data structure in a data store, the data structure including data representing, for each of one or more customers that may be shifted to one or more products from one or more previously selected products, a value that is realized on exercising at least one option which provides to the option holder a right exercisable upon occurrence of a specified condition to shift at least one first customer from a first previously selected product to at least one first other product, in response to at least one second customer being shifted, from a second previously selected product to at least one second other product or products;
    b. via a data processor, receiving and processing said data to determine from the possible combinations of customers associated with options, at least one customer who may be shifted;
    c. operating a data processor to receive at least one input to exercise at least one said option and shift said set at least one first customer who is to be shifted, wherein responsive to shifting one or more of said customers from one or more corresponding previously selected products, at least one product becomes available; and
    d. recording the information pertaining to said shifting of the at least one first customers who is to be shifted, in a computer-readable data store.

4. The method of claim 3 wherein at least two of said data processors are a same processor.

5. The method of claim 3 wherein on detecting the occurrence of at least one event, the act of processing data to determine a set of customers comprises executing at least one event response algorithm which determines a set of customers possessing options making them eligible to be shifted to one or more products; and wherein shifting at least one customer of said set of customers creates further product availability.

6. The method of claim 3 wherein the shifting of said set of customers involves shifting of more than one customer.

7. The method of claim 3 wherein said shifting comprises shifting at least a first customer to at least a first product after at least a second customer is shifted from one of the first products to at least a second product.

8. The method of claim 7 wherein, in turn, each other customer in the set of customers is shifted until the last customer in the set is shifted.

9. The method of claim 3 wherein said customer is shifted to more than one product.

10. The method of claim 9 wherein said products include at least one constrained product which cannot be fully utilized.

11. The method of claim 3 wherein said customer is shifted to at least one or more products belonging to provider of said option.

12. The method of claim 3 wherein said customer is shifted to at least one or more products belonging to an entity other than the provider of said option.

13. The method of claim 3 wherein said value includes cost savings for the provider of said option.

14. The method of claim 3 wherein shifting at least one set of customers increases value for at least one of the customer, the provider of said options and at least an entity other than the provider of said options.

15. The method of claim 3 wherein said shifting includes shifting said customer to a higher ranked product.

16. The method of claim 15 wherein said shifting includes shifting said customer to a higher ranked product as determined by said customer.

17. The method of claim 15 wherein said shifting includes shifting said customer to a higher ranked product as determined by the provider of said options.

18. The method of claim 15, further including, upon shifting to a higher to a higher ranked product, the company enforcing a right to collect a receive for shifting the customer to said higher ranked product.

19. The method of claim 18 wherein the amount of the payment is priced dynamically priced.

20. The method of claim 19, wherein the amount of the payment is determined by bidding from customers.

21. The method of claim 15, further including requiring and receiving from a customer an indication of a price the customer is willing to pay for shifting to said higher ranked product.

22. The method of claim 21 wherein the said price may be modified by the customer up to a specified notification date.

23. The method of claim 3 wherein said company is an airline.

24. The method of claim 23 wherein said shifting comprises shifting the customer to a higher ranked cabin.

* * * * *

UNITED STATES PATENT AND TRADEMARK OFFICE
CERTIFICATE OF CORRECTION

PATENT NO.         : 8,165,920 B2                                           Page 1 of 1
APPLICATION NO.    : 11/981817
DATED              : April 24, 2012
INVENTOR(S)        : Sachin Goel It is certified that error appears in the above-identified patent and that said Letters Patent is hereby corrected as shown below:

Col. 58, claim 18, lines 14-15, should read:
      ing to a higher ranked product, the company enforcing a right to collect a receipt for shifting
the customer Signed and Sealed this
Sixth Day of November, 2012

David J. Kappos
*Director of the United States Patent and Trademark Office*